United States Patent [19]
Komiya et al.

[11] Patent Number: 5,929,891
[45] Date of Patent: Jul. 27, 1999

[54] LIGHT BEAM SCANNING APPARATUS AND IMAGE FORMING APPARATUS

[75] Inventors: Kenichi Komiya; Koji Tanimoto, both of Kawasaki; Kunihiko Miura, Hiratsuka; Naoaki Ide, Shizuoka; Jun Sakakibara, Tokyo, all of Japan

[73] Assignee: Kabushiki Kaisha Toshiba, Kawasaki, Japan

[21] Appl. No.: 08/970,801

[22] Filed: Nov. 14, 1997

[30] Foreign Application Priority Data

Nov. 19, 1995 [JP] Japan ............................ 8-305006

[51] Int. Cl.⁶ ............................................ H04N 1/17
[52] U.S. Cl. .................... 347/235; 347/248; 250/235; 250/208.1
[58] Field of Search ..................... 347/234, 235, 347/248, 250; 250/208.1, 234, 235, 236

[56] References Cited

FOREIGN PATENT DOCUMENTS 3-57452  9/1991  Japan .
8-68956  3/1996  Japan .

Primary Examiner—N. Le
Assistant Examiner—Hai C. Pham
Attorney, Agent, or Firm—Foley & Lardner

[57] ABSTRACT

A beam position detector output processor converts an output from a beam position detector into beam position information. A main control unit detects a total offset value of a plurality of operational amplifiers constituting the processor. The detected offset value is used to compensate a determination reference value used to control the sub-scanning position of a beam, or the beam position information obtained from the beam position detector output processor. As a result, the offsets of the operational amplifiers constituting the beam position detector output processor are compensated.

21 Claims, 47 Drawing Sheets

LIGHT BEAM SCANNING APPARATUS AND IMAGE FORMING APPARATUS

BACKGROUND OF THE INVENTION

The present invention relates to a light beam scanning apparatus for simultaneously scanning and exposing a single photosensitive drum with a plurality of laser beams, thereby to form a single electrostatic latent image on the photosensitive drum, and an image forming apparatus such as a digital copying machine or a laser printer using the light beam scanning apparatus.

In recent years, various digital copying machines have been developed in which image formation is performed by scanning and exposing with a laser beam and electronic photographing processing.

More recently, in order to obtain higher image forming speed, developments have been made to a digital copying machine adopting a multi-beam method in which a plurality of laser beams are generated and scanning is simultaneously carried out for a plurality of scanning lines with use of a plurality of beams.

This kind of digital copying machine which adopts such a multi-beam method comprises a plurality of laser oscillators for generating laser beams, a multi-face rotation mirror such as a polygon mirror for reflecting the laser beams generated by the plurality of laser oscillators toward a photosensitive drum to scan the photosensitive drum with the laser beams, and an optical unit serving as a light beam scanning device consisting mainly of a collimator lens and an f-θ lens.

However, in the structure of a conventional optical unit, it is very difficult to obtain an ideal positional relationship between a plurality of light beams on a photosensitive drum (or a surface to be scanned). In order to obtain an ideal positional relationship, respective components as well as assembling thereof require high accuracy, and hence the cost of the device is increased.

Even if an ideal positional relationship is obtained, the shape of a lens may vary slightly or the positional relationship between respective components may vary slightly due to circumferential changes, such as changes in temperature and humidity or time-based changes. Consequently, the positional relationship between light beams varies, and as a result a high quality image cannot be formed. Therefore, to construct this kind of optical system, it is necessary to adopt a structure and components which are strong against changes as described above.

In the following, defects in the multi-beam method, which are caused when an image is formed with light beams whose passing positions are erroneously dislocated, will be explained with reference to FIGS. 48A and 48B and FIGS. 49A and 49B.

For example, in a case where character "T" shown in FIG. 48A is formed, an image as shown in FIG. 48B is formed when a passing position of a light beam is erroneously dislocated from a predetermined position. In the example of this figure, the passing position of a light beam b is shifted from its predetermined position so that the distance between light beams a and b is reduced while the distance between light beams b and c is increased, among four light beams a to d used.

FIG. 49A shows an example of an image in which emission timings of respective light beams are not controlled correctly. As is apparent from this figure, if the emission timings of respective light beams are not controlled correctly, the image forming position in the main scanning direction is dislocated so that a longitudinal line cannot be formed straight.

FIG. 49B shows an image in which neither the passing positions of light beams nor the emission timings of light beams are controlled correctly, defects in an image appear both in the main scanning direction and in the direction perpendicular to the main scanning direction, i.e., the sub-scanning direction.

Thus, when an image is formed in a multi-beam method, a beam position detector for detecting the passing positions of a plurality of light beams must be provided at high accuracy to control light beam passing positions in the sub-scanning direction so as to be arranged at predetermined intervals, and to control the emission timings of respective light beams so as to align the image forming position in the main scanning direction.

BRIEF SUMMARY OF THE INVENTION

It is an object of the present invention to provide a light beam scanning apparatus and an image forming apparatus in which the position of a light beam on a surface to be scanned can be properly controlled with high precision at all times, thereby always maintaining high image quality.

It is another object of the present invention to provide a light beam scanning apparatus and an image forming apparatus in which the positional relationship between a plurality of light beams on a surface to be scanned can always be controlled to be ideal with high precision, thereby maintaining high image quality at all times.

To achieve the above objects, according to the present invention, there is provided a light scanning apparatus comprising a scanning unit for deflecting a light beam generated by a laser oscillator to scan a surface to be scanned, a beam position detection unit for detecting the light beam with a plurality of light detection elements laid out in a sub-scanning direction of the light beam, and supplying a position signal corresponding to a passing position of the light beam in the sub-scanning direction, first and second beam passage detection units which are arranged in an area including areas on two sides of the beam position detection unit in a main scanning direction, and detect passage of the light beam made to scan by the scanning unit, and supply a beam passage detection signal, a signal processing unit which includes an integrator that starts/ends integration of the position signal from the beam position detection unit in response to the beam passage detection signal output from the first and second beam passage detection units, supplies an integrated value of the position signal, and has an offset value, a first control unit for controlling the scanning unit so as to make the light beam scan an undetectable region of the beam position detection unit during an offset compensation period of the signal processing unit, an offset determination unit for determining the integrated value supplied from the signal processing unit as an offset value corresponding to an offset voltage, and storing the offset value after the scanning unit controlled by the first control unit makes the light beam scan over the beam passage detection unit during the offset compensation period, and a second control unit which has a compensation unit for compensating the offset voltage of the signal processing unit by using the offset value stored in the offset determination unit, compares the integrated value from the signal processing unit with a preset reference value during position control in the sub-scanning direction by the scanning unit, and controls the scanning unit on the basis of a comparison result so as to set the passing position of the light beam in the sub-scanning direction to a proper position.

The compensation unit compensates the offset voltage of the signal processing unit by changing the set reference value in accordance with the offset value.

The compensation unit compensates the offset voltage of the signal processing unit by changing the integrated value from the signal processing unit in accordance with the stored offset value.

The integrator of the signal processing unit comprises an operational amplifier, the apparatus comprises a D/A converter for applying a reference voltage to one input of the operational amplifier, and the compensation unit has a unit for transferring the stored offset value to the D/A converter, thereby compensating the offset voltage of the signal processing unit.

According to the present invention, there is provided a light beam scanning apparatus comprising a scanning unit for deflecting a light beam generated by a laser oscillator to scan a surface to be scanned, a beam position detection unit for detecting the light beam made to scan by the scanning unit with a plurality of light detection elements laid out in a sub-scanning direction of the light beam, and supplying a position signal corresponding to a passing position of the light beam in the sub-scanning direction, first and second beam passage detection units which are arranged in an area including areas on two sides of the beam position detection unit in a main scanning direction, detect passage of the light beam made to scan by the scanning unit, and supply a first beam passage detection signal, third and fourth beam passage detection units which are arranged on one side near the beam position detection unit in the main scanning direction, detect passage of the light beam made to scan by the scanning unit, and supply a second beam passage signal, a selection unit for selecting one of the first and third beam passage detection units and one of the second and fourth detection units, and supplying beam passage signals output from the selected beam passage detection units, a first control unit for controlling the selection unit so as to select the first and second beam passage detection units during sub-scanning position control by the scanning unit and to select the third and fourth beam passage detection units during an offset compensation period of a signal processing unit, the signal processing unit which includes an integrator (42) that starts/ends integration of the position signal from the beam position detection unit in response to the beam passage detection signal output from the selection unit, supplies an integrated value of the position signal, and has an offset value, a second control unit for controlling the light generation unit so as to generate the light beam only when the scanning unit scans over the third and fourth beam passage detection units during the offset compensation period, an offset determination unit for determining the integrated value supplied from the signal processing unit as an offset value corresponding to an offset voltage, and storing the offset value after the light beam from the light generation unit controlled by the second control unit is made to scan over the third and fourth beam passage detection units during the offset compensation period, and a third control unit which has a compensation unit for compensating the offset voltage of the signal processing unit by using the offset value stored in the offset determination unit, compares the integrated value from the signal processing unit with a preset reference value during sub-scanning position control by the scanning unit, and controls the scanning unit on the basis of a comparison result so as to set the passing position of the light beam in the sub-scanning direction to a proper position.

According to the present invention, there is provided a light beam scanning apparatus comprising a scanning unit for deflecting a light beam generated by a beam oscillator to scan a surface to be scanned, a beam position detection unit for detecting the light beam made to scan by the scanning unit with a plurality of light detection elements laid out in a sub-scanning direction of the light beam, and supplying a position signal corresponding to a passing position of the light beam in the sub-scanning direction, first and second beam passage detection units which are arranged in areas on two sides of the beam position detection unit in a main scanning direction, detect passage of the light beam made to scan by the scanning unit, and supply a beam passage signal, a signal processing unit which includes an integrator that starts/ends integration of the position signal from the beam position detection unit in response to the beam passage signal output from the first and second beam passage detection units, supplies an integrated value of the position signal, and has an offset value, a first control unit for controlling the light generation unit so as to stop generating the light beam in response to the beam passage signal from the first beam passage detection unit during an offset compensation period of the signal processing unit, a timer unit for measuring a predetermined time interval in response to the beam passage signal from the first beam passage detection unit (S1) during the offset compensation period, and supplying a measurement completion signal after lapse of the predetermined time interval, the signal processing unit stopping an integration operation in response to the measurement completion signal, and supplying the integrated value of the position signal, an offset determination unit for determining the integrated value supplied from the signal processing unit as an offset value corresponding to an offset voltage, and storing the offset value during the offset compensation period, and a second control unit which has a compensation unit for compensating the offset voltage of the signal processing unit by using the offset value stored in the offset determination unit, compares the integrated value from the signal processing unit with a preset reference value during sub-scanning position control by the scanning unit, and controls the scanning unit on the basis of a comparison result so as to set the passing position of the light beam in the sub-scanning direction to a proper position.

According to the present invention, there is provided a light beam scanning apparatus comprising a light generation unit for generating a light beam, a scanning unit for deflecting the light beam generated by the light generation unit to make the light beam to scan a surface to be scanned, a beam position detection unit for detecting the light beam made to scan by the scanning unit with a plurality of light detection elements laid out in a sub-scanning direction of the light beam, and supplying a position signal corresponding to a passing position of the light beam in the sub-scanning direction, first and second beam passage detection units which are arranged in areas on two sides of the beam position detection unit in a main scanning direction, detect passage of the light beam made to scan by the scanning unit, and supply a beam passage detection signal, a signal processing unit which includes an integrator that starts/ends integration of the position signal from the beam position detection unit in response to the beam passage detection signal output from the first and second beam passage detection units, supplies an integrated value of the position signal, and has an offset value, a shielding unit for shielding the plurality of light detection elements of the beam position detection unit from external light with a shielding plate, a first control unit for controlling the shielding unit so as to cause the shielding plate to cover the plurality of light detection elements during an offset compensation period of the signal processing unit, an offset determination unit for determining the integrated value supplied from the signal processing unit as an offset value corresponding to an offset voltage, and storing the offset value after the light beam is made to scan over the first and second beam passage detection units during the offset compensation period, and a second control unit which has a compensation unit for compensating the offset voltage of the signal processing unit by using the offset value stored in the offset determination unit, compares the integrated value from the signal processing unit with a preset reference value during position control in the sub-scanning direction by the scanning unit, and controls the scanning unit on the basis of a comparison result so as to set the passing position of the light beam in the sub-scanning direction to a proper position.

According to the present invention, there is provided a light beam scanning apparatus comprising a scanning unit for deflecting a light beam generated by a laser oscillator to scan a surface to be scanned, a beam position detection unit for detecting the light beam made to scan by the scanning unit with a plurality of light detection elements laid out in a sub-scanning direction of the light beam, and supplying a position signal corresponding to a passing position of the light beam in the sub-scanning direction, first and second beam passage detection units which are arranged in areas on two sides of the beam position detection unit in a main scanning direction, detect passage of the light beam made to scan by the scanning unit, and supply a beam passage signal, a signal processing unit which includes an integrator that starts/ends integration of the position signal from the beam position detection unit in response to the beam passage signal output from the first and second beam passage detection units, supplies an integrated value of the position signal, and has an offset value, a timer unit for measuring a predetermined time interval, and supplying a measurement completion signal after lapse of the predetermined time interval, a first control unit for controlling the timer unit and the integrator so as to perform integration by the integrator for only the predetermined time interval during an offset compensation period of the signal processing unit, the signal processing unit supplying an integrated value of the position signal after lapse of the period, an offset determination unit for determining the integrated value supplied from the signal processing unit as an offset value corresponding to an offset voltage, and storing the offset value during the offset compensation period, and a second control unit which has a compensation unit for compensating the offset voltage of the signal processing unit by using the offset value stored in the offset determination unit, compares the integrated value from the signal processing unit with a preset reference value during sub-scanning position control by the scanning unit, and controls the scanning unit on the basis of a comparison result so as to set the passing position of the light beam in the sub-scanning direction to a proper position.

In addition, according to the present invention, there is provided an image forming apparatus comprising: a light scanning apparatus including: (a) a plurality of light generation means for simultaneously generating light beams; (b) scanning means for deflecting the light beams generated by the light generation means to make the light beams scan a surface to be scanned; (c) beam position detection means for detecting the light beams made to scan by the scanning means with a plurality of light detection elements laid out in a sub-scanning direction of the light beams, and supplying position signals corresponding to passing positions in the sub-scanning direction of the light beams; (d) first and second beam passage detection means, arranged in an area including areas on two sides of the beam position detection means in a main scanning direction, for detecting passage of the light beams made to scan by the scanning means, and supplying beam passage detection signals; (e) signal processing means which includes an integrator that starts/ends integration of the position signals from the beam position detection means in response to the beam passage detection signals output from the first and second beam passage detection means, supplies an integrated value of the position signals, and has an offset value; (f) first control means for controlling the scanning means so as to make the light beams to scan undetectable regions of the beam position detection means during an offset compensation period of the signal processing means; (g) offset determination means for determining the integrated value supplied from the signal processing means as an offset value corresponding to an offset voltage, and storing the offset value after the scanning means controlled by the first control means makes the light beams to scan over the beam passage detection means during the offset compensation period; and (h) second control means, having compensation means for compensating the offset voltage of the signal processing means by using the offset value stored in the offset determination means, for comparing the integrated value from the signal processing means with a preset reference value during position control in the sub-scanning direction by the scanning means, and controlling the scanning means on the basis of a comparison result so as to set the passing position of the light beam in the sub-scanning direction to a proper position; developing means for developing an electrostatic latent image formed on an image carrier; and transfer means for transferring the image developed by the developing means onto a paper sheet.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to the accompanying drawings.

Figure 1:
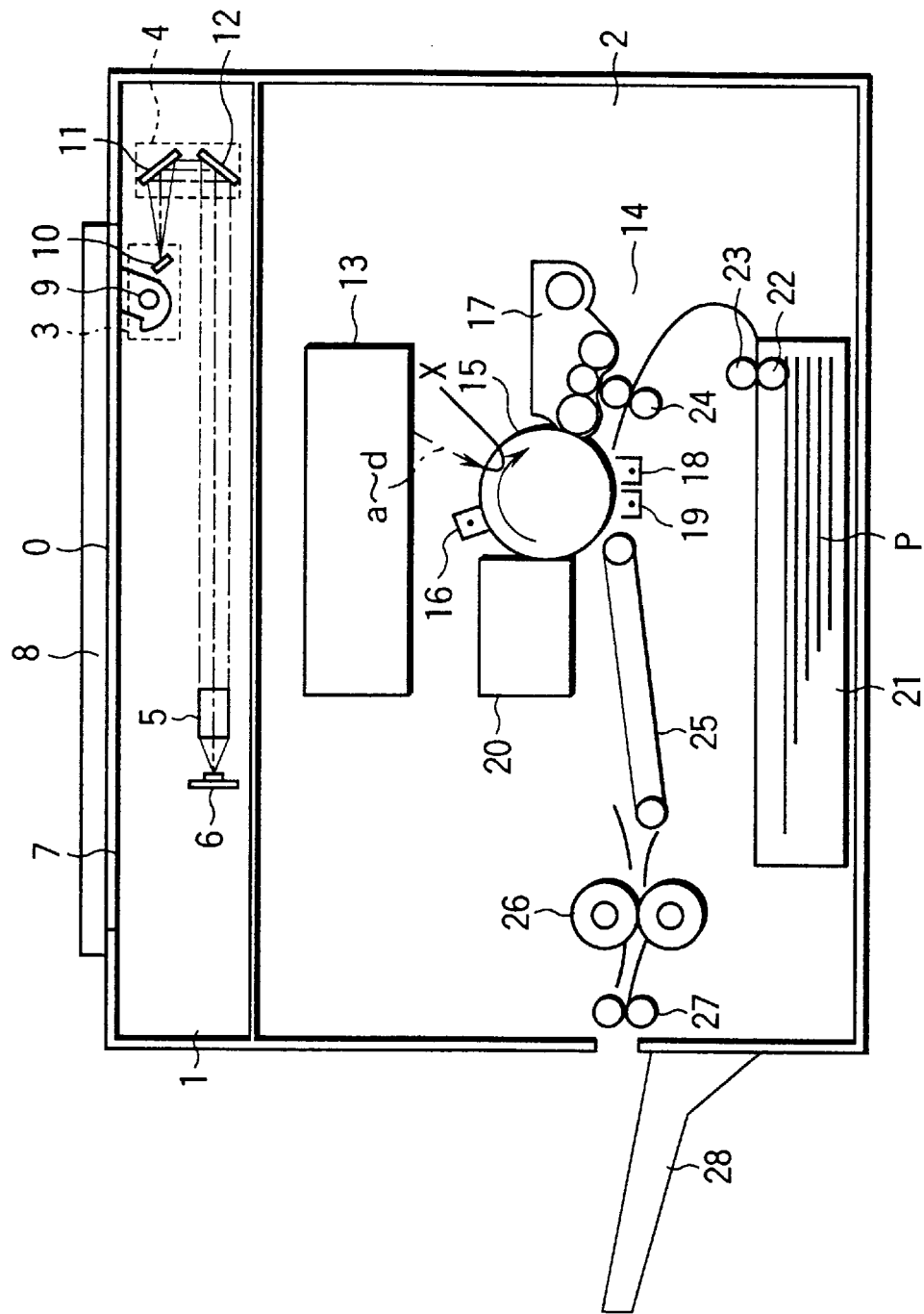
FIG. 1 is view schematically showing the arrangement of a digital copying machine according to an embodiment of the present invention.

FIG. 1 shows the structure of a digital copying machine as an image forming apparatus which adopts a light beam scanning device according to an embodiment of the present invention. Specifically, this digital copying machine comprises a scanner unit 1 or image reading means and a printer unit 2 or image forming means. The scanner unit 1 comprises a first carriage 3 and a second carriage 4 which are movable in the arrow direction in the figure, an imaging lens 5, and a photoelectric conversion element 6.

In FIG. 1, an original O is placed on an original mount 7 made of transparent glass such that the original faces downwards. The original O aligned with a mount index which is the center of the shorter side of the original mount 7 in the right-hand side in the figure is pressed against the original mount 7 by an openable fixing cover 8.

The original O is illuminated by a light source 9 and the reflection light therefrom is converged onto a light receiving surface of the photoelectric conversion element 6, by mirrors 10, 11 and 12 and the imaging lens 5. The first carriage 3 equipped with the light source 9 and the mirror 10 and the second carriage 4 equipped with the mirrors 11 and 12 are moved at a relative speed of 2:1 such that the length of the light path is maintained to be constant. The first and second carriages 3 and 4 are moved by a carriage drive motor (not shown) from the right-hand side to the left-hand side in synchronization with a read timing signal.

As has been described above, an image of the original O placed on the original mount 7 is sequentially read in units of a line by the scanner unit 1. An output obtained by thus reading the image is converted to 8-bit digital image signals representing gradation of the image by an image processing unit (not shown).

The printer unit 2 comprises an optical unit 13 and an image forming unit 14 adopting an electronic photographing method in which an image can be formed on a paper sheet P as a medium on which an image is formed. Specifically, image signals read out from the original O by the scanner unit 1 are processed by the image processing unit (not shown), and thereafter are converted into laser beams (hereinafter referred to as simply "light beams") from semiconductor laser oscillators. This embodiment employs a multi-beam optical system using a plurality of (two or more) semiconductor laser oscillators.

Although the structure of the optical unit 13 will e specifically described later, a plurality of semiconductor laser oscillators provided in the unit carry out emission operation in accordance with laser modulation signals output from the image processing unit (not shown). The light beams output from the oscillators are reflected by a polygon mirror to form scanning light beams which are output to the outside of the unit.

A plurality of light beams output from the optical unit 13 are imaged as spotted scanning light beams having a resolution necessary for an exposure position X on a photosensitive drum 15 as an image carrying member, and thus scanning and exposing are performed. As a result of this, an electrostatic latent image is formed on the photosensitive drum 15 in accordance with image signals.

In the periphery of the photosensitive drum 15, there are provided an electric charger 16 for electrically charging the surface of the drum, a developer device 17, a transfer charger 18, a separation charger 19, a cleaner 20, and the like. The photosensitive drum 15 is rotated at a predetermined circumferential speed by a drive motor (not shown), and is electrically charged by the electric charger 16 provided so as to face the surface of the drum. A plurality of light beams (or scanning light beams) are spotted on an exposure position X on the charged photosensitive drum 15, thereby forming an image.

An electrostatic latent image formed on the photosensitive drum 15 is developed with toner (or developer) supplied from the developer device 17. A toner image formed on the photosensitive drum 15 by developing is transferred by the transfer charger 18 at a transfer position onto a paper sheet P fed from a sheet supply system at a certain timing.

The sheet supply system sequentially supplies paper sheets P in a sheet supply cassette 21 provided at a bottom position, while the sheets P are being separated from one another by a sheet supply roller 22 and a separation roller 23. The sheet P is sent to a resist roller 24, and fed to a transfer position at a predetermined timing. In the downstream side of the transfer charger 18, there are provided a sheet conveyer mechanism 25, a fixing device 26, and delivery rollers 27 for discharging the sheets P with the formed images. Therefore, a paper sheet P on which a toner image has been transferred is fed out onto an external sheet supply tray 28 through the delivery rollers 27, after the toner image is fixed by the fixing device 26.

A cleaner 20 removes toner remaining on the surface of the photosensitive drum 15 from which a toner image has been transferred onto a paper sheet P, and the drum thereby recovers an initial condition in a standby condition.

Image forming operation is continuously performed by repeating the processing operation as described above.

As has been described above, data is read out from the original O placed on the original mount 7 by the scanner unit 1, and the data thus read is subjected to a series of processing at the printer unit 2. Thereafter, the data is recorded as a toner image on the paper sheet P.

The optical unit 13 will now be described.

Figure 2:
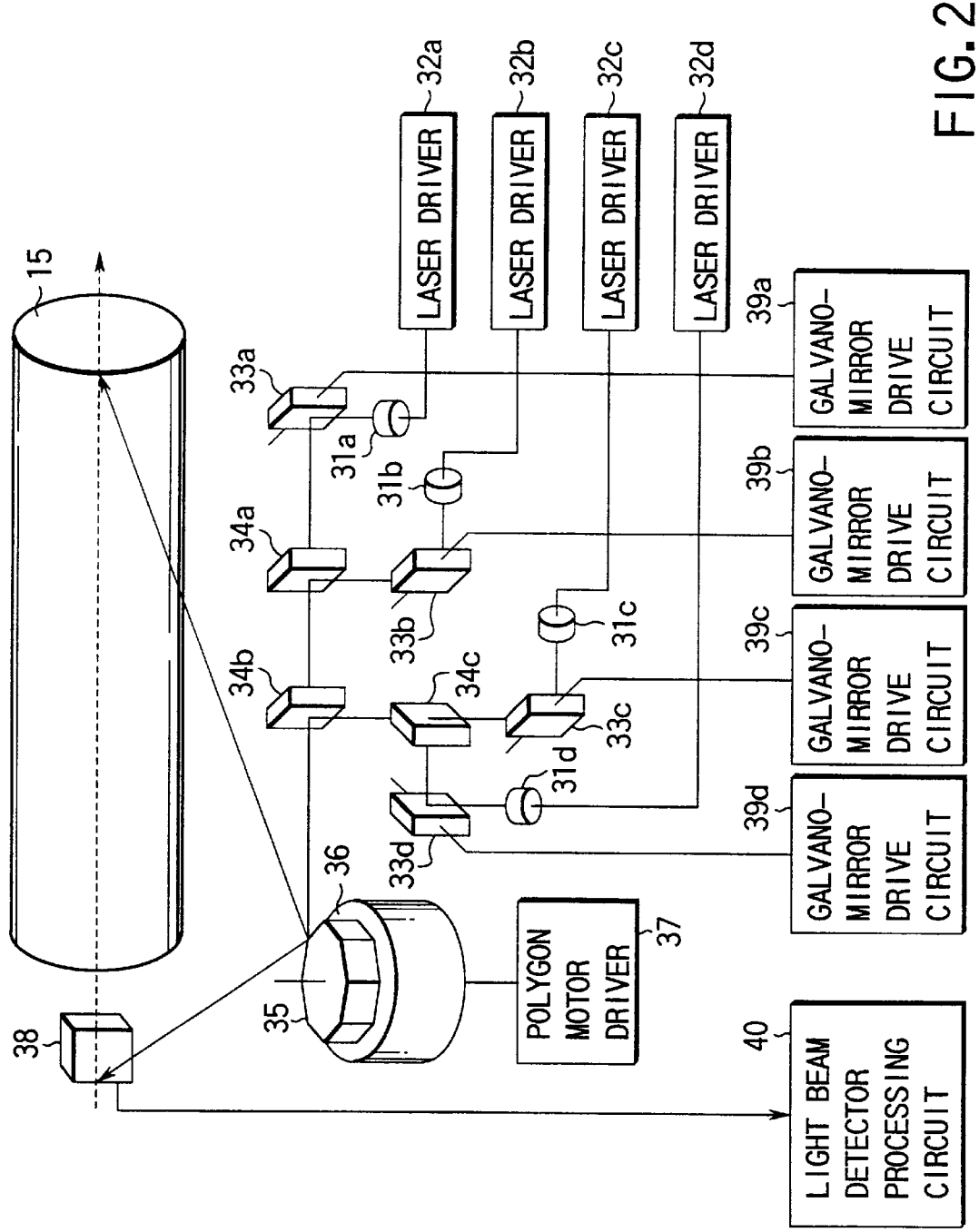
FIG. 2 is a view showing the arrangement of an optical unit and the positional relationship between the optical unit and a photosensitive drum.

FIG. 2 shows the structure of the optical unit 13 and the positional relationship between the unit 13 and the photosensitive drum 15. The optical unit 13 includes, for example, four semiconductor laser oscillators 31a, 31b, 31c, and 31d or light beam generator means, and each of the oscillators 31a to 31d performs image formation for one scanning line at the same time, so that high speed image formation is realized without extremely increasing the rotation speed of the polygon mirror.

The laser oscillator 31a is driven by a laser driver 32a. A light beam output therefrom passes through a collimator lens (not shown) and thereafter strikes on a galvanomirror 33a or light beam path changing means. The light beam reflected by the galvanomirror 33a passes through half-mirrors 34a and 34b and falls on a polygon mirror 35 serving as a rotational polygonal mirror.

The polygon mirror 35 is rotated at a constant speed by a polygon motor 36 driven by a polygon motor driver 37. In this manner, the light beam reflected by the polygon mirror 35 swings such that scanning is performed in a constant direction at an angle speed depending on the rotation speed of the polygon motor 36.

The scanning light beam swung by the polygon mirror 35 passes through an f-θ lens (not shown), thereby scanning the light receiving surface of a beam position detector 38, which serves as beam position detector means, and the photosensitive drum 15, owing to the f-θ characteristics of the f-θ lens.

The laser oscillator 31b is driven by a laser driver 32b. A light beam output therefrom passes through a collimator lens (not shown) and is thereafter reflected by a galvanomirror 33b and further by the half-mirror 34a. The light beam reflected by the half-mirror 34a passes through the half-mirror 34b and strikes on the polygon mirror 35. The route of the light beam after the polygon mirror 35 is the same as that of the beam from the laser oscillator 31a, i.e., the light beam passes through an f-θ lens (not shown), thereby scanning the light receiving surface of the beam position detector 38 and the photosensitive drum 15.

The laser oscillator 31c is driven by a laser driver 32c. A light beam output therefrom passes through a collimator lens (not shown) and is thereafter reflected by a galvanomirror 33c. The light beam further passes through a half-mirror 34c, is reflected by the half-mirror 34b, and then falls on the polygon mirror 35. The route of the light beam after the polygon mirror 35 is the same as that of the beam of the laser oscillators 31a and 31b, i.e., the light beam passes through an f-θ (not shown), thereby scanning the light receiving surface of the beam position detector 38 and the photosensitive drum 15.

The laser oscillator 31d is driven by a laser driver 32d. A light beam output therefrom passes through a collimator lens (not shown) and is thereafter reflected by a galvanomirror 33d. The light beam is further reflected by the half-mirrors 34c and 34b, and falls on the polygon mirror 35. The route of the light beam after the polygon mirror 35 is the same as that of the beams of the laser oscillators 31a, 31b, and 31c, i.e., the light beam passes through an f-θ lens (not shown), thereby scanning the light receiving surface of the beam position detector 38 and the photosensitive drum 15.

Thus, light beams output from the individual laser oscillators 31a, 31b, 31c, and 31d are synthesized by the half-mirrors 34a, 34b, and 34c so that four light beams travel in the direction toward the polygon mirror 35.

Therefore, the photosensitive drum 15 can be simultaneously scanned with four light beams so that an image can be recorded at a speed four times higher than in a conventional single light beam on condition that the polygon mirror 35 is rotated at an equal rotation speed.

The galvanomirrors 33a, 33b, 33c, and 33d are used to adjust (or control) the positional relationship between light beams in the sub-scanning direction, and are respectively connected to galvanomirror drive circuits 39a, 39b, 39c, and 39d for driving corresponding galvanomirrors.

The beam position detector 38 serves to detect passing positions and passing timings of four light beams, and is provided near an end portion of the photosensitive drum 15 such that the light receiving surface of the detector 38 is situated at a level equal to the surface of the photosensitive drum 15. On the basis of a detection signal from the beam position detector 38, control of the galvanomirrors 33a, 33b, 33c, and 33d (i.e., control of image forming positions in the sub-scanning direction), control of emission power (i.e., intensity) of the laser oscillators 31a, 31b, 31c, and 31d, as well as control of emission timings (i.e., control of image forming positions in the main scanning direction) are respectively performed in accordance with the light beams, although the details of the control will be described later. The beam position detector 38 is connected to a beam detector output processor 40, in order to generate signals for performing the control as described above.

The beam position detector 38 will now be described.

Figure 3:
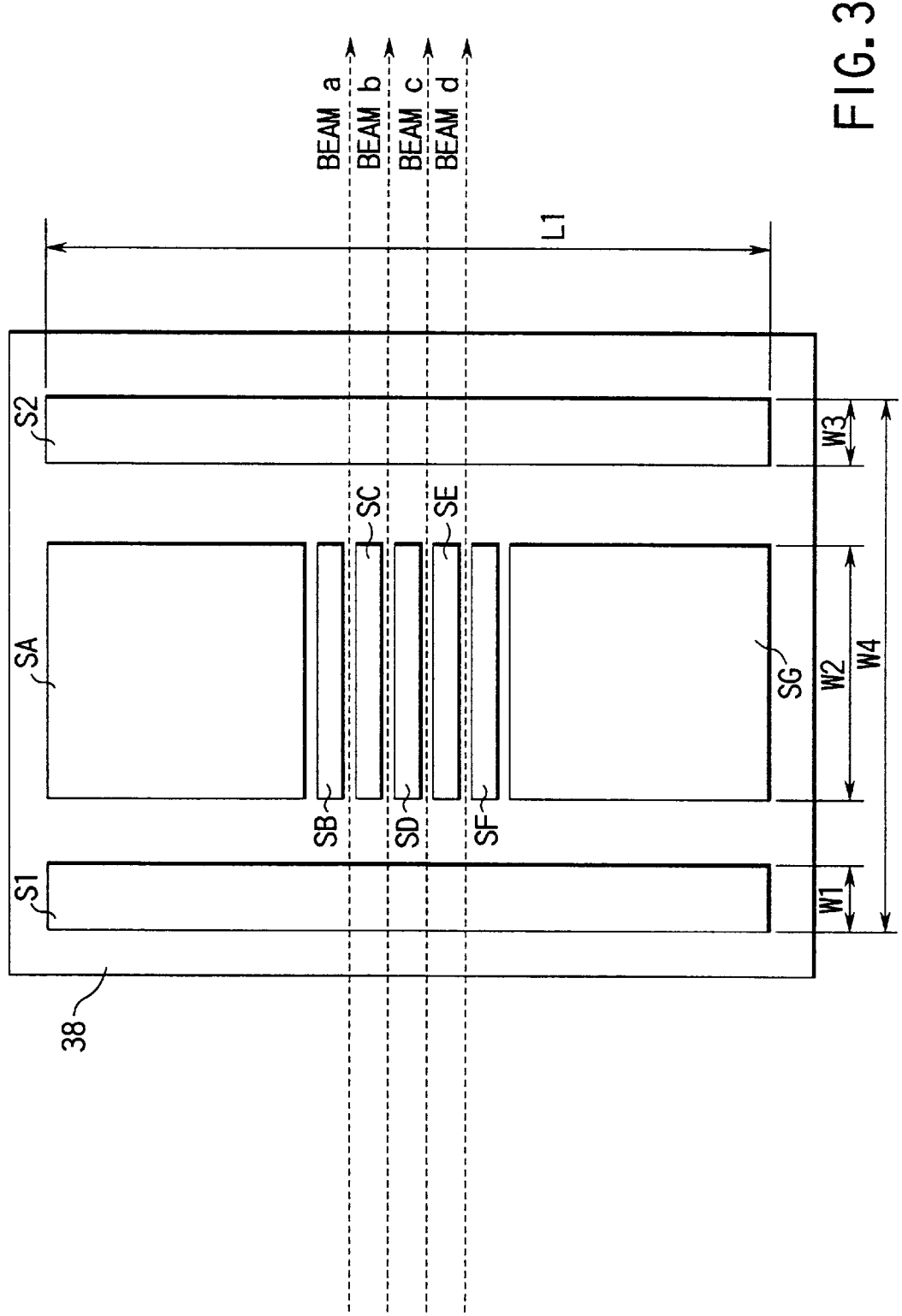
FIG. 3 is a view schematically showing the arrangement of a beam position detector.

FIG. 3 shows the relationship between the structure of the beam position detector 38 and the scanning direction of the light beams. Light beams a to d from the four laser oscillators 31a to 31d are made to scan from the left to the right by the rotation of the polygon mirror 35, thus crossing the beam sensor 38.

The beam position detector 38 has two sensor patterns S1 and S2 serving as elongated light beam detectors, as well as seven sensor (light reception) patterns SA, SB, SC, SD, SE, SF and SG serving as light beam detectors which are interposed between the patterns S1 and S2. The sensor patterns S1, S2, and SA to SG are constituted by, e.g., photodiodes.

The sensor pattern S1 is a pattern for detecting passage of a light beam to generate a reset signal (integration start signal) for an integrator (to be described later), and the sensor pattern S2 is a pattern for similarly detecting passage a light beam to generate a conversion start signal for an A/D converter (to be described later). The sensor patterns SA to SG are patterns for detecting the passing positions of light beams.

As shown in FIG. 3, the sensor patterns S1 and S2 are formed to be longer in a direction perpendicular to the scanning direction of a light beam such that the light beams a to d made to scan by the polygon mirror 35 always cross the sensor patterns S1 and S2. For example, in this embodiment, widths W1 and W3 of the sensor patterns S1 and S2 in the scanning direction of a light beam are 200 $\mu$m, while their length L1 in the direction perpendicular to the scanning direction of a light beam is 2,000 $\mu$m.

The sensor patterns SA to SG, as shown in FIG. 3, are arranged between the sensor patterns S1 and S2 in a stacking fashion in the sub-scanning direction of a light beam. The arrangement lengths of the sensor patterns SA to SG are equal to the length L1 of the sensor patterns S1 and S2. A width W2 of the sensor patterns SA to SG in the scanning direction of a light beam is, e.g., 600 $\mu$m.

Figure 4:
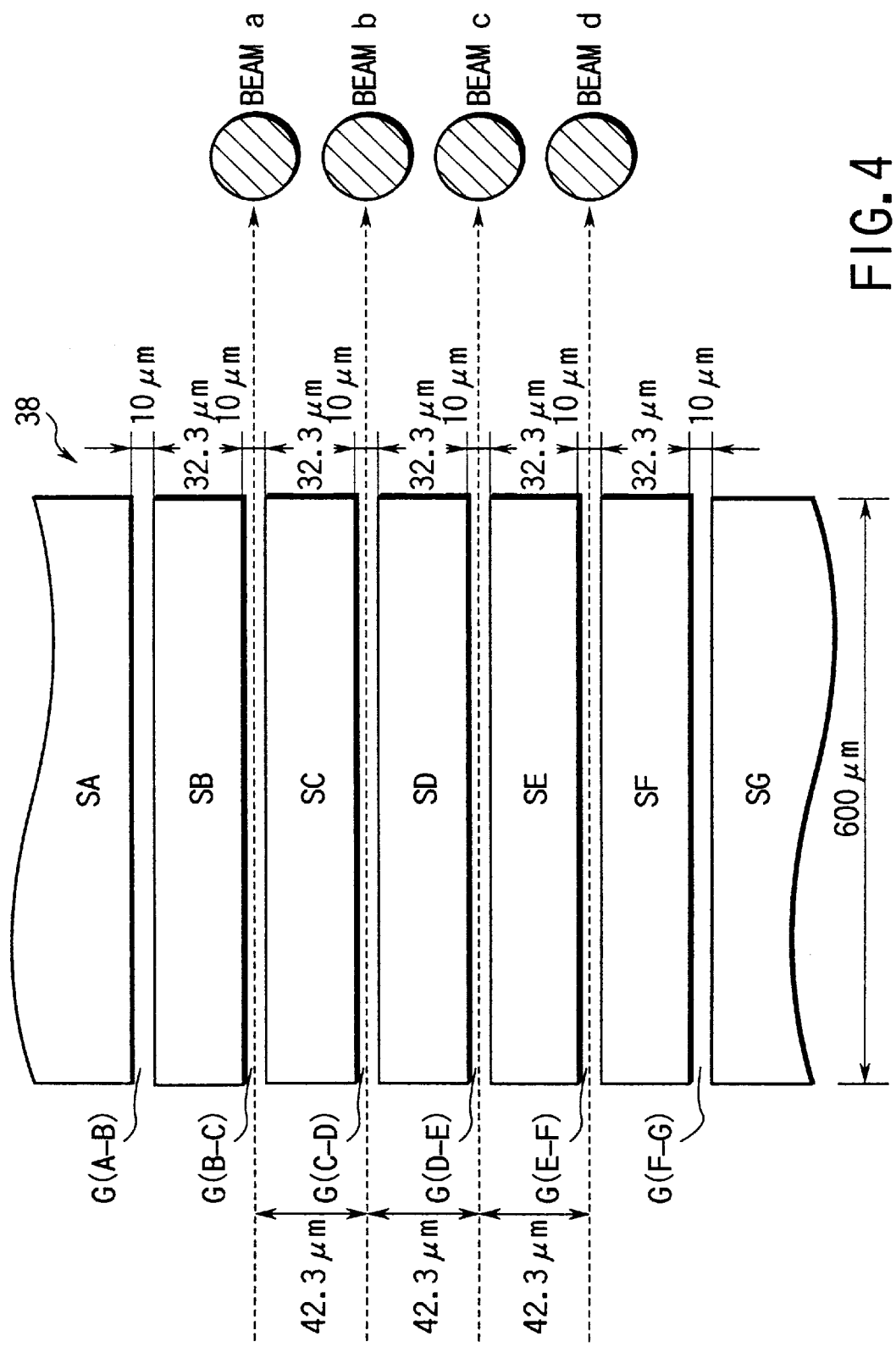
FIG. 4 is a view schematically showing the arrangement of the main part of the beam position detector.

FIG. 4 is an enlarged view showing the pattern shapes of the sensor patterns SA to SG of the beam position detector 38.

The sensor patterns SB to SF have rectangular pattern shapes of, e.g., 32.3 $\mu$m×600 $\mu$m, and small gaps G of about 10 $\mu$m are provided in the sub-scanning direction of a light beam. Accordingly, the alignment pitch between the gaps is 42.3 $\mu$m. In addition, the sensor patterns SA and SB and the sensor patterns SF and SG are also arranged to have gaps of about 10 $\mu$m therebetween. The widths of the sensor patterns SA and SG in the sub-scanning direction of a light beam are set larger than those of the sensor patterns SB to SF.

A control operation using the output of the beam position detector 38 will be described later in detail. It should be noted, however, that the gaps provided at the pitch of 42.3 $\mu$m serve as targets for setting the passing positions of beams a, b, c, and d at a predetermined pitch (42.3 $\mu$m in this embodiment). Specifically, the gap G (B-C) defined by the sensor patterns SB and SC serves as the target for the passing position of the beam a; the gap G (C-D) defined by the sensor patterns SC and SD serves as the target for the passing position of the beam b; the gap G (D-E) defined by the sensor patterns SD and SC serves as the target for the passing position of the beam c; and the gap G (E-F) defined by the sensor patterns SE and SF serves as the target for the passing position of the beam d.

The features of the beam position detector 38 having the above-described sensor patterns will now be described with reference to FIGS. 5A and 5B.

As has been described above, the beam position detector 38 is situated near the end portion of the photosensitive drum 15 or at the position where the length of an obtained light path is equal to the distance from the polygon mirror 35 to the photosensitive drum 15, such that the light reception surface of the detector 38 is situated on an axis extended from the surface of the photosensitive drum 15. In order to exactly detect the passing positions of beams by means of the beam position detector 38 situated in this manner, it is necessary that the above-described sensor patterns are aligned perpendicular or parallel to the beam passing direction. However, the beam position detector 38 is actually mounted at some inclination to the ideal position.

To solve this problem, in the beam position detector 38 of the present invention, the sensor a patterns are arranged such that detection points for detecting the beam passing positions are aligned in the beam passing direction. Thereby, even if the beam position detector 38 is mounted at some inclination, the error in detection pitch can be limited to a minimum.

Furthermore, an integrator is added to a circuit for processing the output of the beam position detector 38, though this will be described later in detail. Thus, even if the beam position detector 38 is inclined, the influence on the detection result of the beam passing positions can be limited to a minimum.

The length of each of the sensor patterns SA and SG in the beam sub-scanning direction is much greater than that of each of the sensor patterns SB to SF. In this embodiment, the length of each of the sensor patterns SA and SG in the sub-scanning direction is more than 20 times greater than the pitch (42.3 μm) of the sensor patterns SB to SF. The reason is that the sensor patterns SB to SF are used to set the beam passing position within 1 μm from the target position while the sensor patterns SA and SG are used to generally determine the beam passing position.

Figure 5A:
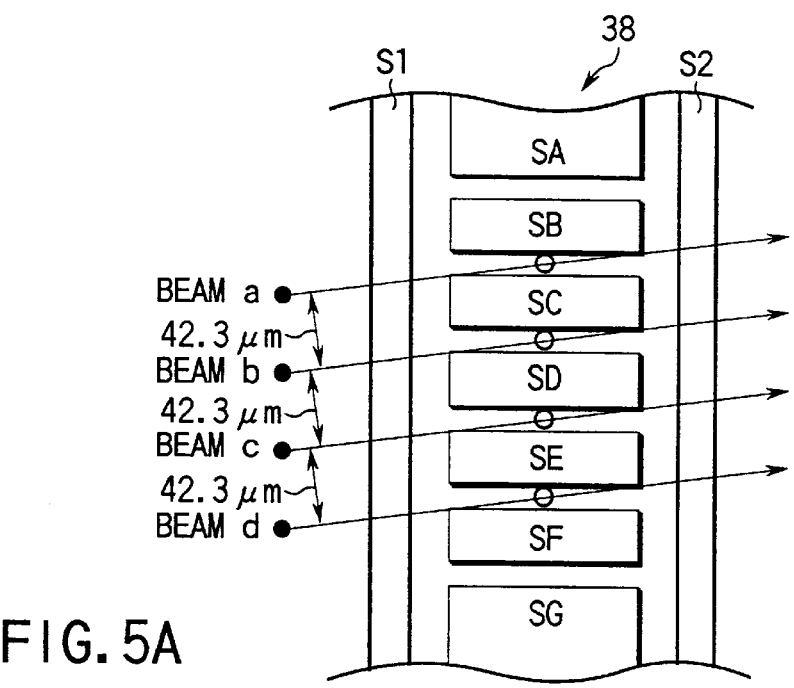
FIGS. 5A and 5B are views for explaining inclination of a light beam in the scanning direction with respect to the beam position detector.

FIG. 5A shows the relationship between the sensor patterns SA to SG and the scan positions of beams a to d in the case where the beam position detector 38 of the present invention is situated with an inclination to the beam scanning direction. In FIG. 5A, however, this relationship is shown as if the scanning direction of beams a to d is inclined with respect to the beam position detector 38. The scanning lines of beams a to d in FIG. 5A are controlled at ideal intervals (pitch=42.3 μm).

Control target points (indicated by circles in white) are set among the sensor patterns SA to SG. The target points, as will be described later in detail, remain at the centers among the patterns even when the beams a to d are made incident at an angle, by virtue of the advantages of integrators.

As is clear from FIG. 5A, the loci of scanning lines controlled at ideal intervals (pitch=42.3 μm) pass through substantially the central points of control targets on the sensor patterns SA to SG. In other words, even when the beam position detector 38 is mounted at a small angle, the influence on the detection precision is very small.

For example, when the beam position detector 38 is mounted at an angle of 5° to the beam scanning lines, the beam scan position pitch, which is normally to be set at 42.3 μm, is set at 42.14 μm in consideration of a detection error of the beam position detector 38 due to the inclination. In this case, the error is about 0.16 μm (0.03%). If the pitch is controlled in this manner, the influence on the image quality is very small. Although not described in detail, the value of the pitch can be easily calculated by using a trigonometric function.

If the sensor patterns SA to SG of the beam position detector 38 of the present invention is used, the beam scan positions can be exactly detected even if the beam position detector 38 is mounted with a slight inclination.

Figure 5B:
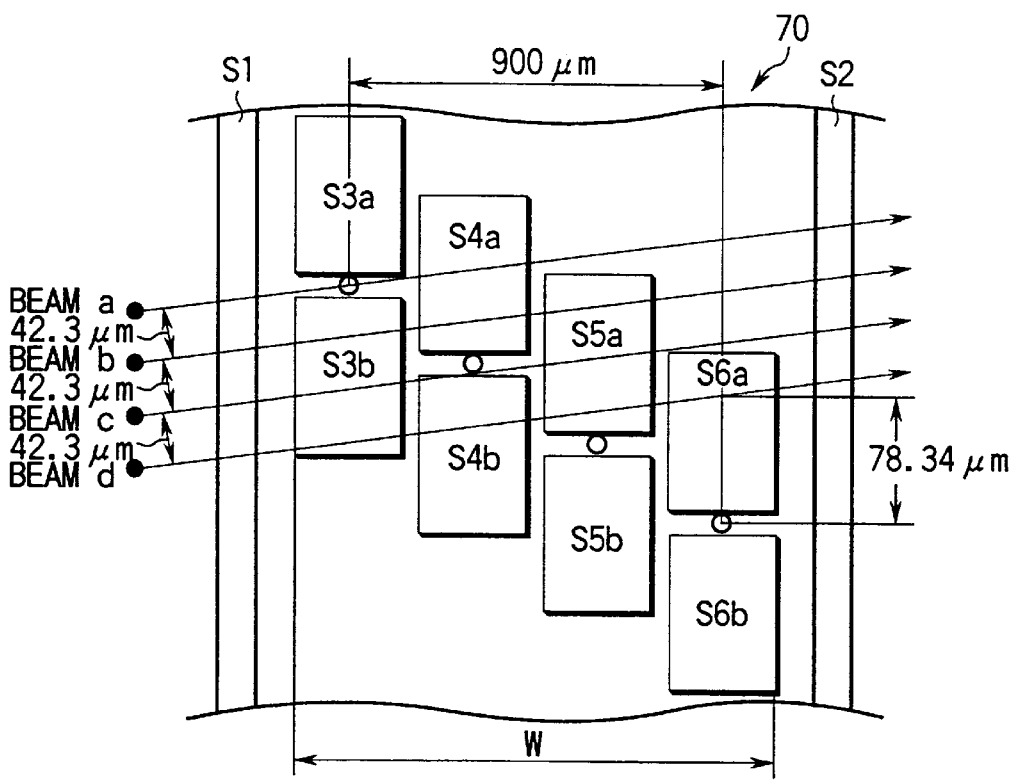

FIG. 5B shows an example of the conventional sensor patterns of a beam position detector 80 for achieving the same function as the beam position detector 38 of the present invention.

In the case where such conventional sensor patterns are adopted, the beam passing positions cannot exactly be detected if the sensor patterns are slightly inclined with respect to the scanning directions of beams a to d. The reason is that the sensor patterns (S3*, S4*, S5*, S6*: *=a and b) for detecting the passing positions of beams a to d are arranged at a distance in the beam scanning direction. The greater the distance between the sensor patterns in the beam scanning direction, the greater the detection error for a sensor pattern.

FIG. 5B, like FIG. 5A, shows loci of scanning lines controlled at ideal intervals (pitch=42.3 μm), on the assumption that the beam position detector 80 is mounted with an inclination. As is obvious from FIG. 5B, the conventional beam position detector 80 requires much higher precision in mounting position than the beam position detector 38 of the present invention as shown in FIG. 5A.

Suppose that the beam position detector 80 shown in FIG. 5B, like the beam position detector 38 shown in FIG. 5A, is mounted with an inclination of 5° and the distance between the sensor patterns S3a and S3b, on the one hand, and the sensor patterns S6a and S6b, on the other, is 900 μm. In this case, the control target point of the beam d is dislocated from the ideal position by 78.34 μm This value is much greater than the target control pitch of 42.3 μm and adversely affects the image quality very seriously. In the case where the beam position detector 80 is used, very high sensor mounting precision is required at least with respect to the inclination to the beam scanning direction.

In order to solve this problem in the prior art, it is necessary to reduce the sensor pattern width W in the beam scanning direction as much as possible and locate the beam passing position detection points as close as possible in the beam scanning direction, even though the sensitivity of the sensor is sacrificed to some extent. Furthermore, in order to compensate the deficiency in sensitivity of the sensor, it is necessary to increase the power of the laser oscillator or decrease the rotation speed of the polygon motor at the time of detecting the beam passing positions.

The control system will now be described.

Figure 6:
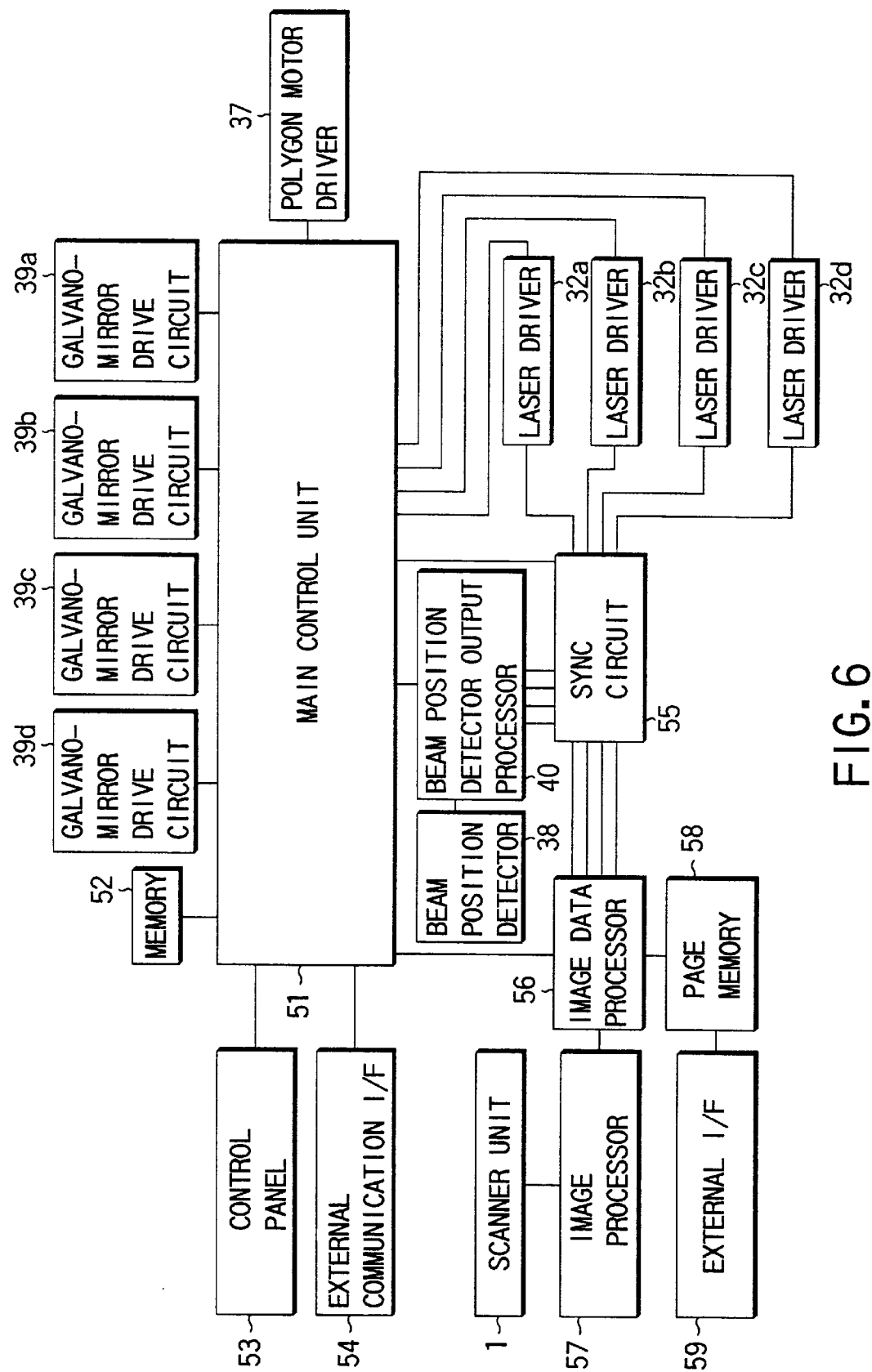
FIG. 6 is a block diagram showing a control system mainly for control of an optical system.

FIG. 6 shows the structure of the control system mainly for control of the multi-beam optical system. A main control unit 51 performs the general control of the optical unit and comprises, for example, a CPU. The main control unit 51 is connected to a memory 52, a control panel 53, an external communication interface (I/F) 54, the laser drivers 32a, 32b, 32c, and 32d, the polygon mirror motor driver 37, the galvanomirror drive circuits 39a, 39b, 39c, and 39d, the beam detector output processor 40, a sync circuit 55 and an image data interface (I/F) 56.

The sync circuit 55 is connected to the image data I/F 56. The image data I/F 56 is connected to an image processor 57 and a page memory 58. The image processor 57 is connected to the scanner unit 1. The page memory 58 is connected to an external interface (I/F) 59.

The flow of image data at the image formation will now be described in brief.

In the copying operation mode, as described above, the image on the original O set on the original mount 7 is read by the scanner unit 1 and sent to the image processor 57. In the image processor 57, the image signal from the scanner unit 1 is subjected to, for example, well-known shading correction, filtering processes, gray scale processing, or gamma correction.

The image data from the image processor 57 is delivered to the image data I/F 56. The image data I/F 56 distributes the image data to the four laser drivers 32a, 32b, 32c, and 32d. The sync circuit 55 generates clocks in synchronism with the timing of the light beams passing over the beam position detector 38. In synchronism with the clocks, the image data is supplied from the image data I/F 56 as laser modulation signals to the laser drivers 32a, 32b, 32c, and 32d. Since the image data is transferred in synchronism with the scanning of the beams, the image formation can be performed in correct synchronism (at correct positions) in the main scanning direction.

The sync circuit 55 includes a sample timer and a logic circuit. The sample timer controls the power of each beam by forcibly activating the laser oscillators 31a, 31b, 31c, and 31d in non-image areas. The logic circuit activates the laser oscillators 31a, 31b, 31c, and 31d on the beam position detector 38 according to the order of the beams, thereby to establish the image formation timing of the beams.

The control panel 53 is a man-machine interface for starting the copying operation, setting the number of copies, and the like.

This digital copying machine can perform not only the copying operation but also the image formation of image data input from the outside via the external I/F 59 connected to the page memory 58. The image data input from the external I/F 59 is temporarily stored in the page memory 58 and then delivered to the sync circuit 55 via the image data I/F 56.

When the digital copying machine is externally controlled by means of a network or the like, the external communication I/F 54 serves as the control panel 53.

The galvanomirror drive circuits 39a, 39b, 39c, and 39d drive the galvanomirrors 33a, 33b, 33c, and 33d in accordance with instruction values generated from the main control unit 51. Thus, the main control unit 51 can freely control the angles of the galvanomirrors 33a, 33b, 33c, and 33d by using the galvanomirror drive circuits 39a, 39b, 39c, and 39d.

The polygon motor driver 37 drives the polygon motor 36 for rotating the polygon mirror 35 for causing the above-mentioned four light beams to scan. The main control unit 51 can instruct the polygon motor driver 37 to start/stop and switch the rotation speed of the polygon motor driver 37. The rotation speed of the polygon motor 36 is made lower than a predetermined value, where necessary, in order to confirm the passing positions of the beams by means of the beam position detector 38.

The laser drivers 32a, 32b, 32c, and 32d, as mentioned above, produce laser beams in accordance with the laser modulation signals synchronized with the beam scanning generated from the sync circuit 55. In addition, the laser drivers 32a, 32b, 32c, and 32d, upon receiving forcible emission signals from the main control unit 51, activate the laser oscillators 31a, 31b, 31c, and 31d, irrespective of the image data.

The main control unit 51 sets, by means of the laser drivers 32a, 32b, 32c, and 32d, the light emission power of the laser oscillators 31a, 31b, 31c, and 31d. The light emission power is varied in accordance with a change in process conditions or detection results of the beam passing positions.

The memory 52 stores information necessary for the control operations. For example, the memory 52 stores data on the control of the galvanomirrors 33a, 33b, 33c, and 33d and on the order of incoming light beams. Thereby, the optical unit 13 can be immediately set in the image formation state, after the power is turned on.

The beam passing (scanning) position control will now be described in detail.

Figure 7:
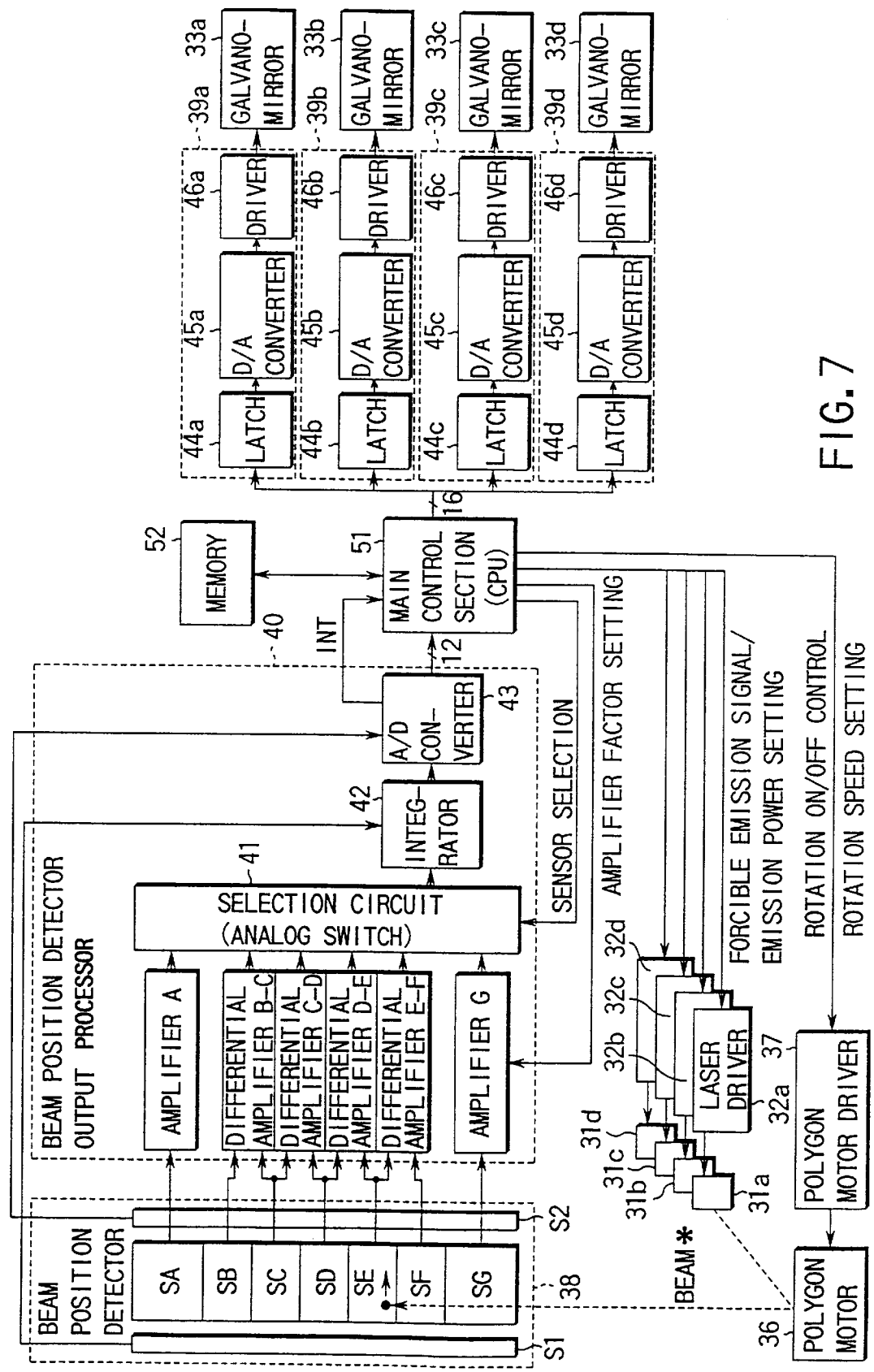
FIG. 7 is a block diagram for explaining beam passing position control and offset detection/compensation processing.

FIG. 7 is a block diagram for explaining beam passing position control and offset detection/compensation processing (to be described later). FIG. 7 shows in detail a portion associated with beam control which is extracted from a block diagram in FIG. 6.

As described above, pulse signals indicating passage of light beams are output from the sensor patterns S1 and S2 of the beam position detector 38. Independent signals are output from the sensor patterns SA to SG in accordance with the beam passing positions.

Of the sensor patterns SA to SG, the sensor patterns SA and SG respectively supply output signals to amplifiers 61 and 62 (to be also referred to as amplifiers A and G hereinafter). The amplifier factors of the amplifiers 61 and 62 are set by the main control unit 51 constituted by the CPU.

Of the sensor patterns SA to SG, the sensor patterns SB to SF respectively supply output signals to differential amplifiers 63 to 66 (to be also referred to as differential amplifiers B-C, C-D, D-E, and E-F hereinafter) each for amplifying a difference between output signals from adjacent ones of the sensor patterns SB to SF. The differential amplifier 63 amplifies a difference between output signals from the sensor patterns SB and SC; the differential amplifier 64, a difference between output signals from the sensor patterns SC and SD; the differential amplifier 65, a difference between output signals from the sensor patterns SD and SE; and the differential amplifier 66, a difference between output signals from the sensor patterns SE and SF.

The output signals from the amplifiers 61 to 66 are input to a selection circuit (analog switch) 41. The selection circuit 41 selects a signal to be input to an integrator 42 in response to a sensor selection signal from the main control unit (CPU) 51. The output signal from the amplifier which is selected by the selection circuit 41 is input to the integrator 42 to be integrated.

On the other hand, a pulse signal output from the sensor pattern S1 is also input to the integrator 42. The pulse signal from the sensor pattern S1 resets the integrator 42. At the same time, this signal is used to permit the integrator 42 to start a new integration operation. Although described later in detail, the integrator 42 has functions of removing noise and eliminating an influence of inclination in mounting position of the beam position detector 38.

An output from the integrator 42 is input to an A/D converter 43. A pulse signal output from the sensor pattern S2 is also input to the A/D converter 43. The A/D conversion operation of the A/D converter 43 is started upon reception of the pulse signal from the sensor pattern S2 as a conversion start signal. Specifically, the A/D conversion operation is started at the timing at which the beam passes through the sensor pattern S2.

As has been described above, the integrator 42 is reset by the pulse signal from the sensor pattern S1 immediately before the light beams have passed over the sensor patterns SA to SG, and at the same time the integration operation is started. While the beams are passing over the sensor patterns SA to SG, the integrator 42 integrates signals indicating the beam passing positions. Immediately after the beams have passed over the sensor patterns SA to SG, the integration result of the integrator 42 is A/D-converted by the A/D converter 43, with the pulse signal from the sensor pattern S2 supplied as a trigger signal. Thus, the noise-free sensor signal, from which the influence of the inclination in mounting position of the beam position detector 38 has been eliminated, can be converted to a digital signal.

The A/D converter 43, which has completed the A/D conversion, outputs an interrupt signal INT indicating the completion of the A/D conversion process to the main control unit 51.

The amplifiers 61 to 66, the selection circuit 41, the integrator 42, and the A/D converter 43 constitute the beam detector output processor 40.

Thus, the digitally converted beam position detection signal from the beam position detector 38 is input as beam position information to the main control unit 51, thereby determining the passing position of the beam.

On the basis of the beam position detection signal thus obtained, the main control unit 51 calculates control amounts for galvanomirrors 33a to 33d, and the calculated results are stored in the memory 52, where necessary. The main control unit 51 delivers the calculated results to the galvanomirror drive circuits 39a to 39d.

As shown in FIG. 7, the galvanomirror drive circuits 39a to 39d are provided with latches 44a to 44d for holding the data of the calculated results. Once the data is written in the latches 44a to 44d by the main control unit 51, the latches 44a to 44d maintain the data until the data is updated.

The data held in the latches 44a to 44d is converted to analog signals (voltage) by D/A converters 45a to 45d and input to drivers 46a to 46d for driving the galvanomirrors 33a to 33d. The drivers 46a to 46d drive the galvanomirrors 33a to 33d in accordance with the analog signals (voltage) input from the D/A converters 45a to 45d.

In this embodiment, only one of the amplified output signals from the sensor patterns SA to SG is selected by the selection circuit 41 and integrated, and the integrated output is A/D-converted. Thus, all output signals from the sensor patterns SA to SG cannot be input to the main control unit 51 at the same time.

Consequently, in a state in which the passing positions of the beams are not specified, it is necessary to successively operate the selection circuit 41 and supply the output signals from all the sensor patterns SA to SG to the main control unit 51, thereby to determine the passing positions of the beams.

However, once the passing positions of the beams have been recognized, the passing positions of the beams can be estimated unless the galvanomirrors 33a to 33d are excessively moved. Therefore, there is no need to input the output signals from all sensor patterns to the main control unit 51. This process will be described later in detail.

Figure 8C:
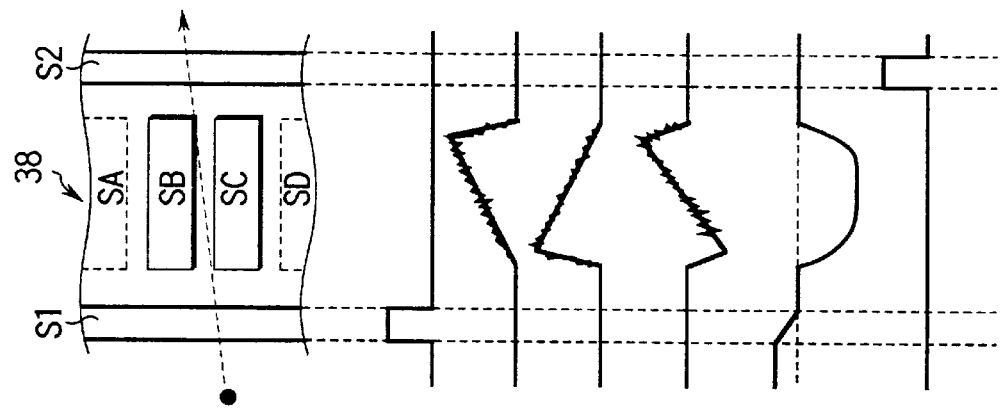
FIGS. 8A to 8C are views showing the relationship between the beam passing position, a received beam pattern output from the beam position detector, an output from a differential amplifier, and an output from an integrator.
Figure 8B:
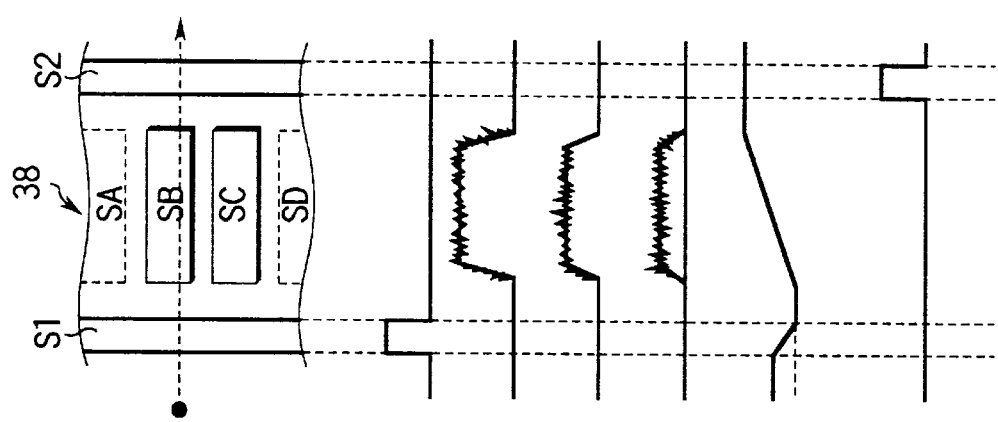
Figure 8A:
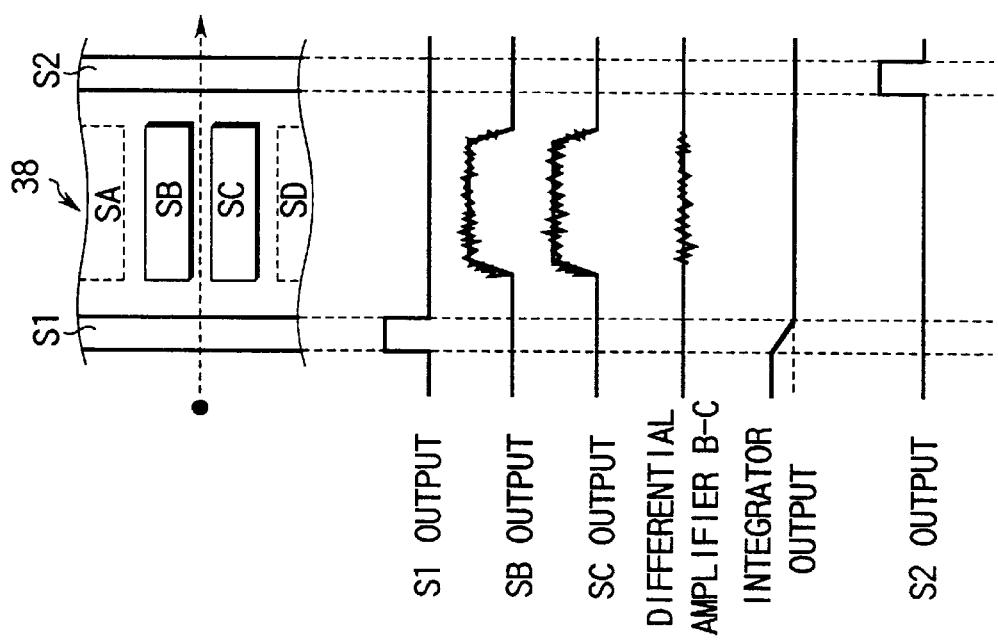

FIGS. 8A to 8C illustrate the relationship among the beam passing positions, the outputs from the beam position detector 38, the outputs from the differential amplifiers 63 to 66, and the output from the integrator 42 in the operation of the circuit shown in FIG. 7.

FIG. 8A illustrates a case where the light beam passes a just middle point between the sensor patterns SB and SC. FIG. 8B illustrates a case where the light beam passes a point closer to the sensor pattern SB, as compared to the case illustrated in FIG. 8A. FIG. 8C illustrates a case where the beam position detector 38 is mounted with an inclination to the beam passing direction.

The output from the beam position detector 38, the output from the differential amplifier 63, and the output from the integrator 42 will now be described with respect to each case.

Circuit Operation in FIG. 8A

The light beam crosses the sensor pattern S1, and a pulse signal is output from the sensor pattern S1. As shown in FIG. 8A, the pulse signal resets the output of the integrator 42 to "0". Accordingly, when the beam crosses the sensor pattern S1, the previous detection result is reset, and a new detection result is integrated.

When the light beam passes through the middle point between the sensor patterns SB and SC, the outputs from the sensor patterns SB and SC are equal to each other, as shown in FIG. 8A. However, since the outputs from sensor patterns are very small, a small amount of noise component may be superimposed, as shown in FIG. 8A.

Such output signals are input to the differential amplifier 63 and a difference therebetween is amplified. When the outputs from the sensor patterns SB and SC are substantially equal, the output from the differential amplifier 63 is substantially zero, as shown in FIG. 8A, but a small amount of noise component may be superimposed. The differential amplification result thus obtained is input to the integrator 42 through the selection circuit 41.

The integrator 42 integrates the output from the differential amplifier 63 and outputs the integration result to the A/D converter 43. As shown in FIG. 8A, noise components have been removed from the output from the integrator 42. The reason is that a high-frequency noise component superimposed on the differential amplification result is removed by the integration. As described above, at the same time as the light beam has passed over the sensor patterns SB and SC, the difference between outputs from the sensor patterns SB and SC is amplified and integrated, and then input to the A/D converter 43.

On the other hand, the output from the sensor pattern S2 is input to the A/D converter 43. Specifically, a pulse signal, as shown in FIG. 8A, is output from the sensor pattern S2 to the A/D converter 43, when the light beam has passed over the sensor patterns SB and SC. With the pulse signal received as a trigger, the A/D converter 43 starts to A/D-convert the output of the integrator 42. Accordingly, the A/D converter 43 can timely convert the high-S/N analog information on the beam passing position, from which the noise component has been removed, to a digital signal.

Circuit Operation in FIG. 8B

The operation of the circuit in FIG. 8B is basically the same as that of the circuit in FIG. 8A. However, since the beam passing position deviates towards the sensor pattern SB, the output from the sensor pattern SB is greater by the degree of deviation and the output from the sensor pattern SC is smaller. Thus, the output from the differential amplifier 63 deviates to the positive side accordingly. Like the case of FIG. 8A, the integrator 42 is reset when the beam passes over the sensor pattern S1. Then, the differential amplification result is input to the integrator 42. The integrator 42 gradually increases the output thereof, as long as the input (i.e., the output from the differential amplifier 63) to the integrator 42 is on the positive side. When the input has restored to zero, the integrator 42 keeps this value. Thus, the output from the integrator 42 represents the deviation of the beam passing position.

In the same manner as in the case of FIG. 8A, the A/D converter 43 A/D-converts the integration result at the timing the light beam passes over the sensor pattern S2. Thus, the correct beam passing position is timely converted to digital information.

Circuit Operation in FIG. 8C

The operation of the circuit in FIG. 8C is basically the same as those in FIGS. 8A and 8B. However, since the light beam passes over the beam position detector 38 in a slanting direction, the outputs from the sensor patterns SB and SC, the output from the differential amplifier 63, and the output from the integrator 42 are characterized accordingly.

As shown in FIG. 8C, the light beam, after passing over the sensor pattern S1, enters the region of the sensor patterns SB and SC at an angle from the pattern SC side. Then, the beam passes over substantially the middle point between the sensor patterns SB and SC and goes out of the region of the sensor patterns SB and SC at an angle toward the sensor pattern SB. In this case, the output from the sensor pattern SB is low immediately after the incidence of the beam and then gradually increases as the beam is passing, as shown in FIG. 8C. On the other hand, the output from the sensor pattern SC is high immediately after the incidence of the beam and then gradually decreases as the beam is passing.

As shown in FIG. 8C, the output from the differential amplifier 63, to which such outputs from the sensor patterns SB and SC have been input, is high on the negative side just after the incidence of the beam, and then gradually decreases. When the beam has passed over the middle point between the sensor patterns SB and SC, the output from the differential amplifier 63 becomes substantially zero. Then, the output gradually increases on the positive side and takes a maximum positive value just before the beam has passed the sensor patterns SB and SC.

The output from the integrator 42, to which the output of the differential amplifier 63 has been input, increases on the negative side just after the incidence of the beam. The value on the negative side continues to increase until the output from the differential amplifier 63 becomes zero. When the output from the differential amplifier 63 turns to the positive side, the negative value of the output of the integrator 42 decreases. Then, the output of the integrator 42 becomes substantially zero when the beam has passed over the sensor patterns SB and SC.

Although the light beam crosses the beam position detector 38 in a slanting direction, it is considered that the beam passes through the middle point between the sensor patterns SB and SC on average. When the light beam has passed over the sensor pattern S2, the A/D converter 43 starts the A/D conversion operation. In this case, the integrated value is zero and also the digital data indicating the beam passing position is zero. In other words, it is considered that the beam has passed through the middle point between the sensor patterns SB and SC.

The relationship among the beam passing position, the outputs from the sensor patterns S1, S2, SB, and SC, the output from the differential amplifier 63, the output from the integrator 42, and the operation of the A/D converter 43 has been described. The operations of the sensor patterns SC, SD, SE, and SF and differential amplifiers 64, 65, and 66 are basically the same as those of the sensor patterns SB and SC and differential amplifier 63 and thus a description of the respective operations will be omitted.

The relationship between the beam passing position and the output from the A/D converter 43 will now be described with reference to FIG. 9.

Figure 9:
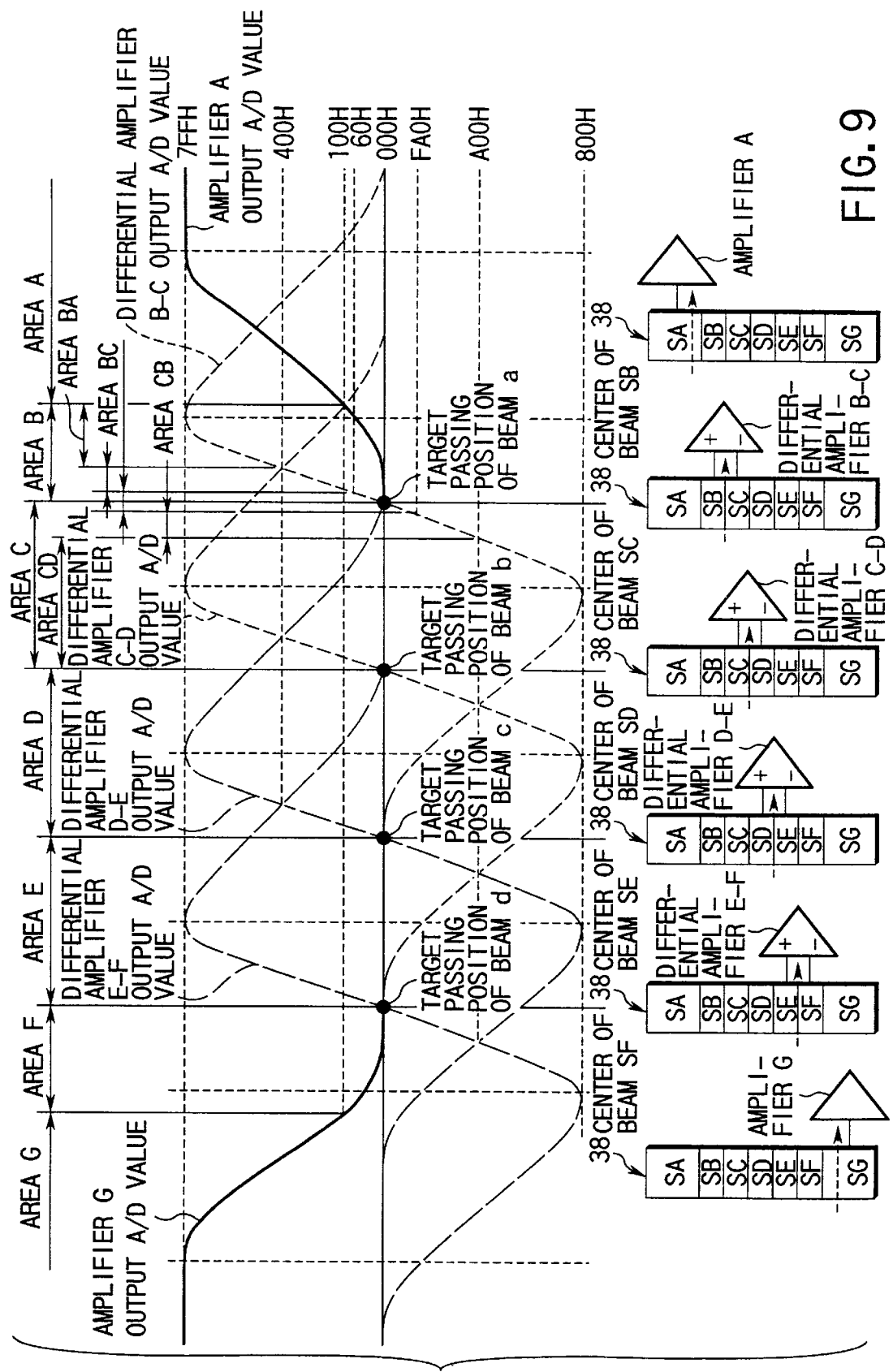
FIG. 9 is a graph showing the relationship between the beam passing position and an output from an A/D converter.

The ordinate of the graph of FIG. 9 indicates the magnitude of the output of the A/D converter (12 bits) 43 as shown in FIG. 7, and the abscissa indicates the passing positions of the beams. As regards the beam passing positions on the abscissa, the beam passing position closer to the left-hand end indicates that the beam passes through a position closer to the sensor pattern SG, and the beam passing position closer to the right-hand end indicates that the beam passes through a position closer to the sensor pattern SA.

The output from the differential amplifier (63, 64, 65, or 66; to be referred to as B-C, C-D, D-E, or E-F hereinafter) may have either a positive value or a negative value. In this case, the output from the A/D converter 43 may vary as follows. When the output of the differential amplifier (B-C, C-D, D-E, or E-F) has a positive value, the A/D converter 43 outputs values (A/D coverted values) from 000H (minimum value) to 7FFH (maximum value) as the output from the differential amplifier increases.

On the other hand, when the output of the differential amplifier (B-C, C-D, D-E, or E-F) has a negative value, the A/D converter 43 outputs values (A/D coverted values) from 800H (minimum value) to FFFH (maximum value). In the case of the values on the negative side, the A/D coverted value with a large absolute value (close to FFFH) indicates that the output of the integrator 42 is close to zero, i.e., the target value. On the other hand, the A/D coverted value with a small absolute value (close to 800H) indicates that the output of the integrator 42 has a large negative value.

A detailed description will now be given of the case where the output of the differential amplifier B-C associated with the sensor patterns SB and SC is A/D-converted by the A/D converter 43.

The output of the sensor pattern SB is connected to a positive terminal of the differential amplifier B-C, and the output of the sensor pattern SC is connected to a negative terminal of the differential amplifier B-C. As shown in FIG. 9, the output from the differential amplifier B-C takes a maximum value when the light beam passes near the center of the sensor pattern SB, and the A/D coverted value from the A/D converter 43 is 7FFH. The reason is that the output from the sensor pattern SB becomes maximum near the center.

When the light beam deviates from this position either toward the sensor pattern SA side or toward the sensor pattern SC side, the A/D coverted value (output of the differential amplifier B-C) decreases.

In addition, when the beam passing position has deviated toward the sensor pattern SA, neither the sensor pattern SB nor SC is able to detect the passage of the beam, and the A/D coverted value (output of the differential amplifier B-C) becomes substantially zero.

By contrast, when the beam passing position has deviated toward the sensor pattern SC, the A/D coverted value (output from the differential amplifier B-C) gradually decreases. The A/D coverted value becomes zero when the beam passes over the very middle point between the sensor patterns SB and SC. The reason is that the outputs from the sensor patterns SB and SC are equalized. In this embodiment, this point is the target passing position of the light beam a.

When the beam passing point deviates toward the sensor pattern SC, the output of the differential amplifier B-C has a negative value, and the A/D coverted value varies from 000H to FFFH. Then, the A/D coverted value gradually decreases. Besides, if the beam passing position becomes close to the center of the sensor pattern SC, the output of the differential amplifier B-C takes a maximum negative value, and the A/D coverted value becomes 800H.

When the beam passing position deviates toward the sensor pattern SD, the output of the differential amplifier B-C has a smaller negative value, and the A/D coverted value increases from 800H. At last, the A/D coverted value varies from FFFH to 000H. The reason is that the beam passing position deviates toward the sensor pattern SD (SE) side excessively and neither the sensor pattern SB nor SC is able to detect the passing of the beam, so that both outputs from the sensor patterns SB and SC become zero and no difference arises therebetween.

The control characteristics of the galvanomirror 33 will now be described.

Figure 10:
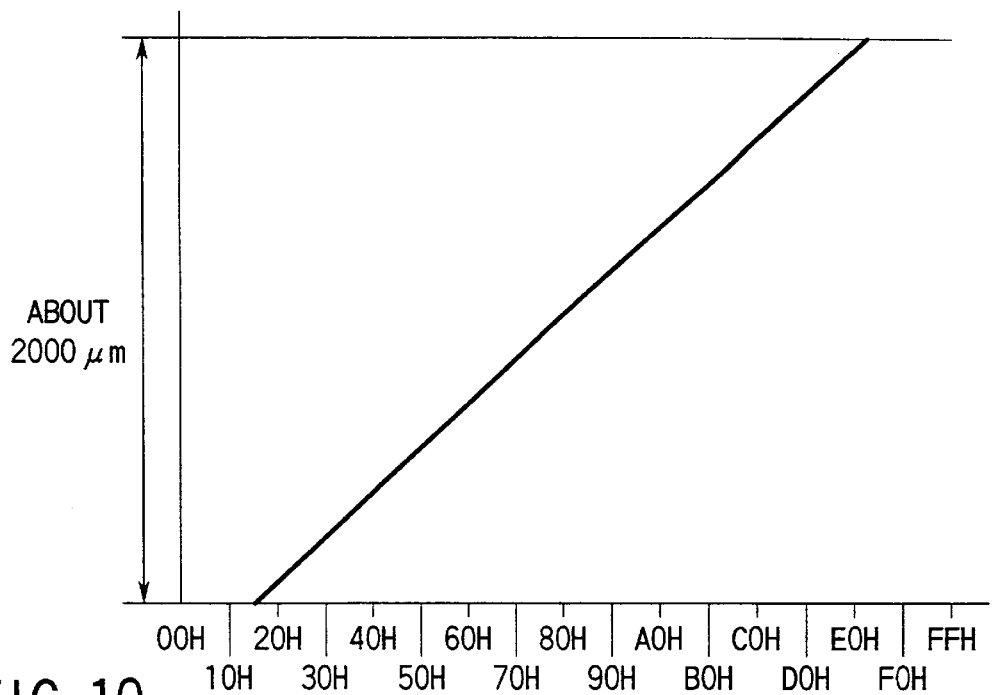
FIG. 10 is a graph for explaining the operational resolution of a galvanomirror.
Figure 11:
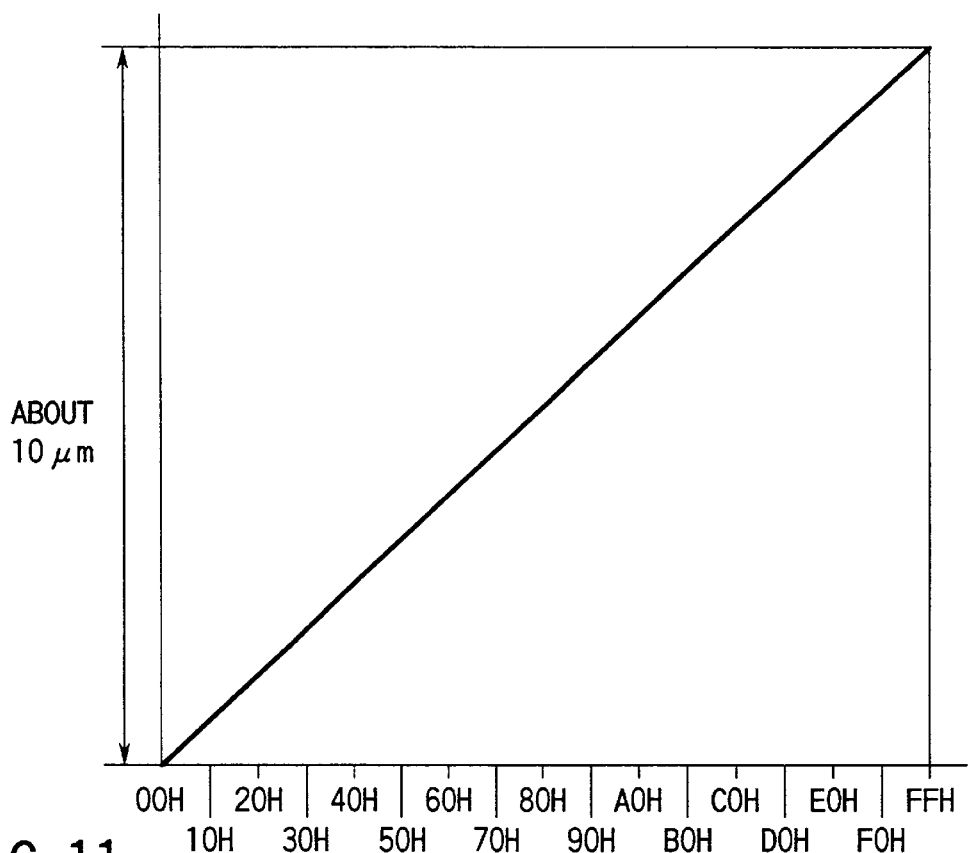
FIG. 11 is a graph for explaining the operational resolution of the galvanomirror.

FIGS. 10 and 11 show the relationship between the data delivered to the galvanomirror drive circuits 39a to 39d and the beam passing positions on the beam position detector 38 (i.e., on the photosensitive drum 15). As shown in FIG. 7, the input signals to the D/A converters 45a to 45d of the galvanomirror drive circuits 39a to 39d have 16-bit construction.

FIG. 10 shows the state of variation of the beam passing position, which is associated with the upper 8 bits of the input 16-bit signal. As shown in FIG. 10, the beam passing position varies in the range of 2,000 μm (2 mm) in relation to data 00H to FFH. The inputs near 00H and FFH are out of the range of responsivity of the galvanomirror, and the beam passing position is unchanged.

However, in the range of inputs between 18H and E8H, the beam passing position varies substantially linearly in relation to these inputs. As to the ratio of variation, 1LSB corresponds to a distance of about 10 μm.

FIG. 11 shows the state of variation of the beam passing position, which is associated with the lower 8 bit of the input 16-bit signal to the D/A converters 45a to 45d of the galvanomirror drive circuits 39a to 39d. It should be noted that FIG. 11 shows the state of variation of the beam passing position, which is associated with the lower 8 bit, in the case where the value of the range, within which the beam passing position linearly varies, is input as the upper 8 bit. As is clear from the figure, the beam passing position varies within the range of about 10 μm in relation to data between 00H and FFH in association with the lower 8 bit. 1LSB corresponds to 0.04 μm.

In this manner, the main control unit 51 delivers 16-bit data to the galvanomirror drive circuits 39a to 39d. Thereby, the beam passing position on the beam position detector 38 or the photosensitive drum 15 can be moved with the resolution of about 0.04 μm within the range of about 2,000 μm (2 mm).

Figure 12:
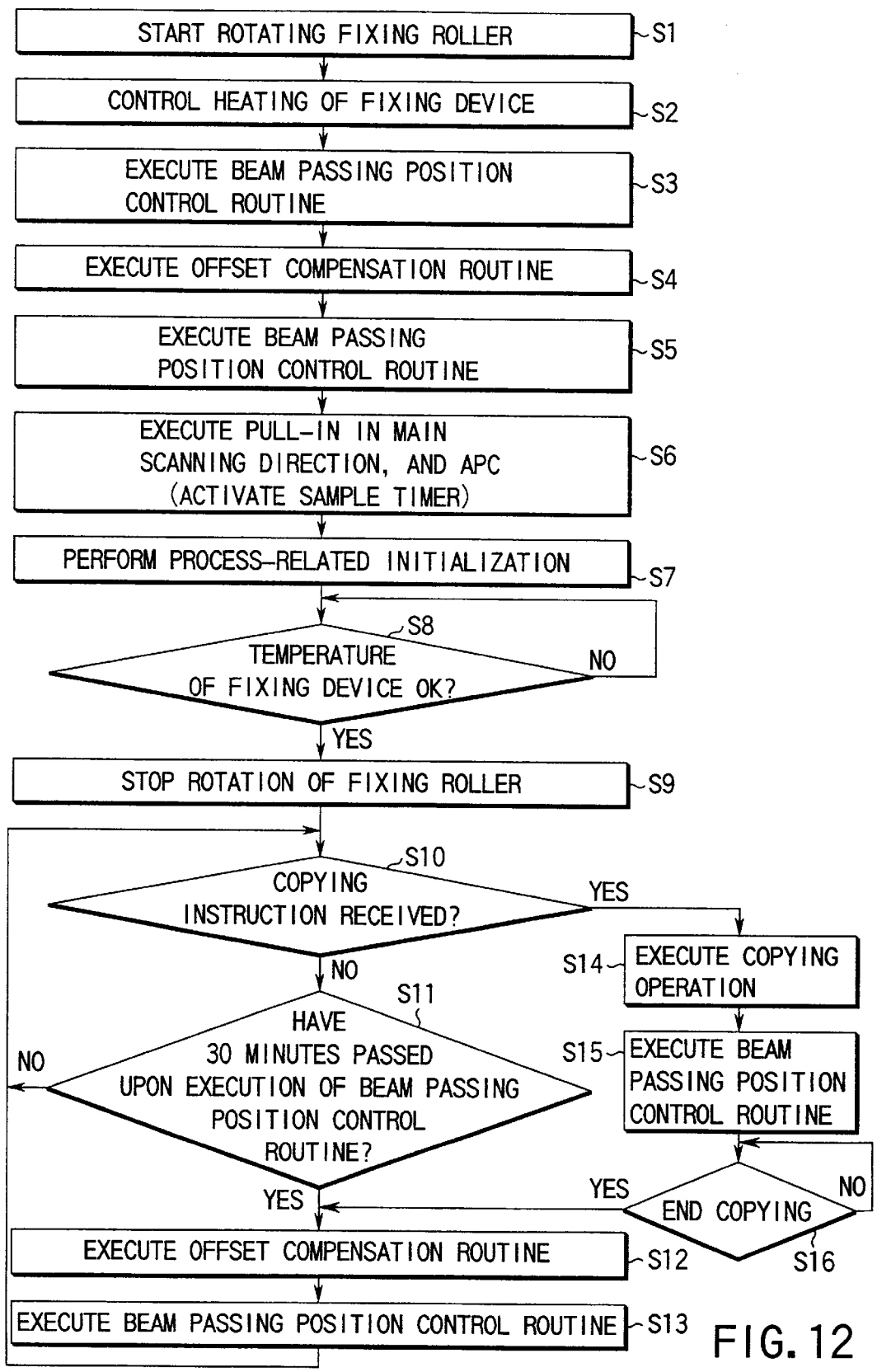
FIG. 12 is a flow chart for explaining a schematic operation upon powering on a printer unit.

The operation of the printer unit 2 at the time of power on will now be generally described with reference to a flow chart in FIG. 12. A description of the scanner unit 1 will be omitted.

When the copying machine is switched on, the main control unit 51 rotates the fixing rollers in the fixing device 26 and starts the heating control for the fixing device 26 (S1 and S2). The beam passing position control routine in the sub-scanning direction is executed, and the beam passing position is controlled at a predetermined position (S3).

If the beam passing position is controlled correctly, the offset compensation routine is executed to detect the offset value of the beam detector output processor 40 and perform compensation (S4). Then, the beam passing position control routine is executed again (S5).

Pull-in in the main scanning direction is carried out to perform APC (Auto-Power Control) in a hardware structure so as to simultaneously emit each light beam with a desired power (S6). The photosensitive drum 15 is rotated, and process-related initialization is effected so as to regulate the conditions of, e.g., the surface of the photosensitive drum 15 (S7).

After the series of initialization steps have been completed, the fixing rollers are kept rotating until the temperature of the fixing device 26 rises up to a predetermined level, and the copying machine is set in the standby state (S8). When the temperature of the fixing device 26 has reached the predetermined level, the rotation of the fixing rollers are stopped (S9), and a copying instruction is awaited (S10).

When no copying (printing) instruction is sent through the control panel 53 in the copying instruction wait state (S10), after the beam passing position control routine is executed, e.g., after 30 minutes have passed (S11), the offset compensation routine is automatically executed (S12), and the beam passing position control routine is executed again (S13). Thereafter, the flow returns to step S10, and the copying machine waits for a copying instruction again.

When a copying instruction is sent through the control panel 53 in the copying instruction standby state (S10), a copying operation is carried out (S14). The beam passing position control routine is executed again (S15), and the flow stands by until the copying is complete (S16). Upon completion of the copying, the flow shifts to step S12 to repeatedly perform the above operation.

The beam passing position control routine in steps S3, S5, S13, and S15 in FIG. 12 will now be generally described with reference to a flow chart shown in FIG. 13.

At first, the main control unit 51 activates the polygon motor 36 and rotates the polygon mirror 35 at a predetermined rotational speed (S20). The main control unit 51 reads out from the memory 52 the latest drive values of the galvanomirrors 33a to 33d, and drives the galvanomirrors 33a to 33d on the basis of these values (S21).

Then, the main control unit 51 controls the passing position of the beam a (S22). In this control, the passing position of the light beam a is detected, and it is determined whether the passing position is within a prescribed value range. If the detected passing position is not within the prescribed value range, the angle of the galvanomirror 33a is altered. If the detected passing position is within the prescribed value range, a flag indicating that the passing position of the beam a is within the prescribed value range is set.

Subsequently, the main control unit 51 detects the passing positions of the light beams b, c, and d, like the beam a, and determines whether each of the passing positions of these beams is within the prescribed value range. If the passing positions are not within the prescribed value range, the associated galvanomirrors 33b to 33d are altered. If the detected passing positions are within the prescribed value range, flags indicating that the passing positions of the beams are within the prescribed value range are set (S23, S24, and S25).

After the passing positions of the beams a, b, C, and d are controlled, the main control unit 51 examines the flags and determines whether the beam passing position control should be finished (S26). Specifically, if all flags are set, the beam position control is finished. If any one of the flags is not set, the control returns to step S22 and the passing position control of each light beam is performed.

The operations of galvanomirrors 33a to 33d in the above control flow will now be described in brief.

As has been described above, the angles of the galvanomirrors 33a to 33d are altered on the basis of the control values supplied from the main control unit 51, thereby varying the passing positions of the scanning beams. However, the angles of the galvanomirrors are not necessarily controlled immediately in response to the instructions from the main control unit 51. Specifically, a time period on the order of "ns" or "μs" is needed from the time the control data is output from the main control unit 51, latched in the latches 44a to 44d, and D/A-converted by the D/A converters 45a to 45d, to the time drive signals proportional to the magnitude of the D/A-converted data are output from the drivers 46a to 46d. On the other hand, the response time of the galvanomirrors 33a to 33d used in, e.g., this embodiment is on the order of 4–5 ms.

In this context, the response time refers to a time period from the time the angles of the galvanomirrors 33a to 33d begin to be varied by a new drive signals and moved (oscillated), to the time the movement (oscillation) is stopped and the galvanomirrors rest at the new angles. Thus, in order for the main control unit 51 to confirm the control result after new control data is delivered to the galvanomirrors 33a to 33d, the main control unit 51 needs to confirm the beam passing position after at least the response time.

Figure 13:
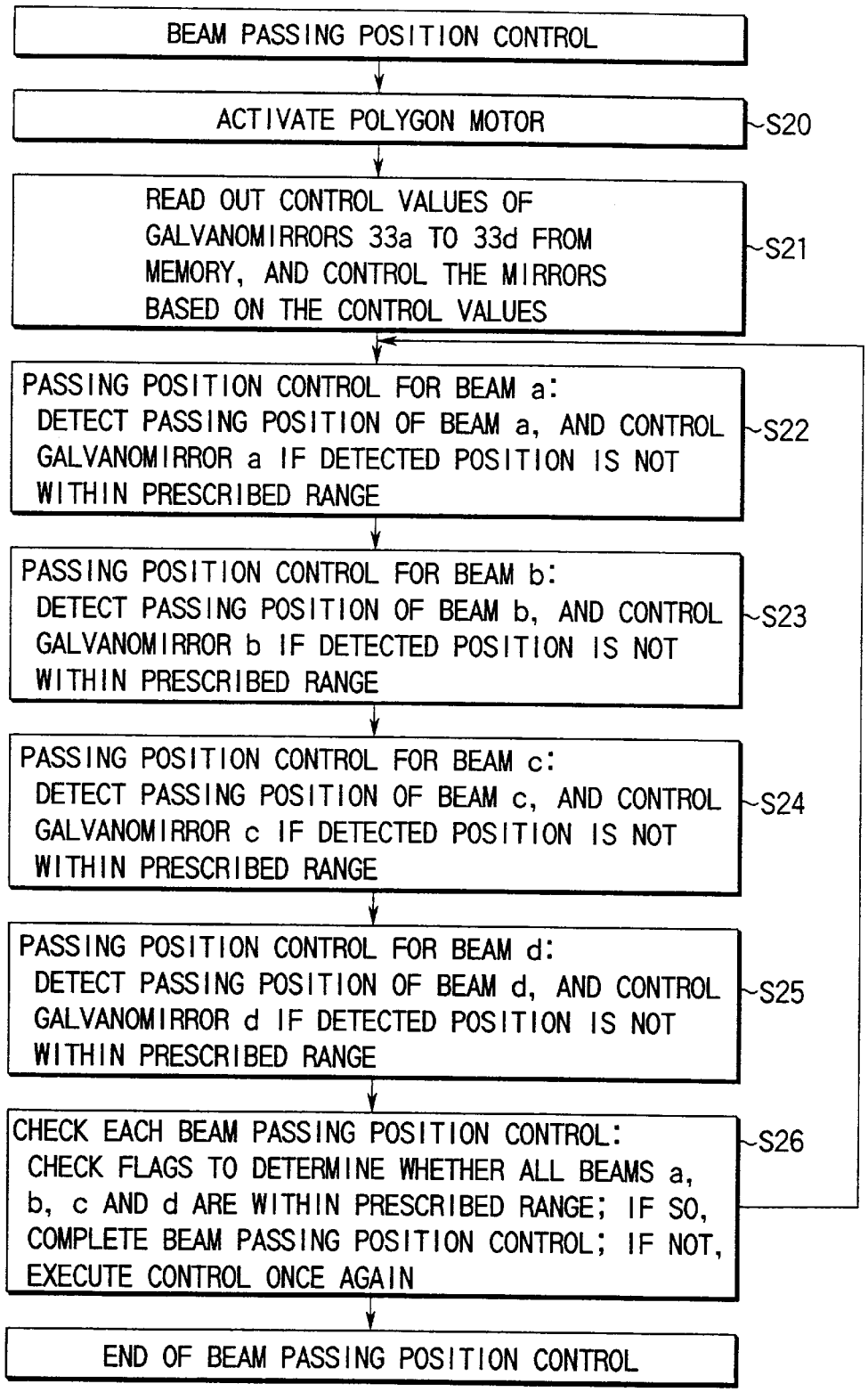
FIG. 13 is a flow chart for explaining a beam passing position control routine.

As is apparent from FIG. 13, in this embodiment, the control effects of a given galvanomirror are confirmed after another beam position is detected or another galvanomirror is controlled. The effects are confirmed after the lapse of a sufficient time required for the galvanomirror to respond.

When the time needed for a single scan operation is 330 μm, a time of 2.64 ms is required to acquire outputs from at least one amplifier or differential amplifier with respect to all surfaces (e.g., eight surfaces) of the polygon mirror 35 in steps S21, S22, S23, and S24. Accordingly, after a certain galvanomirror is controlled, and the passing positions of the three beams detected, at least a time interval of 7.92 ms is required to confirm the effects. The beam passing position can be confirmed after the movement (oscillation) of the galvanomirror is already stopped. Outputs of the amplifier or differential amplifier are acquired for all the surfaces of the polygon mirror 35 in order to prevent inclination of the surfaces of the polygon mirror 35.

Figure 14:
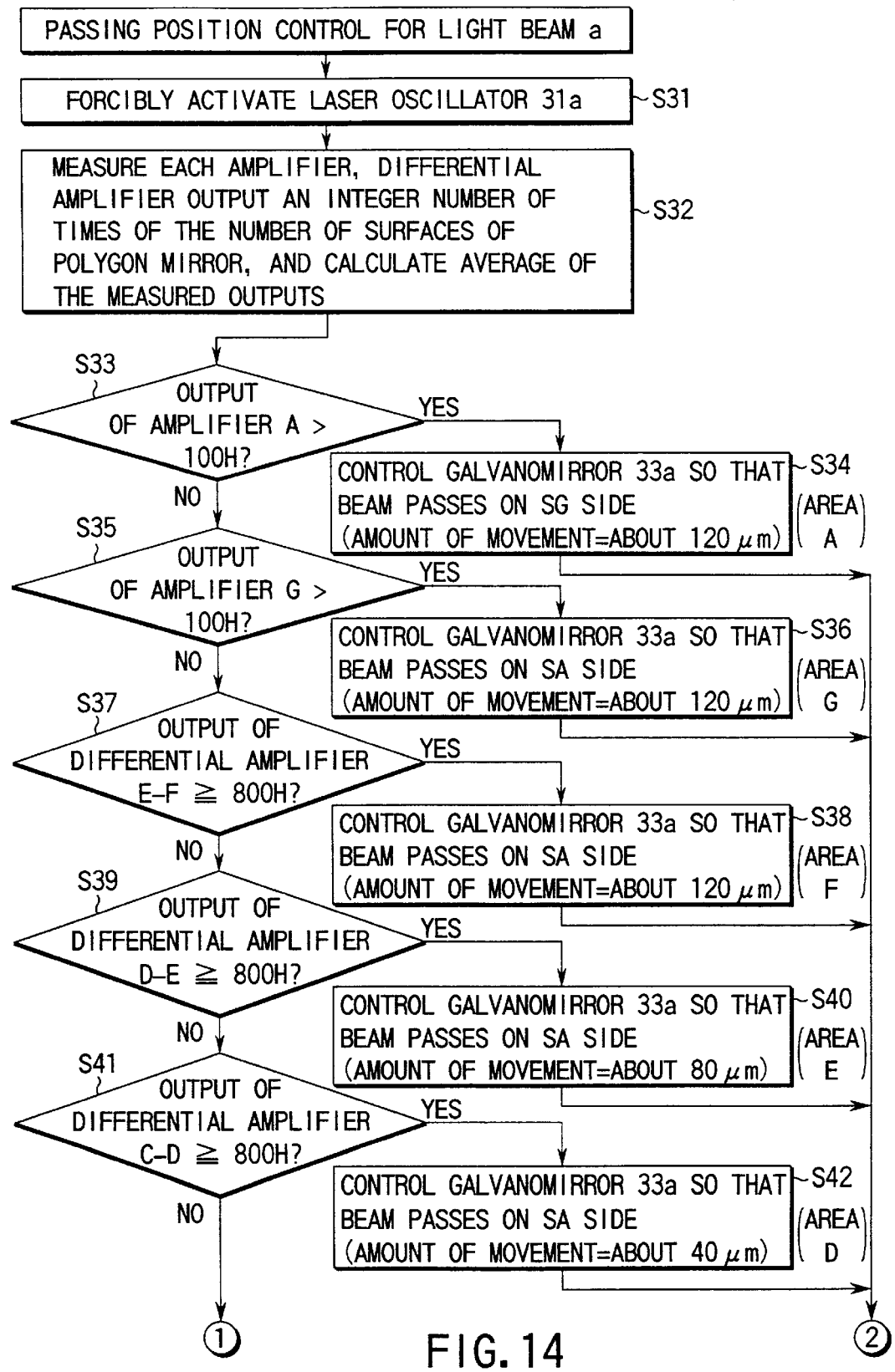
FIG. 14 is a flow chart for explaining the beam passing position control routine.
Figure 15:
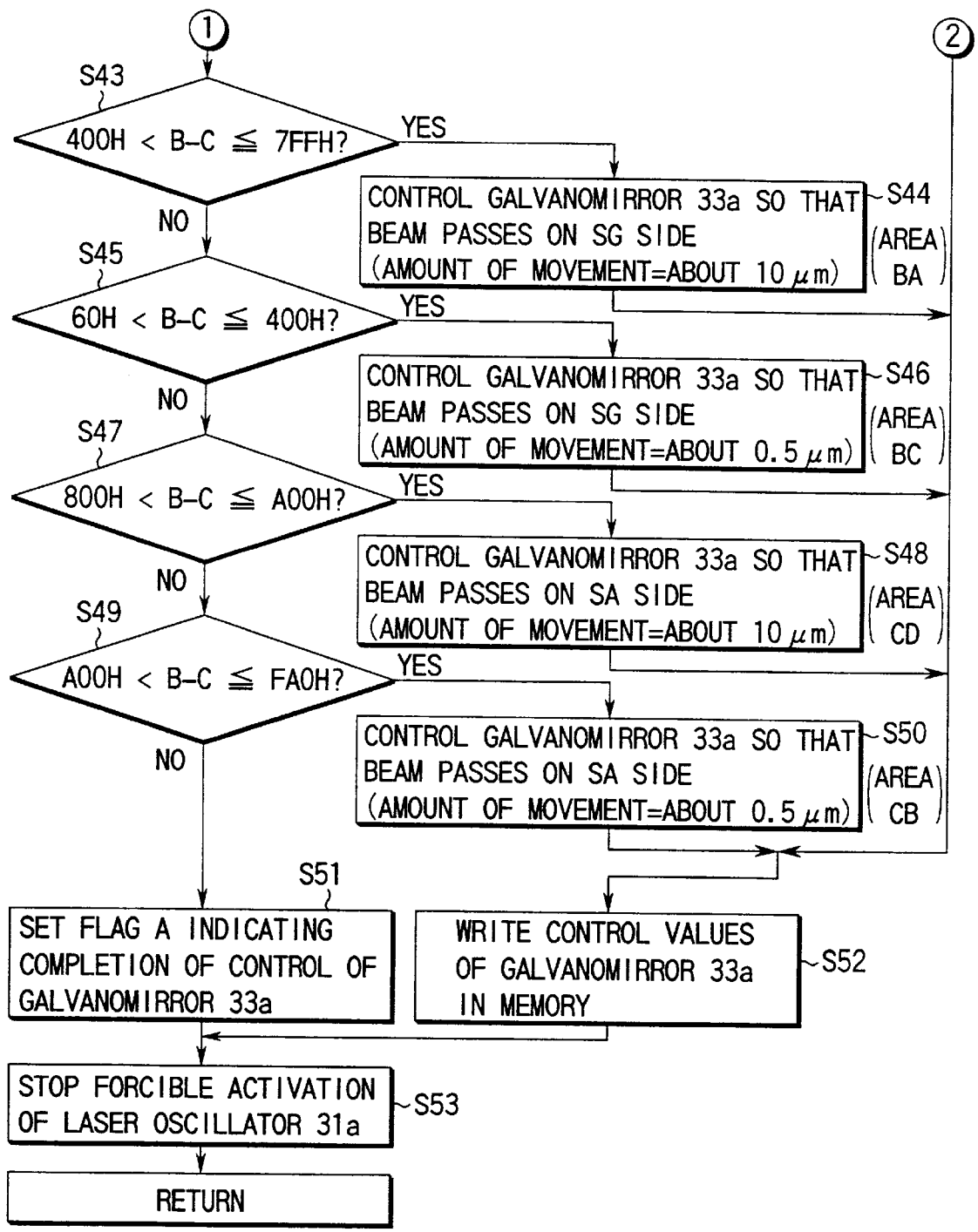
FIG. 15 is a flow chart for explaining the beam passing position control routine.

FIGS. 14 and 15 are flow charts for explaining in detail the operations in step S22 in FIG. 13. That is, FIGS. 14 and 15 are flow charts for explaining the passing position control of the light beam a. As has been described above, FIG. 9 shows the relationship between the beam passing position and the output from the A/D converter 43. Thus, FIG. 9 will also be referred to.

At first, the main control unit 51 forcibly activates the laser oscillator 31a to emit light (S31). Thereby, the light beam a is made to cyclically scan over the beam position detector 38 by the rotation of the polygon mirror 35.

The main control unit 51 then reads A/D coverted values of the outputs from each amplifier and differential amplifier in accordance with interrupt signals INT output from the A/D converter 43. In general, the scan positions of light beams slightly vary, depending on the respective surfaces of the polygon mirror 35, because of inclinations of the surfaces. In order to eliminate the influence of the inclinations of the surfaces of the polygon mirror 35, it is desirable to read A/D coverted values a number of times corresponding to the number of surfaces of polygon mirror 35 or an integer number of times of the number of surfaces of polygon mirror 35. The main control unit 51 averages output values from the A/D converter 43 corresponding to the respective amplifiers and differential amplifiers, and recognizes the averaged result as the outputs of the amplifiers and differential amplifiers (S32).

Accordingly, if the values from the A/D converter 43 are read a number of times corresponding to the number (8) of surfaces of the polygon mirror 35 with respect to the amplifiers 61 and 62 (A and G) and the differential amplifiers 63 to 66 (B-C, C-D, D-E, and E-F), it is necessary to make the light beams scan 48 times.

The main control unit 51 compares the obtained output (A/D coverted value) from the amplifier 61 (A) with the determination reference value 100H stored in the memory 52 in advance to determine whether the output from the amplifier 61 is greater than the determination reference value 100H (S33).

If it is determined that the output from the amplifier 61 is greater than 100H, it is found that the passing position of the beam a is on the sensor pattern SA or closest to the sensor pattern SA. In other words, it is found that the light beam a passes over the area A in FIG. 9. Since the target passing position of the beam a is at the middle between the sensor patterns SB and SC, the galvanomirror 33a is controlled so that the light beam a may pass on the sensor pattern SG side (S34).

The control amount (the amount of movement of the beam) in this case is set at about 120 μm. The reason is that the sensor patterns SA and SG are large patterns located on both sides of the area of control target points, as described with reference to FIGS. 3 and 4, and the beam passing position needs to be altered to a relatively great degree while the beam is passing over these sensor patterns, in order to approach the beam passing position to the target point as quickly as possible. Even when the output of the amplifier 61 is greater than 100H, if the light beam a is passing over a point near the sensor pattern SB, the beam passing position may be altered excessively. However, in consideration of the total efficiency, the amount of movement of such a degree is necessary.

If it is determined in step S33 that the output from the amplifier 61 is not greater than 100H, the output (A/D coverted value) from the amplifier 62 (G) is compared with the determination reference value 100H stored in the memory 52 in advance to determine whether the output from the amplifier 62 is greater than the determination reference value 100H (S35).

If it is determined that the output from the amplifier 62 is greater than 100H, it is found that the passing position of the beam a is on the sensor pattern SG or closest to the sensor pattern SG. In other words, it is found that the light beam a passes over the area G in FIG. 9. In this case, the galvanomirror 33a is controlled so that the light beam a may pass on the sensor pattern SA side and may approach the middle point between the sensor patterns SB and SC, which is the target passing position of the beam a (S36). The control amount (amount of movement) in this case needs to be about 120 μm, like the control in step S34.

If it is determined in step S3S that the output from the amplifier 62 is not greater than 100H, the output (A/D coverted value) from the differential amplifier 66 (E-F) is compared with the determination reference value 800H stored in the memory 52 in advance to determine whether the output from the differential amplifier 66 is greater than the determination reference value 800H (S37).

If it is determined that the output from the differential amplifier 66 is 800H or more, it is found that the passing position of the beam a is near the sensor pattern SF. In other words, it is found that the light beam a passes over the area F in FIG. 9. In this case, the galvanomirror 33a is controlled so that the light beam a may pass on the sensor pattern SA side and may approach the middle point between the sensor patterns SB and SC, which is the target passing position of the beam a (S38). The control amount (amount of movement) in this case needs to be about 120 μm, in consideration of the distance between the target point and the area F.

If it is determined in step S37 that the output from the differential amplifier 66 is not greater than 800H, the output (A/D coverted value) from the differential amplifier 65 (D-E) is compared with the determination reference value 800H stored in the memory 52 in advance to determine whether the output from the differential amplifier 65 is greater than the determination reference value 800H (S39).

If it is determined that the output from the differential amplifier 65 is 800H or more, it is found that the passing position of the beam a is near the sensor pattern SE. In other words, it is found that the light beam a passes over the area E in FIG. 9. In this case, the galvanomirror 33a is controlled so that the light beam a may pass on the sensor pattern SA side and may approach the middle point between the sensor patterns SB and SC, which is the target passing position of the beam a (S40). The control amount (amount of movement) in this case needs to be about 80μm, in consideration of the distance between the target point and the area E.

If it is determined in step S39 that the output from the differential amplifier 65 is not greater than 800H, the output (A/D coverted value) from the differential amplifier 64 (C-D) is compared with the determination reference value 800H stored in the memory 52 in advance to determine whether the output from the differential amplifier 64 is greater than the determination reference value 800H (S41).

If it is determined that the output from the differential amplifier 64 is 800H or more, it is found that the passing position of the beam a is near the sensor pattern SD. In other words, it is found that the light beam a passes over the area D in FIG. 9. In this case, the galvanomirror 33a is controlled so that the light beam a may pass on the sensor pattern SA side and may approach the middle point between the sensor patterns SB and SC, which is the target passing position of the beam a (S42). The control amount (amount of movement) in this case needs to be about 40μm, in consideration of the distance between the target point and the area D.

If it is determined in step S41 that the output from the differential amplifier 64 is not greater than 800H, the output (A/D coverted value) from the differential amplifier 63 (B-C) is compared with the determination reference values 400H and 7FFH stored in the memory 52 in advance to determine whether the output from the differential amplifier 63 is greater than the determination reference value 400H and is 7FFH or less (S43).

If it is determined that the output from the differential amplifier 63 is greater than 400H and is 7FFH or less, it is found that the passing position of the beam a is near the middle point between the sensor patterns SB and SC, which is the target passing position, but slightly deviates towards the sensor pattern SB. In other words, it is found that the light beam a passes over the area BA of the area B in FIG. 9. In this case, the galvanomirror 33a is controlled so that the light beam a may pass on the sensor pattern SG side and may approach the middle point between the sensor patterns SB and SC, which is the target passing position of the beam a (S44). The control amount (amount of movement) in this case needs to be about 10 μm, in consideration of the distance between the target point and the area D.

If it is determined in step S43 that the output from the differential amplifier 63 is not greater than 400H and is not 7FFH or less, the output from the differential amplifier 63 is compared with the determination reference values 60H and 400H stored in the memory 52 in advance to determine whether the output from the differential amplifier 63 is greater than the determination reference value 60H and is 400H or less (S45).

If it is determined that the output from the differential amplifier 63 is greater than 60H and is 400H or less, it is found that the passing position of the beam a is near the middle point between the sensor patterns SB and SC, which is the target passing position, but slightly deviates towards the sensor pattern SB. In other words, it is found that the light beam a passes over the area BC of the area B in FIG. 9. In this case, the galvanomirror 33a is controlled so that the light beam a may pass on the sensor pattern SG side and may approach the middle point between the sensor patterns SB and SC, which is the target passing position of the beam a (S46). The control amount (amount of movement) in this case needs to be about 0.5 μm, in consideration of the distance between the target point and the area D.

If it is determined in step S45 that the output from the differential amplifier 63 is not greater than 60H and is not 400H or less, the output from the differential amplifier 63 is compared with the determination reference values 800H and A00H stored in the memory 52 in advance to determine whether the output from the differential amplifier 63 is the determination reference value 800H or more and is smaller than A00H (S47).

If it is determined that the output from the differential amplifier 63 is 800H or more and is smaller than A00H, it is found that the passing position of the beam a is near the middle point between the sensor patterns SB and SC, which is the target passing position, but slightly deviates towards the sensor pattern SC. In other words, it is found that the light beam a passes over the area CD of the area C in FIG. 9. In this case, the galvanomirror 33a is controlled so that the light beam a may pass on the sensor pattern SA side and may approach the middle point between the sensor patterns SB and SC, which is the target passing position of the beam a (S48). The control amount (amount of movement) in this case needs to be about 10 μm, in consideration of the distance between the target point and the area CD.

If it is determined in step S47 that the output from the differential amplifier 63 is not 800H or more and is not smaller than A00H, the output from the differential amplifier 63 is compared with the determination reference values A00H and FA0H stored in the memory 52 in advance to determine whether the output from the differential amplifier 63 is the determination reference value A00H or more and is smaller than FA0H (S49).

If it is determined that the output from the differential amplifier 63 is A00H or more and is smaller than FA0H, it is found that the passing position of the beam a is near the middle point between the sensor patterns SB and SC, which is the target passing position, but slightly deviates towards the sensor pattern SC. In other words, it is found that the light beam a passes over the area CB of the area C in FIG. 9. In this case, the galvanomirror 33a is controlled so that the light beam a may pass on the sensor pattern SA side and may approach the middle point between the sensor patterns SB and SC, which is the target passing position of the beam a (S50). The control amount (amount of movement) in this case needs to be about 0.5 μm, in consideration of the distance between the target point and the area CB.

When it is determined in step S49 that the output from the differential amplifier 63 is neither A00H or more nor smaller than FA0H, it is found that the passing position of the beam a is within the prescribed range (±1 μm from the target point). Thus, the main control unit 51 sets the control completion flag A for the galvanomirror 33a (S51).

When the light beam a does not pass within the range of ±1 μm from the ideal passing point (steps S34, S36, S38, S40, S42, S44, S46, S48, and S50), the main control unit 51 controls the galvanomirror 33a by a predetermined amount and writes the control amount in the memory 52 (S52).

As has been described above, the main control unit 51 sets the control completion flag A for the galvanomirror 33a when the beam a passes within the range of ±1 μm from the ideal passing point. When the beam a does not pass within the range of ±1 μm from the ideal passing point, the main control unit 51 sets the galvanomirror control amount in accordance with the beam passing position (area) and writes the control amount in the memory 52.

Then, the main control unit 51 stops the forcible activation of the laser oscillator 31a and completes the series of the control operations for the passing position of the beam a (S53).

As has already been described with reference to FIG. 13, when the control completion flag A for the galvanomirror 33a is not set, the passing position control routine for the beam a is executed once again. In other words, this routine is repeated until the beam a passes within the range of ±1 μm from the ideal passing point.

The above description is related to control of the light beam a. Control of the light beams b, c, and d is basically the same as that of the light beam a. After the main control unit 51 forcibly activates the corresponding laser oscillators 31b to 31d to emit light beams, outputs from the amplifiers 61, 62 and the differential amplifiers 63 to 66 are determined. When each beam passes within the range of ±1 μm from the ideal control point, control completion flags B to D for the galvanomirrors 33b to 33d are set. When each beam does not pass within this range, the main control unit 51 determines passing areas of the light beams b to d, controls the galvanomirrors 33b to 33d in accordance with the passing areas, and writes the control values in the memory 52.

According to the above-described embodiment, the beam position detector having the above-described sensor patterns is used. Thereby, the scan positions of the light beams can be exactly detected even if the precision in mounting angle of the beam position detector is not high.

In the digital copying machine using the multi-beam optical system, the passing positions of light beams are detected by the beam position detector situated on a level with the surface of the photosensitive drum. Based on the detected result, control amounts for optimally controlling the relative positions of the beams on the surface of the photosensitive drum are calculated. Based on the calculated control amounts, the galvanomirrors are controlled to alter the relative positions of the beams on the surface of the photosensitive drum. Thereby, the positional relationship among the light beams on the surface of the photosensitive drum can be optimally controlled with no particular precision or adjustment for the assembly of the optical system, even if some change occurs in the structure of the optical system due to a variation in ambience or a variation with the passing of time. Therefore, high image quality can be maintained at all times.

Detection and compensation of the offset value in the beam detector output processor 40, which are the most important parts of the present invention, will be described below.

Figure 16:
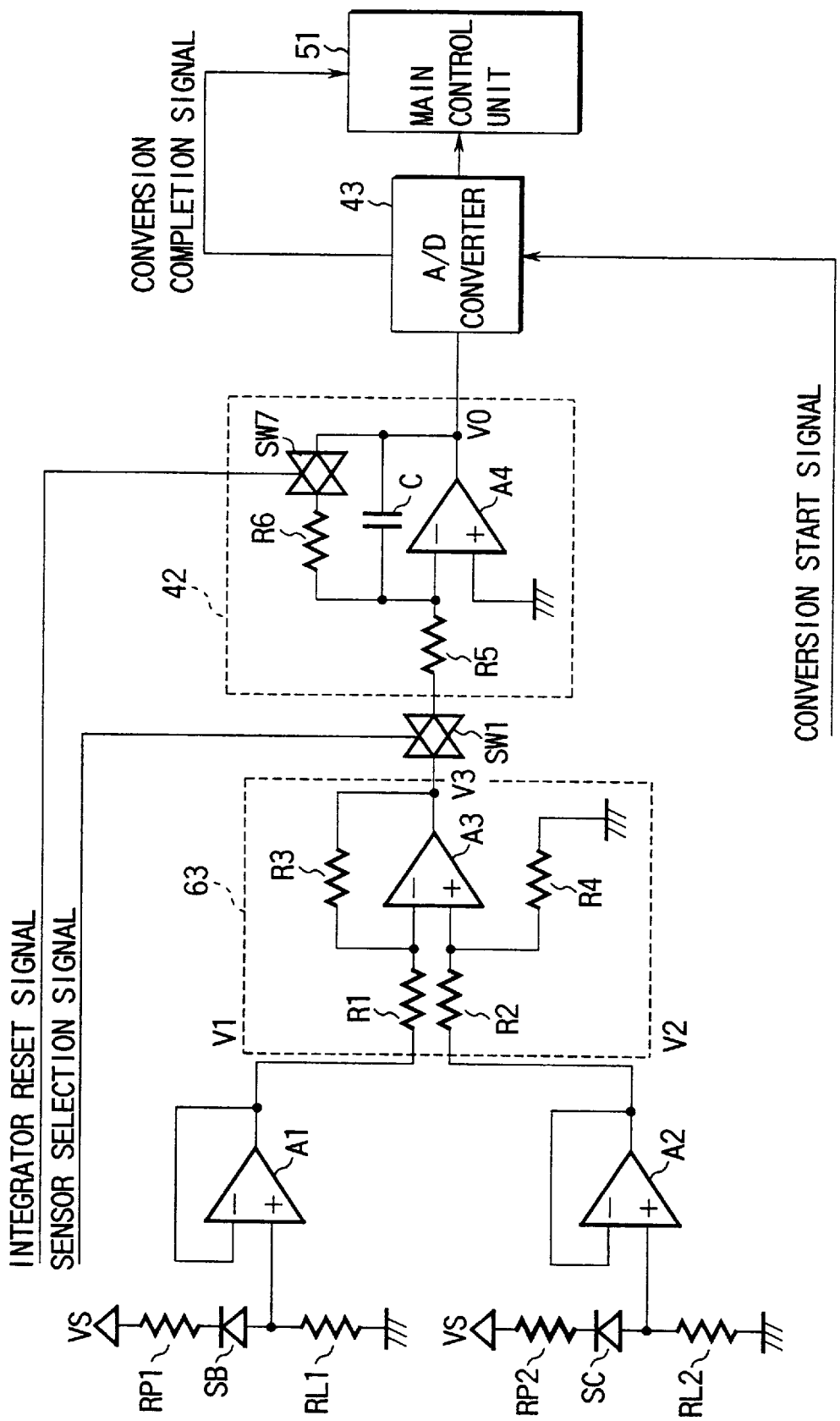
FIG. 16 is a circuit diagram showing a detailed example of a beam position detector output processor.

FIG. 16 shows a detailed example of the arrangement from the sensor patterns SB and SC to the integrator 42 in the beam detector output processor 40. In FIG. 16, currents flowing through the sensor patterns (photodiodes) SB and SC are respectively converted to voltages by resistors RP1, RL1, RP2, and RL2, then amplified by operational amplifiers A1 and A2 serving as voltage follower circuits, and sent to the differential amplifier 63. The differential amplifier 63 is constituted by resistors R1 to R4 and an operational amplifier A3.

An output from the differential amplifier 63 is sent to the integrator 42 via an analog switch SW1 included in the selection circuit 41. The integrator 42 is constituted by an operational amplifier A4, an integrating resistor R5, an integrating capacitor C, an integrator reset analog switch SW7, and a protective resistor R6. An output from the integrator 42 is sent to the A/D converter 43 to be converted from an analog signal to a digital signal. Upon completion of the A/D conversion, the A/D convertor 43 transmits a conversion completion signal to the main control unit 51. Upon reception of the conversion completion signal, the main control unit 51 reads the beam position information converted into the digital value.

An example of the arrangement from the sensor patterns SD, SE, and SF to the integrator 42 is also basically the same as the example of the arrangement from the sensor patterns SB and SC to the integrator 42, and a description thereof will be omitted.

The offset voltage (offset value) of the operational amplifier will be described with reference to FIGS. 17A and 17B.

Figure 17A:
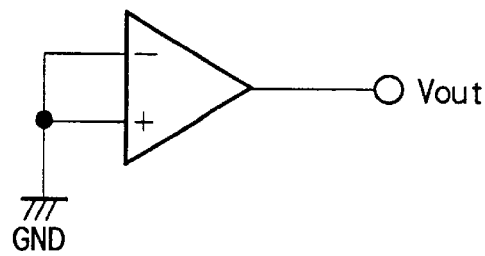
FIGS. 17A and 17B are views for explaining the offset voltage of an operational amplifier.

In FIG. 17A, an ideal operational amplifier does not send any output when a non-inverting input and an inverting input have no difference in voltage. In practice, however, even if the non-inverting input and the inverting input are connected to the ground potential (GND), and the voltage difference between these inputs is eliminated, an output voltage Vout is generated at the output terminal.

Figure 17B:
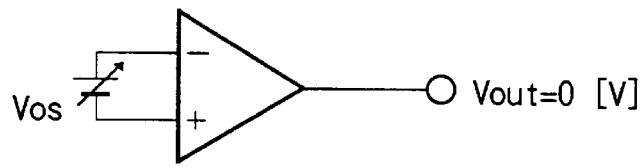

In FIG. 17B, a given voltage Vos is applied across the input terminals so as to set the output voltage Vout to 0 V. This voltage value is an input offset voltage Vos. The offset voltage Vout is mainly generated by variations in transistor characteristics of a differential input circuit in the operational a amplifier. The input offset voltage of a general operational amplifier is several mV at room temperature. The input offset voltage also varies depending on the temperature.

The influence and problem of the offset voltage of the operational amplifier with respect to beam passing position detection will be explained with reference to FIG. 18.

For example, when the passing position of the light beam a is the middle position between the sensor patterns SB and SC, outputs from the sensor patterns SB and SC are equal to each other (V1=V2).

Figure 18:
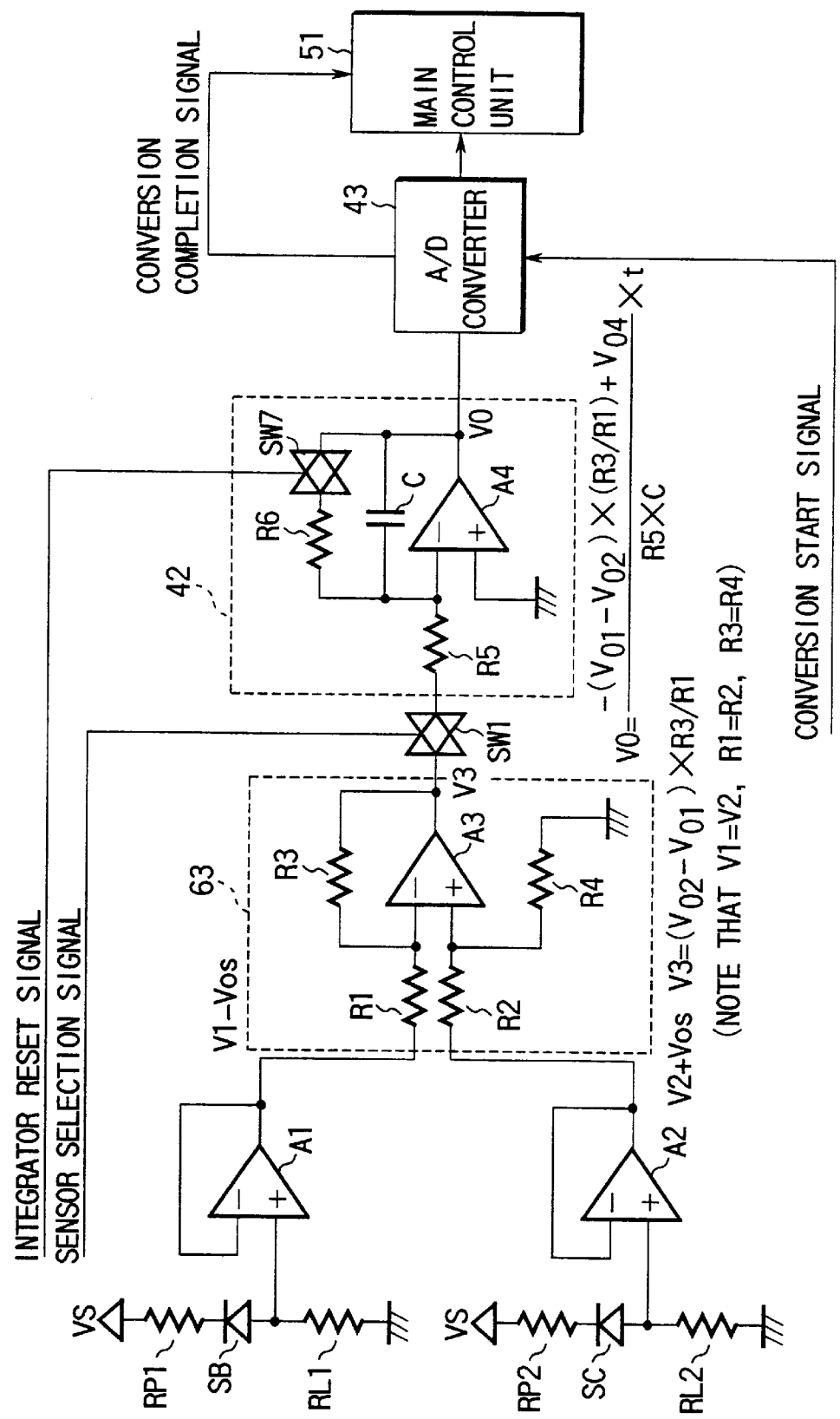
FIG. 18 is a circuit diagram for explaining the influence and problem of the offset voltage of the operational amplifier with respect to beam passing position detection.

Assume that the operational amplifiers A1 to A4 constituting the circuit of the beam detector output processor 40 shown in FIG. 18 have the following offset voltages:

Offset Voltage of Operational amplifier A1:−Vo1 [V]
Offset Voltage of Operational amplifier A2:+Vo2 [V]
Offset Voltage of Operational amplifier A3:+Vo3 [V]
Offset Voltage of Operational amplifier A4:+Vo4 [V]

Considering these offset voltages, outputs from the operational amplifiers are

Output from Operational amplifier A1: V1+Vo1 [V]
Output from Operational amplifier A2: V2+Vo2 [V]
Output from Operational amplifier A3: (Vo1−Vo2)×R3/R1
Output from Operational amplifier A4: −[(Vo1−Vo2)×(R3/R1)+Vo4]t/[R5×C×]
  where V1=V2
    R1=R2, R3=R4
    R5: integrating resistor
    C: integrating capacitor
    t: integrating time When the outputs from the sensor patterns SB and SC are equal to each other (V1=V2), an output from the operational amplifier A4 (integrator) is ideally 0 V. However, the output from the operational amplifier A4 is not "0" owing to the influence of the offset voltage of each operational amplifier. That is, even when the beam passing position is ideal, the beam detector output processor 40 outputs erroneous information indicating that the beam position deviates.

For example, when the constants are
Vo1=Vo2=Vo3=Vo4=5 mV
R2/R1=R4/R5=3

R5=200Ω
C=150 pF
t=406 ns (time required for the light beam to
pass between the sensor patterns S1 and S2) an integrated output is about 0.615V, which can be converted to beam position information of about 1.23 μm.

Offset detection/compensation according to the first embodiment will be described below.

In summary, as described above, in passing position detection control of detecting the beam passing position on the beam position detector 38, a difference between outputs from sensor patterns after the beam passes over the beam position detector 38 is calculated, and the result is integrated and A/D-converted to detect the beam passing position.

As has already been described above, the integration start and end timings of the integrator 42 are the timings of outputting signals from the sensor patterns S1 and S2. That is, when the beam is made by the polygon mirror 35 to scan, and passes over the sensor pattern S1, the integrator 42 is reset, and integration starts immediately after the reset. In addition, integration is complete when the beam passes over the sensor pattern S2, and at the same time A/D conversion starts.

The offset value of the beam detector output processor 40 is stationarily generated as far as the circuit is powered on. During the integration period from the start to end of integration, the offset value becomes an error factor of beam position information upon beam passing position detection processing. Therefore, if the offset value during the integration period can be measured, beam passing position control can be performed while considering the offset value (compensating the offset).

In this embodiment, the integration start and end timings of the integrator 42 are obtained using output signals from the sensor patterns S1 and S2. In this case, a correct offset value cannot be detected if the light beam is detected by the sensor patterns SB, SC, SD, SE, and SF.

By shifting the light beam to a region where the beam is not detected by the sensor patterns SB, SC, SD, SE, and SF, the offset value can be detected (measured) without changing the integration start/end timing.

Figure 19:
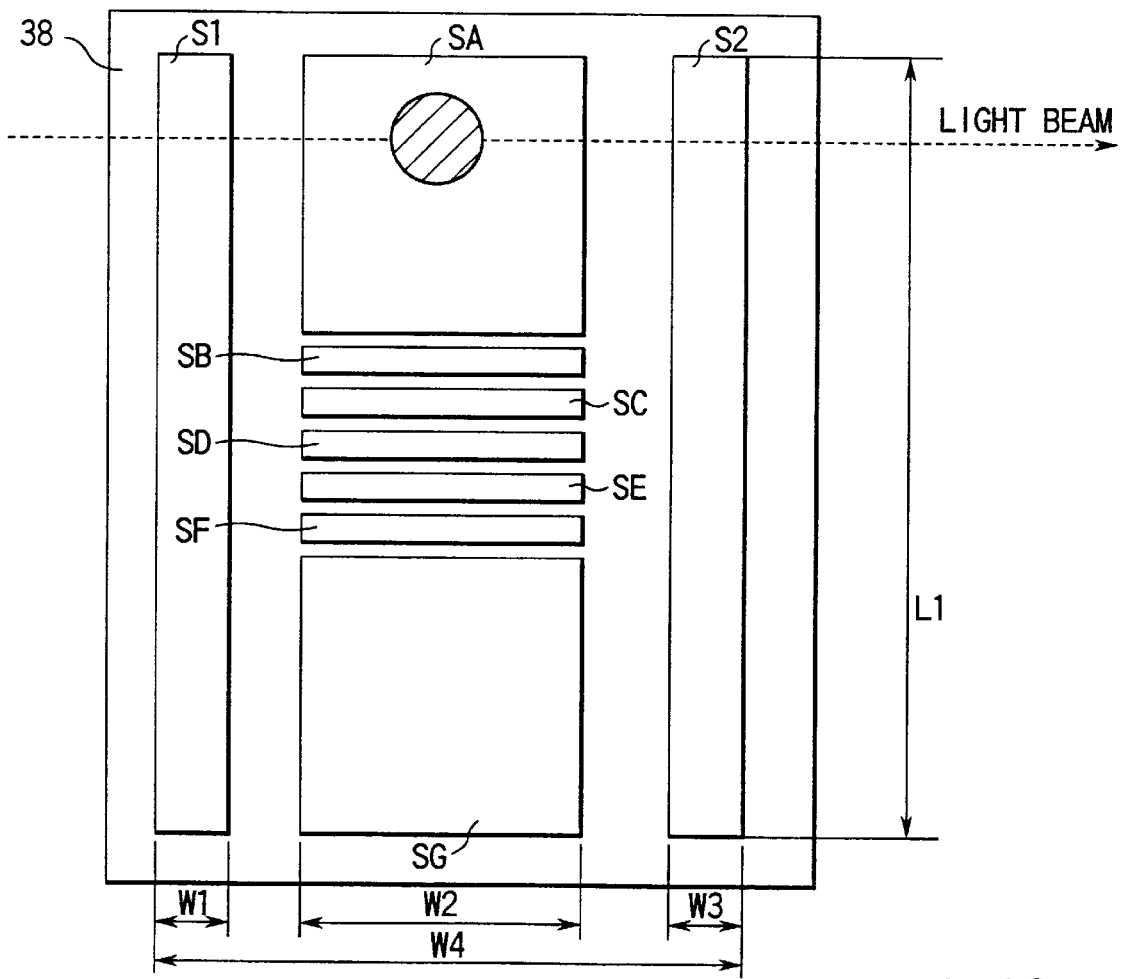
FIG. 19 is a view showing a state wherein the offset value is detected by shifting the position of a light beam to an undetectable region.

FIG. 19 is a view showing a state wherein the beam position is shifted to the sensor pattern SA, and the offset value is detected. In this manner, the offset value can be detected by integration while the light beam is not irradiated on the sensor patterns SB to SF.

The offset compensation routine will be explained with reference to flow charts in FIGS. 20 and 21.

The main control unit 51 activates the polygon motor 36 and rotates the polygon mirror 35 at a predetermined rotational speed (S61). The main control unit 51 reads out the previous drive values of the galvanomirrors 33a to 33d from the memory 52, and drives the galvanomirrors 33a to 33d on the basis of these values (S62).

Then, the main control unit 51 emits a light beam, and controls the galvanomirror 33a so as to shift the light beam a to an undetectable region of the beam position detection pattern (S63). In this control, the main control unit 51 grasps the current beam passing position, and controls the galvanomirror 33a so as to shift the light beam a to a region where the light beam a is not detected by the sensor patterns SB, SC, SD, SE, and SF.

Subsequently, the main control unit 51 detects the offset value of a beam passing position detector for the light beam a in the beam detector output processor 40 (offset detection; S64 and S65). Based on the detected offset value, the main control unit 51 executes offset compensation (offset compensation; S66).

The main control unit 51 sequentially carries out steps S67 to S78 to perform the same control: (shift a light beam to an undetectable region)→(offset detection)→(offset compensation) for the light beams b, c, and d.

Figure 22:
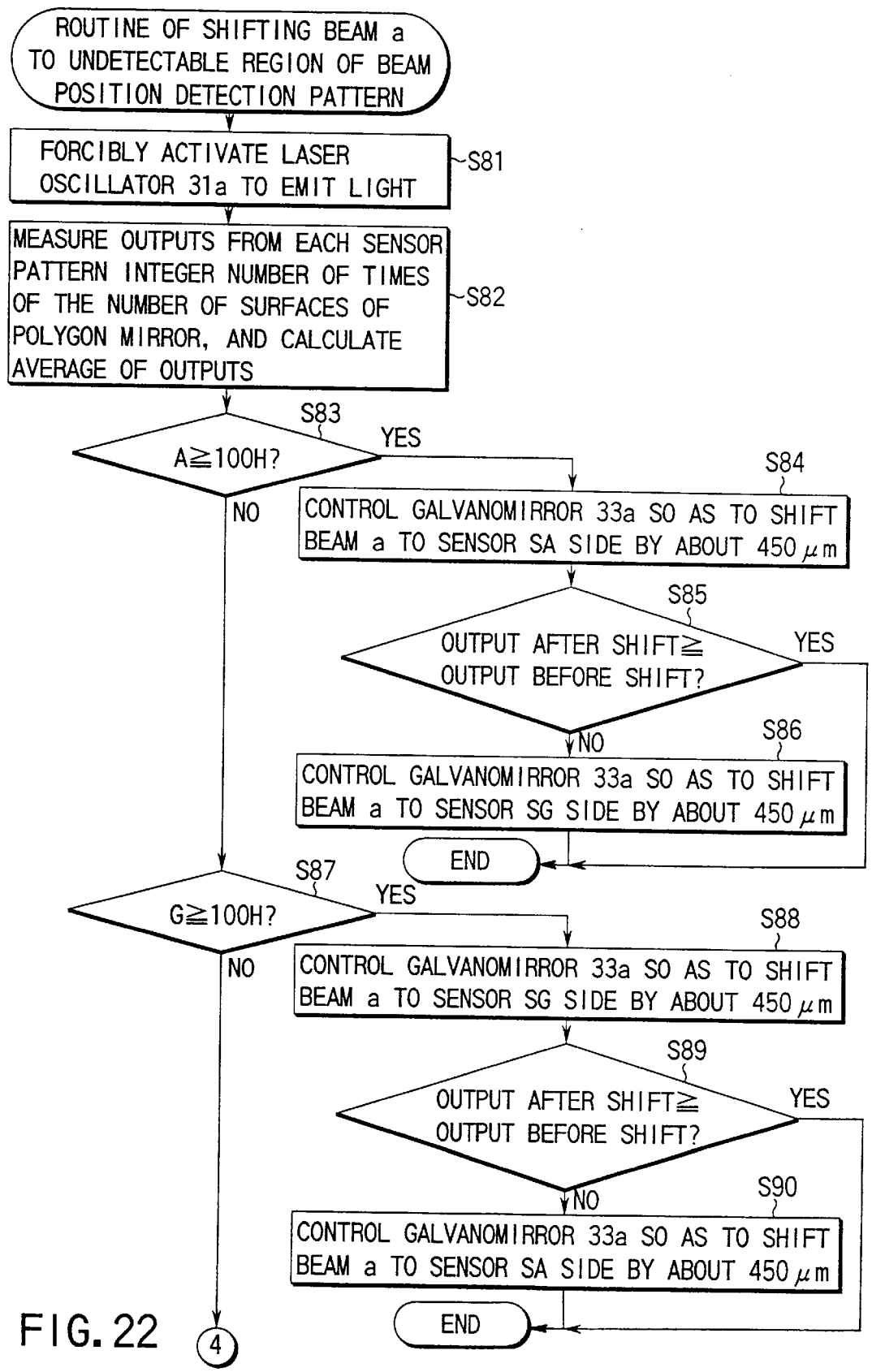
FIG. 22 is a flow chart for explaining a routine of shifting the light beam to the undetectable region according to the first embodiment.
Figure 23:
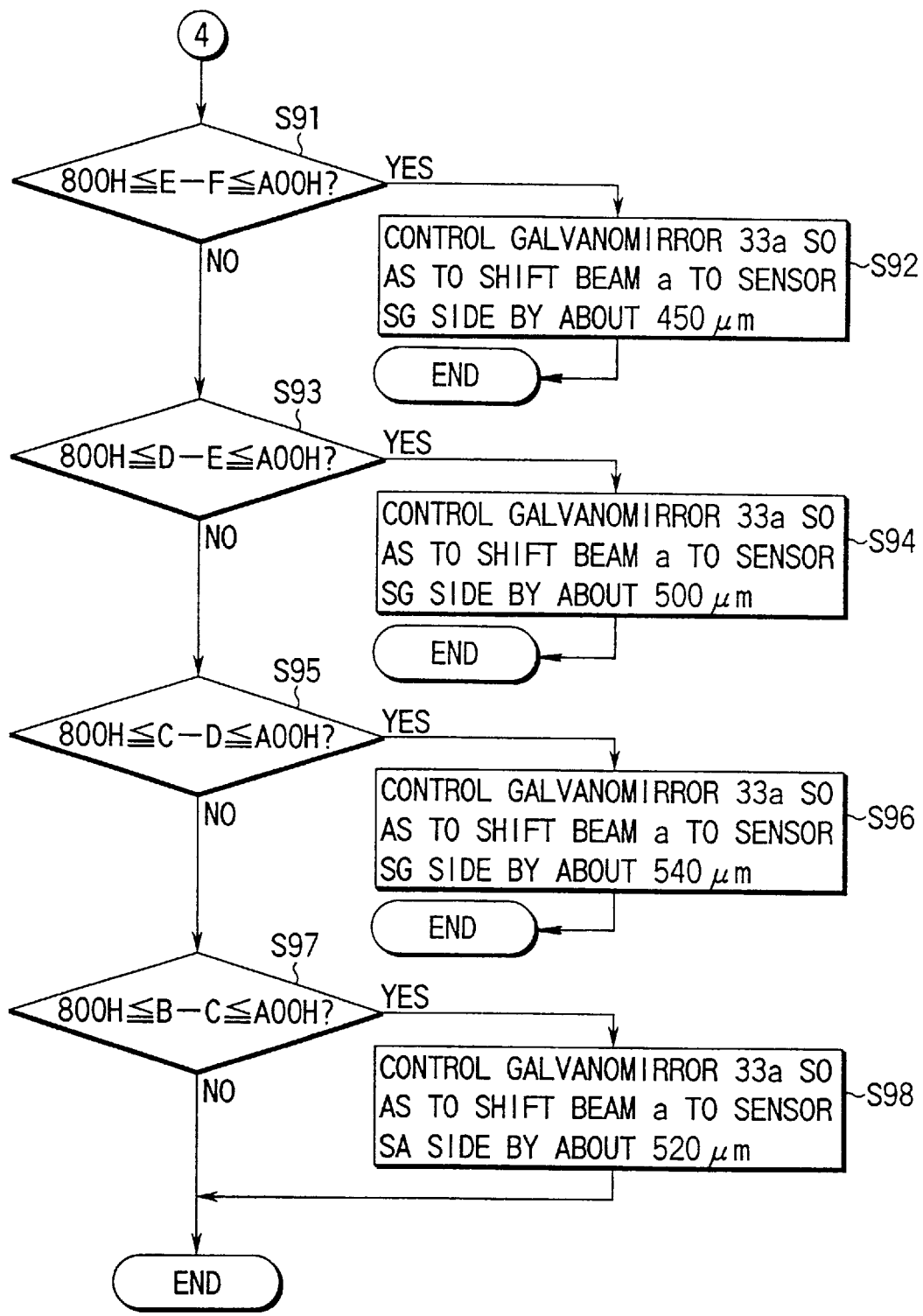
FIG. 23 is a flow chart for explaining the routine of shifting the light beam to the undetectable region according to the first embodiment.

A routine operation of shifting the light beam a to the undetectable region of the beam position detection pattern in step S63 of FIG. 20 will now be described with reference to flow charts shown in FIGS. 22 and 23.

The main control unit 51 forcibly activates only the laser oscillator 31a to emit a light beam (S81). Thereby, the light beam a is made to cyclically scan over the beam position detector 38 by the rotation of the polygon mirror 35.

The main control unit 51 then reads A/D-converted values of the outputs from the amplifiers 61 and 62 and the differential amplifiers 63 to 66 in accordance with interrupt signals INT output from the A/D converter 43. In general, the scan positions of light beams slightly vary depending on the respective surfaces of the polygon mirror 35, because of inclinations of the surfaces. In order to eliminate the influence of the inclinations of the surfaces of the polygon mirror 35, it is desirable to read A/D-converted values a number of times corresponding to the number of surfaces of polygon mirror 35 or a plurality of times of the number of surfaces of polygon mirror 35. The main control unit 51 averages output values from the A/D converter 43 corresponding to the respective amplifiers and differential amplifiers, and recognizes the averaged result as the outputs of the amplifiers and differential amplifiers (S82).

The main control unit 51 compares the obtained outputs from the amplifiers and the differential amplifiers with determination reference values, and controls the galvanomirrors on the basis of the results so as to shift the light beam to the undetectable region.

Assume that the undetectable regions are set near the centers of the sensor patterns SA and SG. As described above, the sensor patterns SA and SG have a length of 800 μm. Even a light beam having a shape of about 100×100 μm (or more) is not detected by the sensor patterns SB, SC, SD, SE, and SF as long as the light beam passes through a point falling within range from the center to 400 μm.

The main control unit 51 compares the output (A/D-converted value) from the amplifier 61 (A) with the determination reference value 100H stored in the memory 52 in advance to determine whether the output from the amplifier 61 is the determination reference value 100H or more (S83).

If the output from the amplifier 61 is determined to be 100H or more, the passing position of the light beam a is found to be closer to the sensor pattern SA side than the center of the sensor pattern SB or on the sensor pattern SA. In this case, the main control unit 51 controls the galvanomirror 33a so as to shift the light beam a to the sensor pattern SA side by about 450 μm (S84).

After shifting the light beam a, the main control unit 51 reads the output from the sensor pattern SA again, and compares outputs before and after the shift (S85). If the output after the shift is equal to or larger than the output before the shift (output after the shift≧output before the shift), the light beam a is determined to be at least on the sensor pattern SA on an upper side with respect to the sheet surface from the center of the sensor pattern SA. The shift to the undetectable region is complete.

If the output after the shift is smaller than the output before the shift, the passing position of the light beam a partially falls within the upper side of the sensor pattern SA with respect to the sheet surface or completely falls outside the sensor pattern SA. This means that the passing position of the light beam a has been in the undetectable region before the shift. In this case, the main control unit 51 controls the galvanomirror 33a so as to shift the position of the light beam a to the sensor pattern SG side by about 450 μm (S86).

If NO in step S83, the main control unit 51 compares the output (A/D-converted value) from the amplifier 62 (G) with the determination reference value 100H stored in the memory 52 in advance to determine whether the output from the amplifier 62 is the determination reference value 100H or more (S87).

If the output from the amplifier 62 is determined to be 100H or more, the passing position of the light beam a is found to be closer to the sensor pattern SG side than the center of the sensor pattern SF or on the sensor pattern SG. In this case, the main control unit 51 controls the galvanomirror 33a so as to shift the light beam a to the sensor pattern SG side (lower side with respect to the sheet surface) by about 450 μm.

After shifting the light beam a, the main control unit 51 reads the output from the sensor pattern SA again, and compares outputs before and after the shift (S89). If the output after the shift is equal to or larger than the output before the shift (output after the shift≧output before the shift), the light beam a is determined to be at least on the sensor pattern SG on a lower side with respect to the sheet surface from the center of the sensor pattern SA. The shift to the undetectable region is complete.

If the output after the shift is smaller than the output before the shift, the passing position of the light beam a partially falls within the lower side of the sensor pattern SG with respect to the sheet surface or completely falls outside the sensor pattern SG. This means that the passing position of the light beam a has been in the undetectable region before the shift. In this case, the main control unit 51 controls the galvanomirror 33a so as to shift the position of the light beam a to the sensor pattern SA side by about 450 μm (S90).

If NO in step S87, the main control unit 51 compares the output (A/D-converted value) from the differential amplifier 66 (E-F) with the determination reference values 800H and A00H stored in the memory 52 in advance to determine whether the output from the differential amplifier 66 falls within the range of the determination reference values 800H to A00H (S91).

If the output from the differential amplifier 66 is determined to fall within the range of 800H to A00H, the passing position of the light beam a is found to be closer to the sensor pattern SF side than the target passing position of the light beam d. In this case, the main control unit 51 controls the galvanomirror 33a so as to shift the light beam a to the sensor pattern SG side by about 450 μm (S92).

If NO in step S91, the main control unit 51 compares the output (A/D-converted value) from the differential amplifier 65 (D-E) with the determination reference values 800H and A00H stored in the memory 52 in advance to determine whether the output from the differential amplifier 65 falls within the range of the determination reference values 800H to A00H (S93).

If the output from the differential amplifier 65 is determined to fall within the range of 800H to A00H, the passing position of the light beam a is found to be closer to the sensor pattern SE side than the target passing position of the light beam c. In this case, the main control unit 51 controls the galvanomirror 33a so as to shift the light beam a to the sensor pattern SG side by about 500 μm (S94).

If NO in step S93, the main control unit 51 compares the output (A/D-converted value) from the differential amplifier 64 (C-D) with the determination reference values 800H and A00H stored in the memory 52 in advance to determine whether the output from the differential amplifier 64 falls within the range of the determination reference values 800H to A00H (S95).

If the output from the differential amplifier 64 is determined to fall within the range of 800H to A00H, the passing position of the light beam a is found to be closer to the sensor pattern SD side than the target passing position of the light beam b. In this case, the main control unit 51 controls the galvanomirror 33a so as to shift the light beam a to the sensor pattern SG side by about 540 μm (S96).

If NO in step S95, the main control unit 51 compares the output (A/D-converted value) from the differential amplifier 63 (B-C) with the determination reference values 800H and A00H stored in the memory 52 in advance to determine whether the output from the differential amplifier 63 falls within the range of the determination reference values 800H to A00H (S97).

If the output from the differential amplifier 63 is determined to fall within the range of 800H to A00H, the passing position of the light beam a is found to be closer to the sensor pattern SC side than the target passing position of the light beam a. In this case, the main control unit 51 controls the galvanomirror 33a so as to shift the light beam a to the sensor pattern SA side by about 520 μm (S98).

Since the purpose of this control is to shift the light beam a to the undetectable region, beam position control suffices to be rough without requiring high precision (e.g., 1 μm or less).

Figure 20:
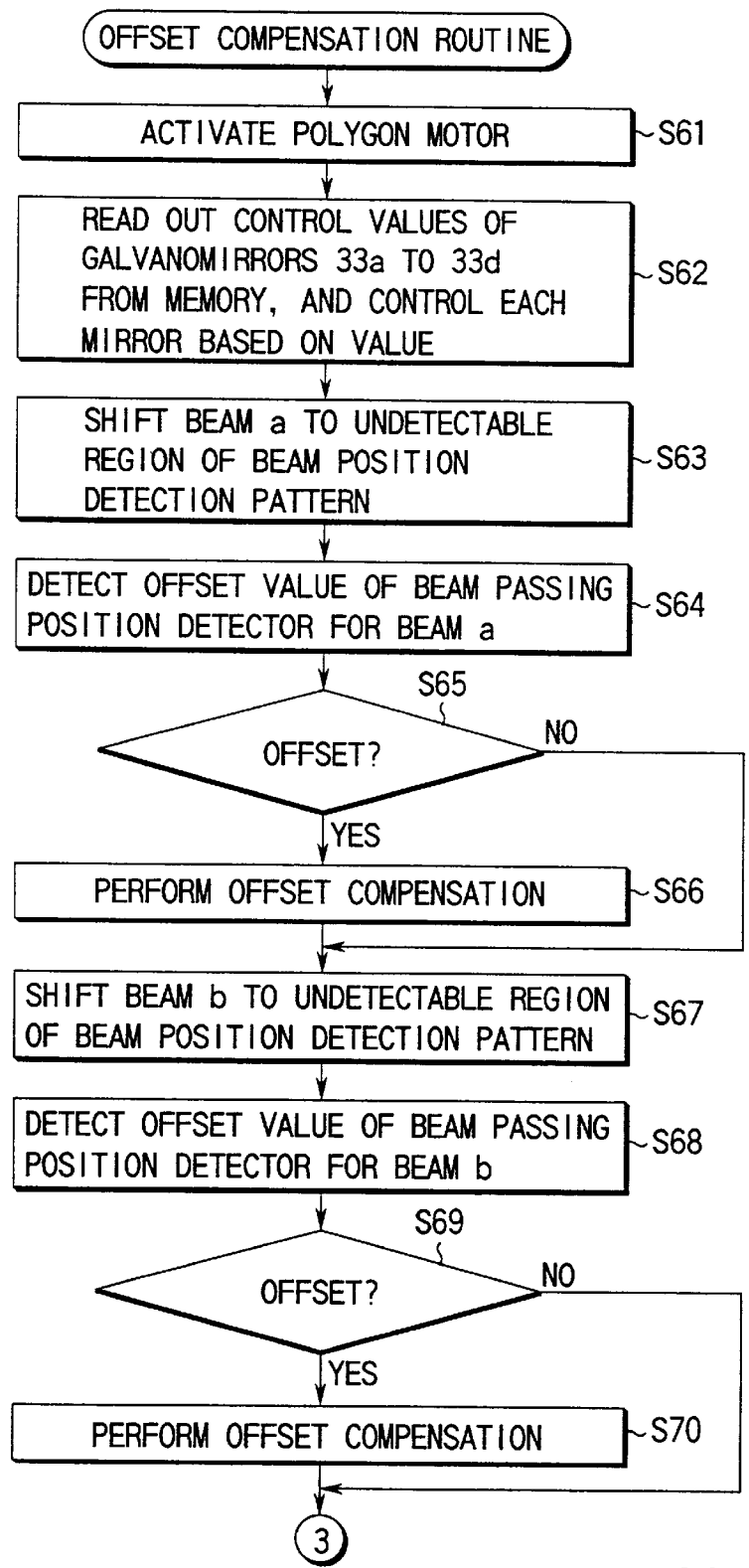
FIG. 20 is a flow chart for explaining a routine of compensating the offset value according to the first embodiment.
Figure 21:
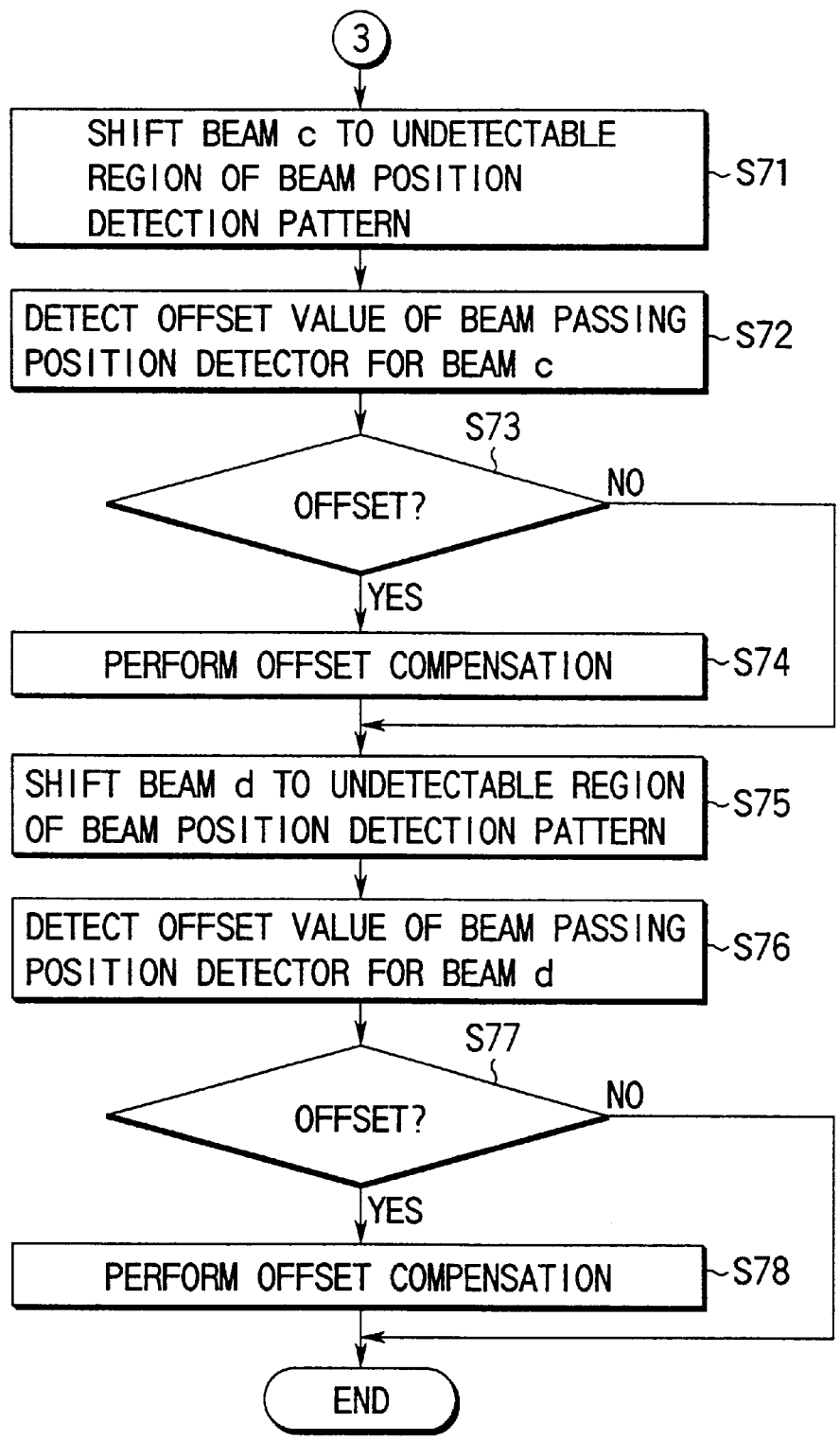
FIG. 21 is a flow chart for explaining the routine of compensating the offset value according to the first embodiment.

The light beams b, c, and d are similarly shifted to the undetectable region in steps S67, S71, and S75 in FIGS. 20 and 21. The shift of the light beams to the undetectable region (steps S63, S67, S71, and S75) can be successively performed.

Figure 24:
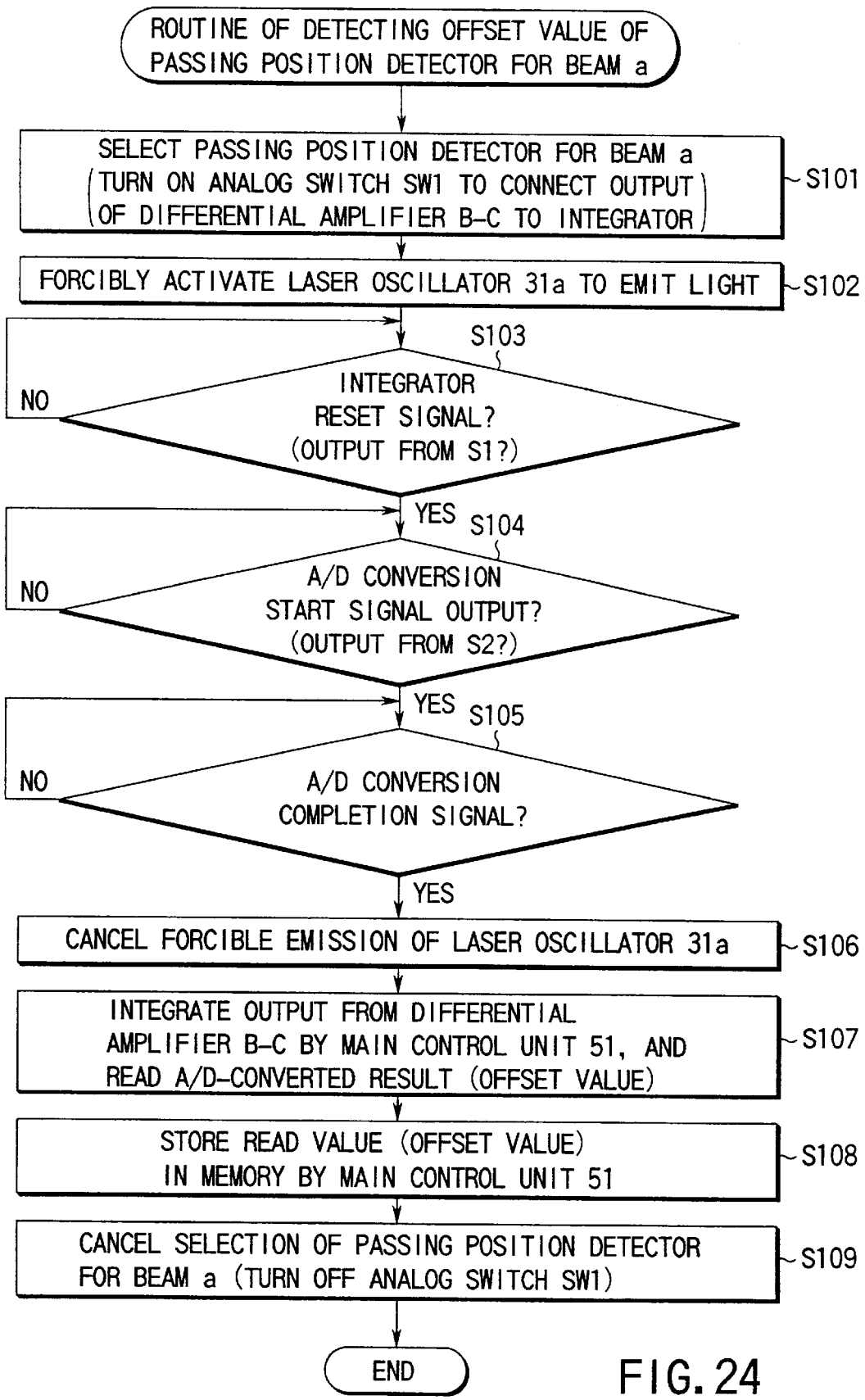
FIG. 24 is a flow chart for explaining a routine of detecting the offset value according to the first embodiment.

A routine operation of detecting (measuring) the offset value of the beam passing position detector for the light beam a in step S64 of FIG. 20 will be explained with reference to a flow chart shown in FIG. 24.

The main control unit 51 selects a beam passing position detector for the light beam a in the beam detector output processor 40 (S101). In step S101, the analog switch SW1 is turned on to connect the output terminal of the differential amplifier 63 for calculating a difference between outputs from the sensor patterns SB and SC which detect the passing position of the light beam a, to the input terminal of the integrator 42.

The main control unit 51 forcibly activates the laser oscillator 31a to emit a light beam (S102). Thereby, the light beam a is made to cyclically scan over the beam passing position detector 38. While the ight beam a passes over the beam passing position detector 38, a signal is output from the sensor pattern S1. The output signal from the sensor pattern S1 resets the integrator 42, and at the same time integration starts (S103).

At this time, since the light beam a is shifted to the undetectable region, the light beam a is not detected by the sensor patterns SB and SC which control the passing position of the light beam a, and only the offset component is integrated. In other words, if the operational amplifier is ideal, the light beam a does not strike the sensor patterns SB and SC, so that the outputs from the operational amplifiers A1 and A2 are 0 V, and the output from the operational amplifier A3 is also 0 V. Since the output from the operational amplifier A4 is also 0 V, a value A/D-converted and read by the main control unit 51 is also 000H.

However, since the operational amplifier constituting the beam passing position detector has an offset voltage, the value read by the main control unit 51 is not 000H, and the main control unit 51 reads a given value, which is an offset value.

The integration operation ends in response to an output from the sensor pattern S2, and at the same time A/D conversion is performed (S104). Upon completion of the A/D conversion, the A/D converter 43 outputs an A/D conversion completion signal (S1O5). Upon reception of the A/D conversion completion signal, the main control unit 51 cancels the forcible emission of the laser oscillator 31a (S106), and reads the A/D-converted value (S107).

The main control unit 51 stores the read offset value in the memory 52 (S108). Finally, the main control unit 51 cancels the selection of the beam passing position detector for the light beam a (S109). That is, the main control unit 51 turns off the analog switch SW1.

The same control is executed in offset detection of the light beams b, c, and d in steps S68, S72, and S76 in FIGS. 20 and 21. As a result, the offset values of the beam passing position detectors for all the light beams a to d, i.e., the offset values of the beam detector output processor 40 are detected.

Figure 25:
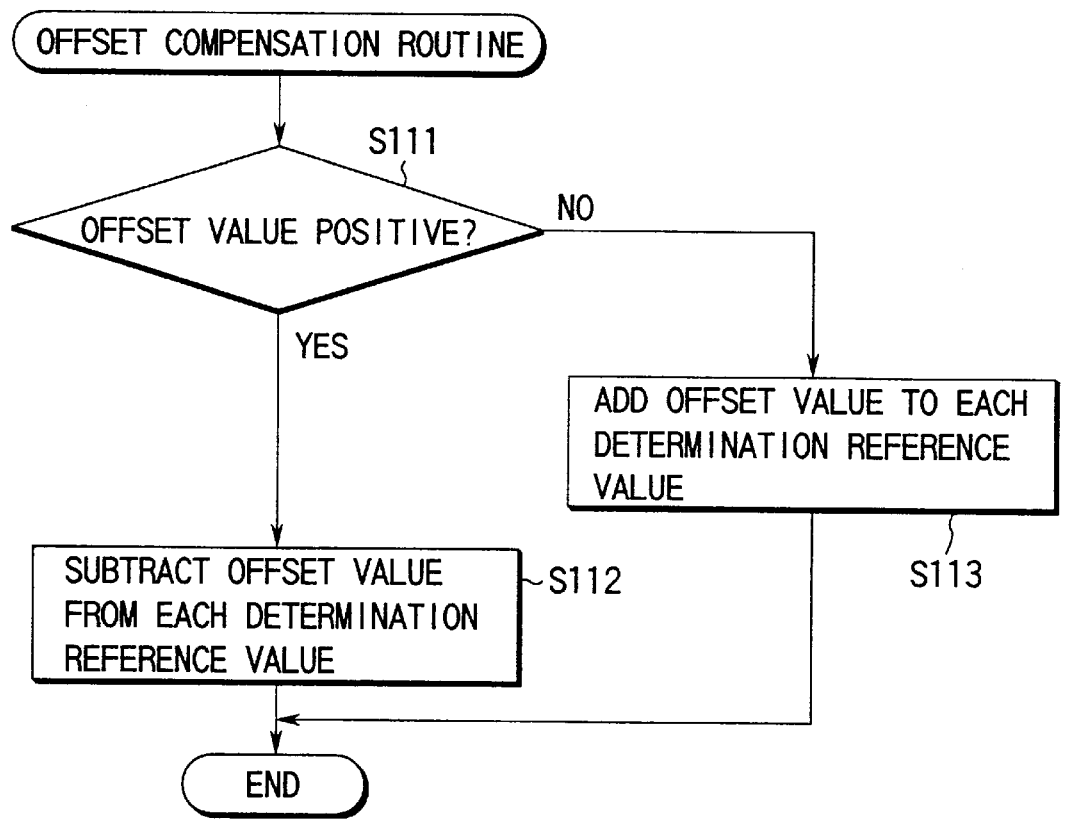
FIG. 25 is a flow chart for explaining a routine of compensating the offset value according to the first embodiment.

A routine operation of compensating the offset in steps S66, S70, S74, and S78 in FIG. 20 will be described below with reference to a flow chart shown in FIG. 25.

The main control unit 51 determines the polarity of the detected offset value (S111). The polarity of the offset value varies depending on an operational amplifier. The beam detector output processor 40 is constituted by a plurality of operational amplifiers, and its polarity varies depending on an image forming apparatus which uses the beam detector output processor 40. For this reason, the polarity must be determined.

The main control unit 51 determines the polarity of the read offset value. If the polarity is positive, the main control unit 51 subtracts the absolute value (|+Vos|) of the offset value from the determination reference value (100H in steps S33 and S35, 800H in step S37, or the like) in the above-mentioned beam passing position control routine in FIGS. 14 and 15 (S112). If the polarity of the read offset value is negative, the main control unit 51 adds the absolute value (|+Vos|) of the offset value to the determination reference value (S113).

If normal beam passing position control is executed upon completion of the offset detection/compensation processing, no control error of the beam passing position is generated by the offset value because the offset value is considered in the determination reference value for beam passing position control.

Offset detection/compensation according to the second embodiment will be described below. Offset compensation is performed by compensating the determination reference value using the offset value in the first embodiment, whereas offset compensation is performed by compensating detected beam position information using the offset value in the second embodiment.

In the second embodiment, offset compensation is performed in the beam passing position control routine. Only the offset compensation method will be explained below.

Figure 26:
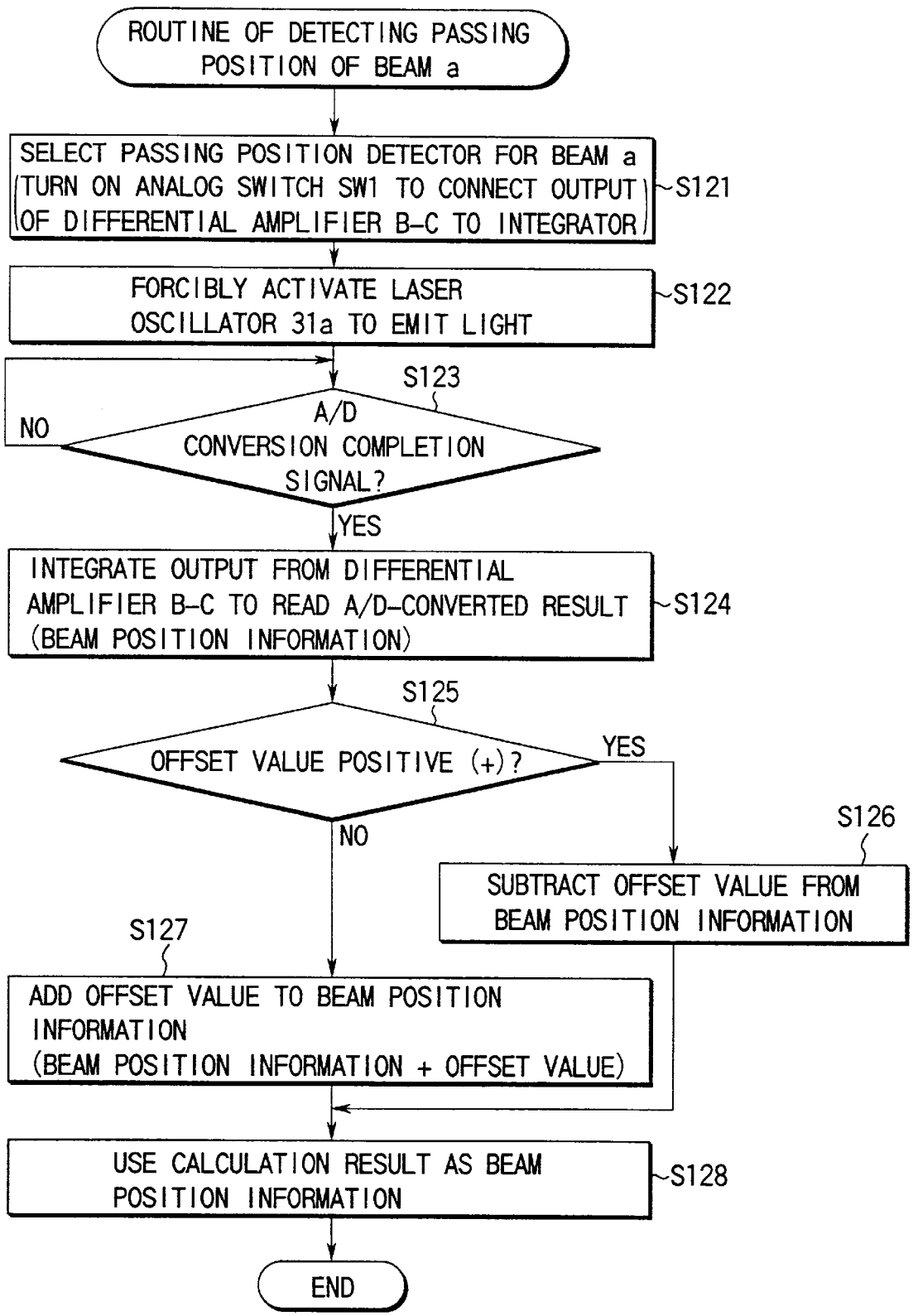
FIG. 26 is a flow chart for explaining a routine of detecting beam passing position information in the beam passing position control routine according to the second embodiment.

FIG. 26 is a flow chart showing a routine in which a main control unit 51 compensates passing position information on a light beam a in the passing position control routine for the light beam a. The main control unit 51 selects a beam passing position detector for the light beam a in a beam detector output processor 40 (S121). In step S121, an analog switch SW1 is turned on to connect the output terminal of a differential amplifier 63 for calculating a difference between outputs from sensor patterns SB and SC which detect the passing position of the light beam a, to the input terminal of an integrator 42.

The main control unit 51 forcibly activates a laser oscillator 31a to emit a light beam (S122). Thereby, the light beam a is made to cyclically scan over a beam passing position detector 38. While the light beam a passes over the beam passing position detector 38, a signal is output from a sensor pattern S1. The output signal from the sensor pattern S1 resets the integrator 42, and at the same time integration starts.

The integration ends in response to an output from a sensor pattern S2, and at the same time A/D conversion is performed. Upon completion of the A/D conversion, an A/D converter 43 outputs an A/D conversion completion signal. Upon reception of the A/D conversion completion signal, the main control unit 51 reads the A/D-converted value (position information on the light beam a) (S124).

Since the main control unit 51 has already grasped the offset value in the offset detection routine described in the first embodiment, it determines the polarity of the offset value (S125), and performs the following processing in accordance with the determination results. More specifically, if the polarity of the detected offset value is positive, the main control unit 51 subtracts the absolute value of the offset value from the read beam position information (beam position information−offset value; S126). If the polarity of the offset value is negative, the main control unit 51 adds the absolute value of the offset value to the read beam position information (beam position information+offset value; S127).

In this manner, the offset value can be removed from the read beam position information by performing calculation in accordance with the polarity of the offset value so as to eliminate the offset. The main control unit 51 determines the calculation results as final beam position information (S128), and controls a galvanomirror 33a. A method of controlling the galvanomirror 33a is the same as in the first embodiment.

Offset detection/compensation according to the third embodiment will be described below.

Figure 27:
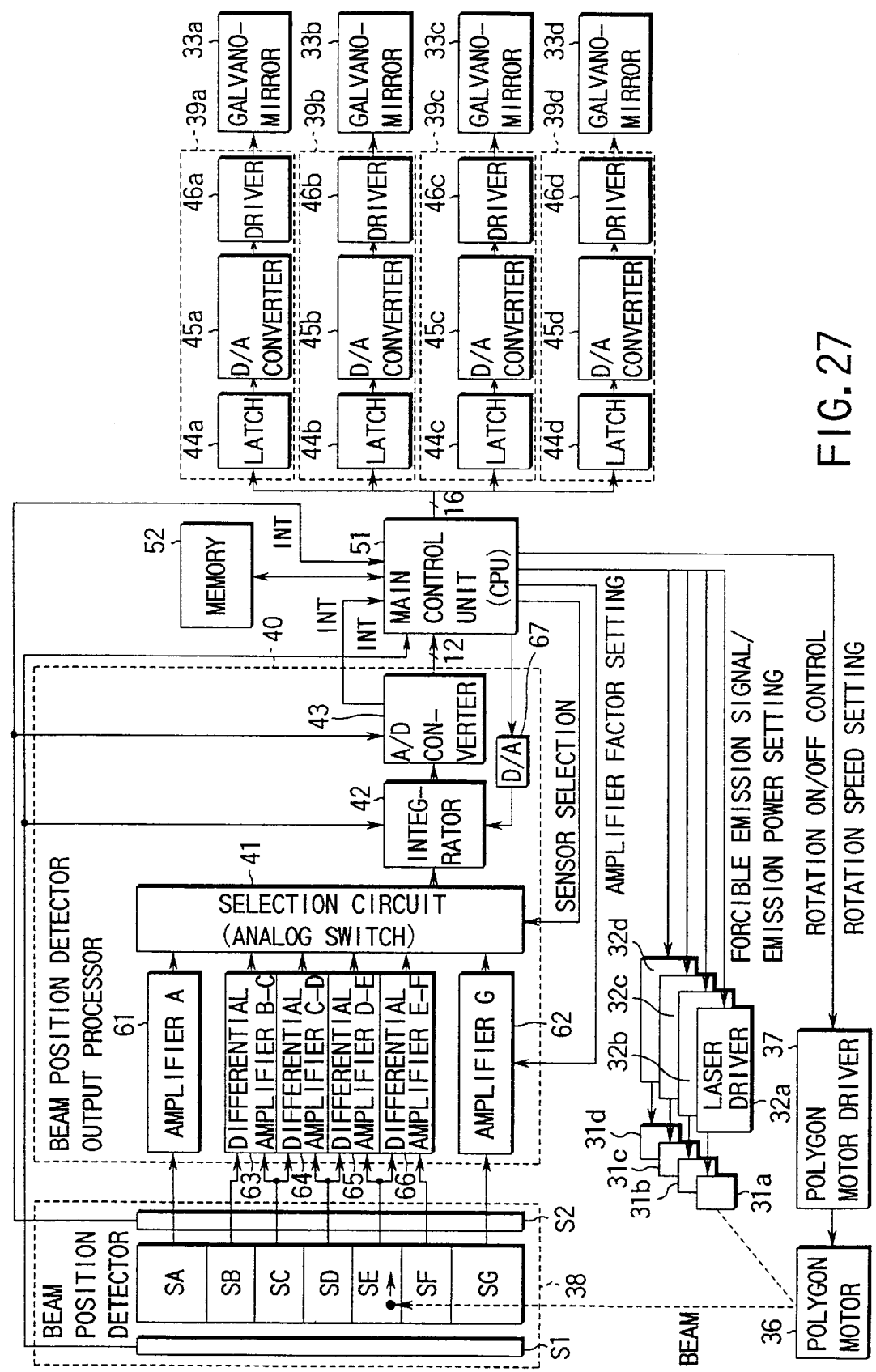
FIG. 27 is a block diagram for explaining offset detection/compensation processing according to the third embodiment.

FIG. 27 is a block diagram for explaining offset detection/compensation processing according to the third embodiment. The basic arrangement is the same as in the first embodiment of FIG. 7 described above except that a beam detector output processor 40 includes a D/A converter 67.

Figure 28:
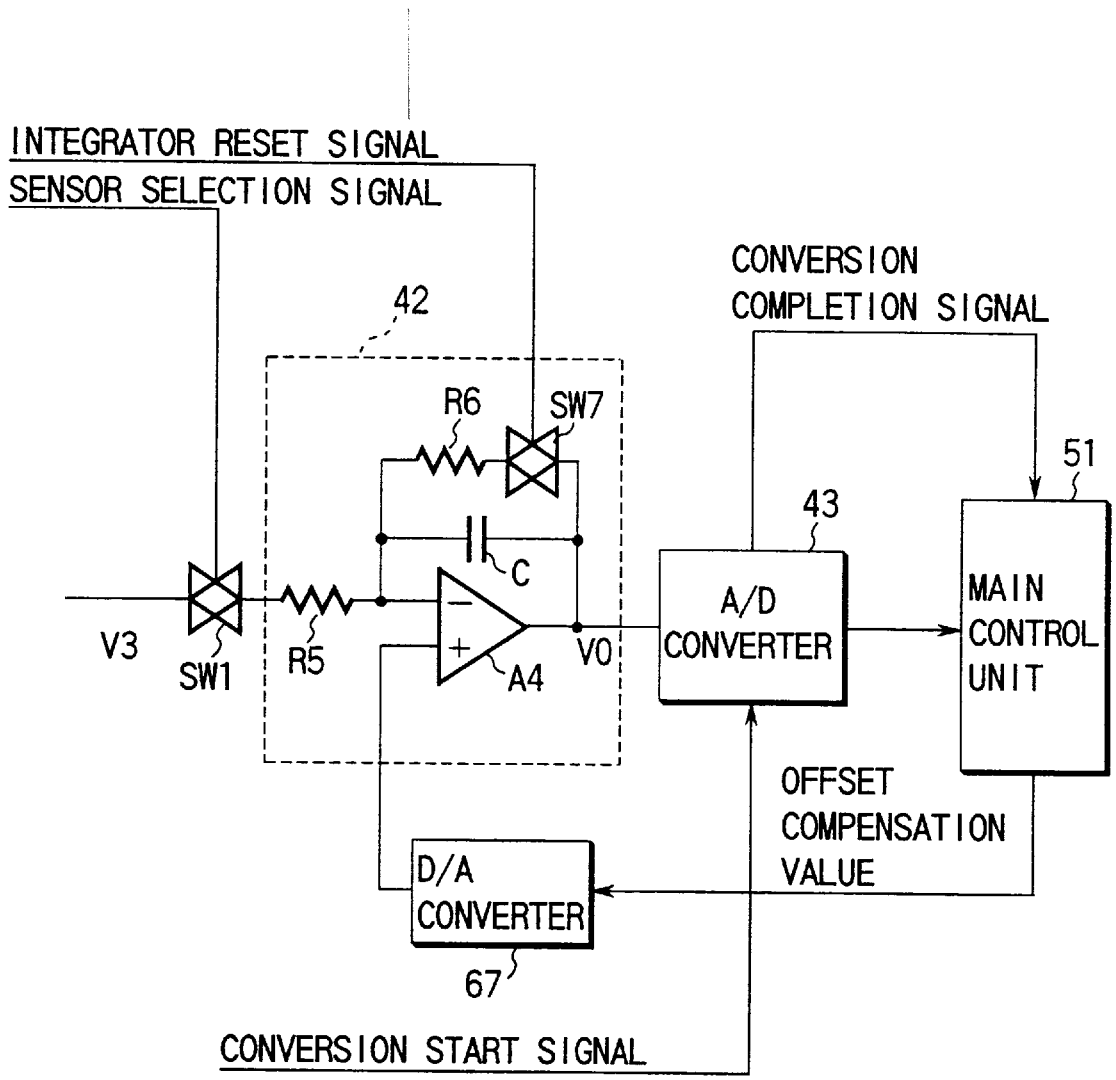
FIG. 28 is a diagram showing the relationship between an integrator and a D/A converter in a beam position detector output processor according to the third embodiment.

FIG. 28 shows in detail the relationship between an integrator and the D/A converter 67 in the beam detector output processor 40. In FIG. 28, the digital input terminal of the D/A converter 67 is connected to a main control unit 51, and receives a digital offset compensation value from the main control unit 51. The analog output terminal of the D/A converter 67 is connected to the non-inverting input terminal of an operational amplifier A4 constituting the integrator 42.

A method of detecting an offset value in the third embodiment is the same as in the first embodiment. By shifting a light beam to the undetectable region of a beam position detection pattern, sensor patterns S1 and S2 set timings to detect an offset value.

In the third embodiment, the detected offset value is fed back as the reference voltage of the integrator 42, and offset detection is performed again. This operation is repeatedly performed until the offset value falls within a prescribed range. This operation will be explained in detail.

Figure 29:
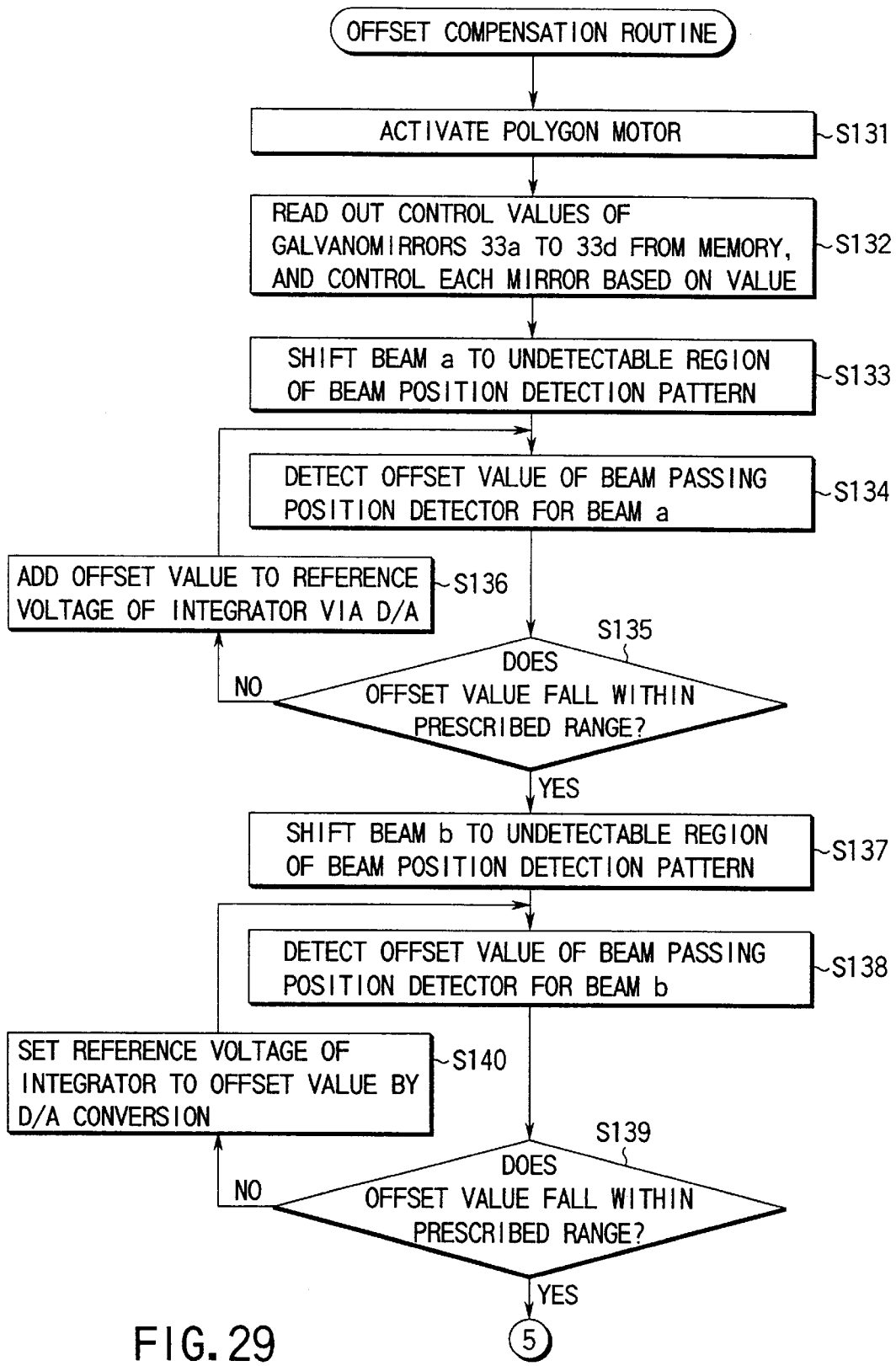
FIG. 29 is a flow chart for explaining a routine of compensating the offset value according to the third embodiment.
Figure 30:
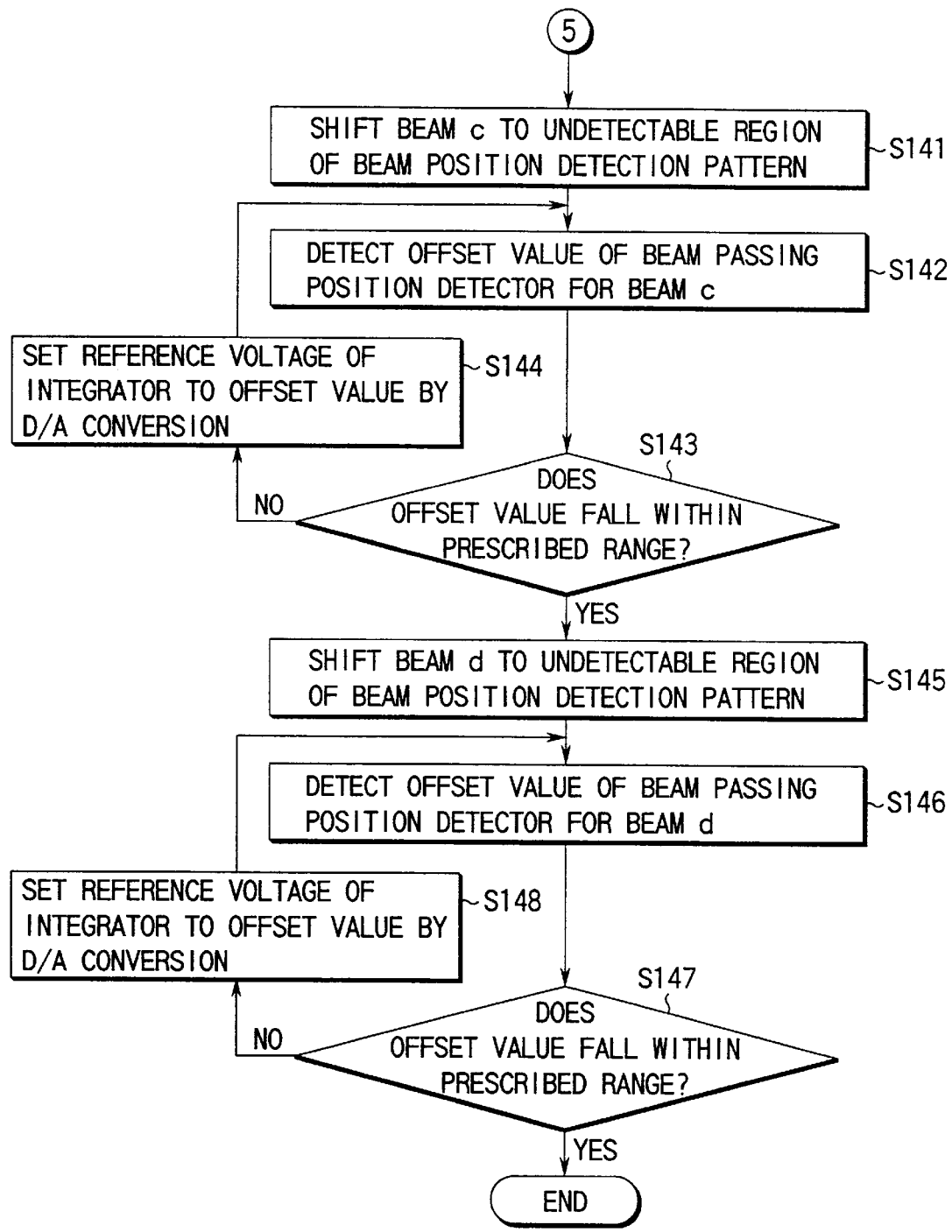
FIG. 30 is a flow chart for explaining the routine of compensating the offset value according to the third embodiment.

FIGS. 29 and 30 are flow charts for explaining the operation of the offset compensation routine. The main control unit 51 activates a polygon motor 36 and rotates a polygon mirror 35 at a predetermined rotational speed (S131). The main control unit 51 reads out the previous drive values of galvanomirrors 33a to 33d from a memory 52, and drives the galvanomirrors 33a to 33d on the basis of these values (S132).

The main control unit 51 emits only a light beam a, and controls the galvanomirror 33a so as to shift the light beam a to the undetectable region of a beam position detection pattern (S133). In this control, the main control unit 51 grasps the current beam passing positions and controls the galvanomirror 33a so as to shift the light beam a to a region where the light beam a is not detected by sensor patterns SB, SC, SD, SE, and SF.

Subsequently, the main control unit 51 detects the offset value of a beam passing position detector for the light beam a in the beam detector output processor 40 (offset detection; S134).

The main control unit 51 determines whether the detected offset value falls within the prescribed range (S135). Ideally, the defined value is 000H when no offset value exists. However, the defined value is generally set with a margin to a certain degree. When the offset value falls outside the prescribed range, the main control unit 51 sets the read offset value as an offset compensation value in the D/A converter 67 (S136). The D/A converter 67 D/A-converts the set offset compensation value, and inputs the obtained value as the reference voltage of the integrator 42 to the non-inverting input terminal of the operational amplifier A4.

Thereafter, the main control unit 51 detects the offset value again (S134), and determines whether the offset value falls within the prescribed range (S135).

An integrated output from the integrator 42 in FIG. 28 is negative when the voltage at the input terminal (inverting input terminal:−) is higher than the voltage at the reference voltage terminal (non-inverting input terminal:+), and positive when the voltage at the input terminal is smaller. When the reference voltage is equal to the input voltage, the integrated output is "0". That is, when the offset value is set at the reference voltage terminal, the offset value becomes "0" by performing offset detection again as far as the offset voltage of the circuit is equal to the previous voltage. When the offset voltage falls outside the prescribed range, offset detection is performed again.

When the offset value falls within the prescribed range, the main control unit 51 stores the offset value in the memory 52, and sequentially carries out steps S137 to S148 to perform the same offset value compensation for light beams b, c, and d.

In performing beam passing position control, the offset voltage (addition value of the detected offset voltage) settled by the above control is set as the reference voltage of the integrator 42.

The offset voltage of the operational amplifier varies upon a change in temperature. For example, in powering on the image forming apparatus, an error may occur in one offset detection operation. According to the third embodiment, however, high-precision offset compensation can be attained because (offset detection)→(offset compensation) is repeatedly executed until the offset value falls within the prescribed range.

Offset detection/compensation according to the fourth embodiment will be described below.

According to the fourth embodiment, in performing offset detection, the reset and integration start/end timings of an integrator 42, or the A/D conversion start timing of an A/D converter 43 is generated not by sensor patterns S1 and S2 for detecting a normal beam position but by a timing sensor for detecting an offset. That is, a beam passing position detector 38 includes an offset detection sensor pattern, which will be explained below.

Figure 31:
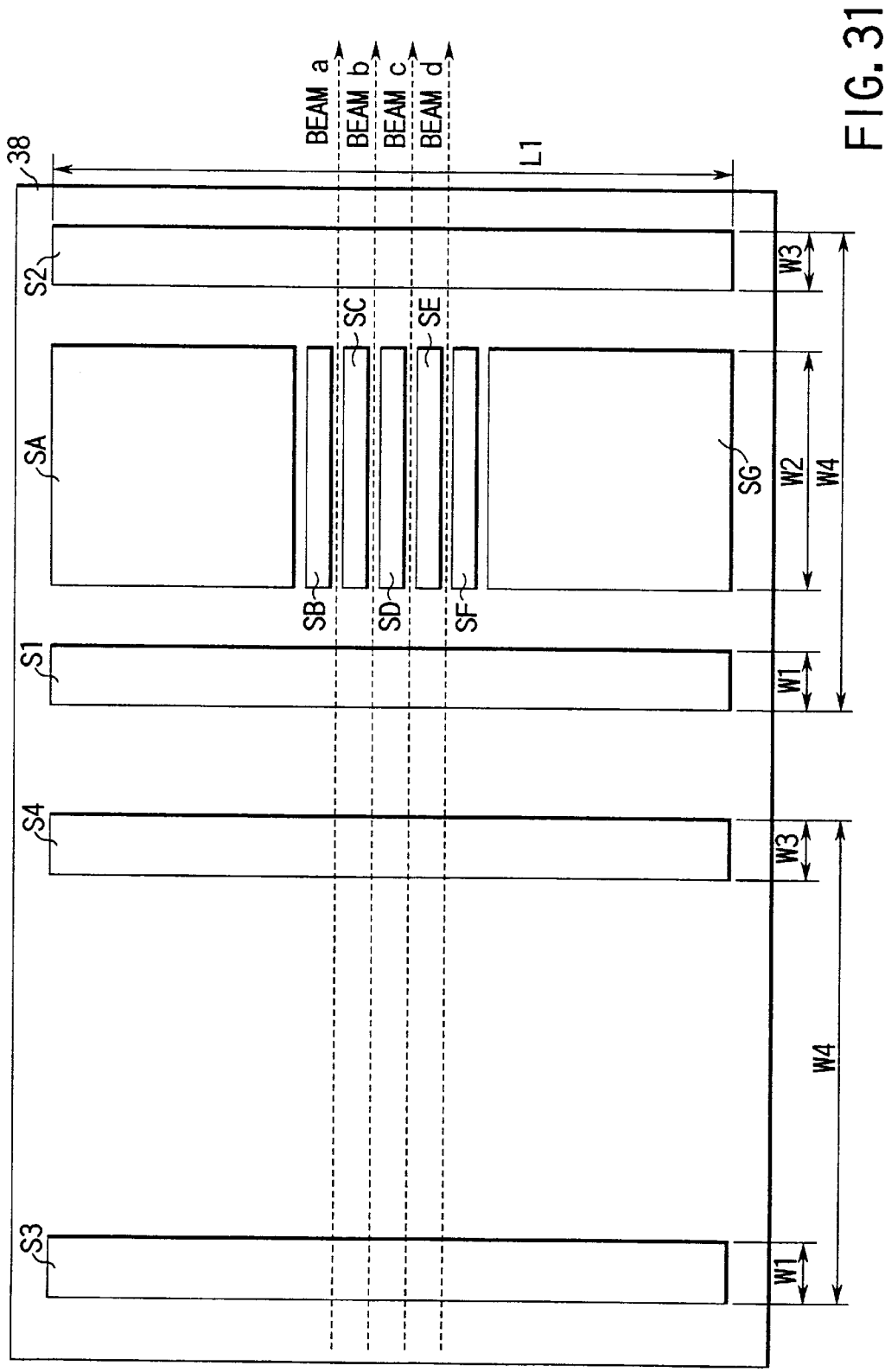
FIG. 31 is a view schematically showing the arrangement of the beam passing position detector according to the fourth embodiment.

FIG. 31 shows the arrangement of the beam passing position detector 38 according to the fourth embodiment. As shown in FIG. 31, offset detection sensor patterns S3 and S4 having the same shape as that of the sensor pattern S1 are arranged parallel to the sensor pattern S1 on the left side of the beam position detection sensor pattern S1 with respect to the sheet surface.

The sensor pattern S3 is a pattern for generating the reset signal and integration start timing of the integrator 42 in offset detection. The sensor pattern S4 is a pattern for generating integration end and A/D conversion start signals in offset detection. The positional relationship between the sensor patterns S3 and S4 is the same as the positional relationship between the sensor patterns S1 and S2. In other words, the distance between the sensor patterns S3 and S4 is W4.

Figure 32:
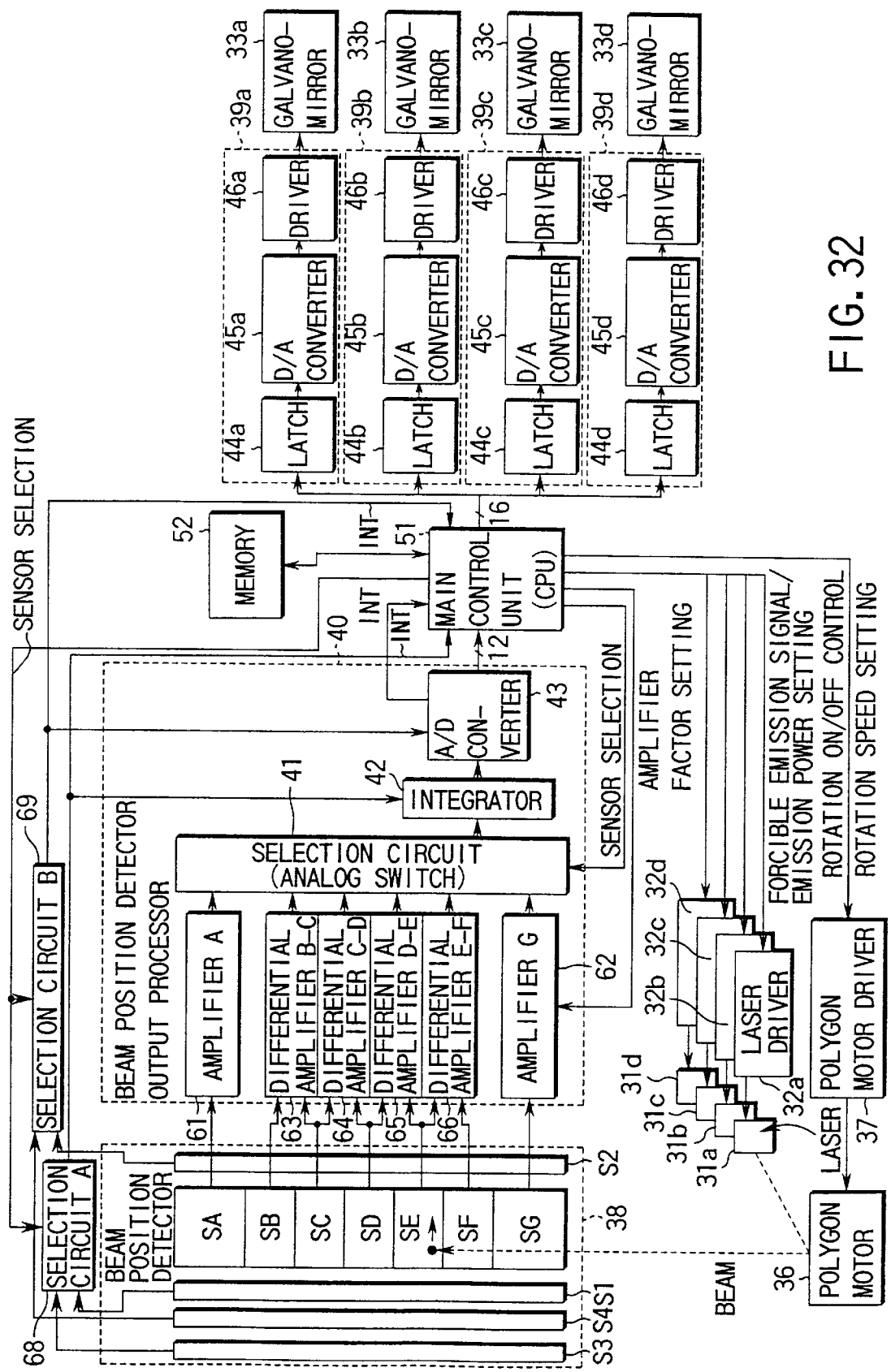
FIG. 32 is a block diagram for explaining offset detection/compensation processing according to the fourth embodiment.

FIG. 32 is a block diagram for explaining offset detection/compensation processing according to the fourth embodiment. The basic arrangement is the same as in the first embodiment of FIG. 7 described above except that the beam passing position detector 38 shown in FIG. 31 is used, and selection circuits 68 and 69 (A and B) for switching between outputs from the sensor patterns S1 to S4 serving as timing sensors in normal beam passing position control and offset detection are arranged.

The selection circuit 68 (A) receives output signals from the sensor patterns S1 and S3, and selects either signal in accordance with a selection signal from a main control unit 51. The selection circuit 69 (B) receives output signals from the sensor patterns S2 and S4, and selects either signal in accordance with a selection signal from the main control unit 51. That is, the output signals from the sensor patterns S1 and S2 are selected in beam passing position control, and the output signals from the sensor patterns S3 and S4 are selected in offset detection.

Figure 33:
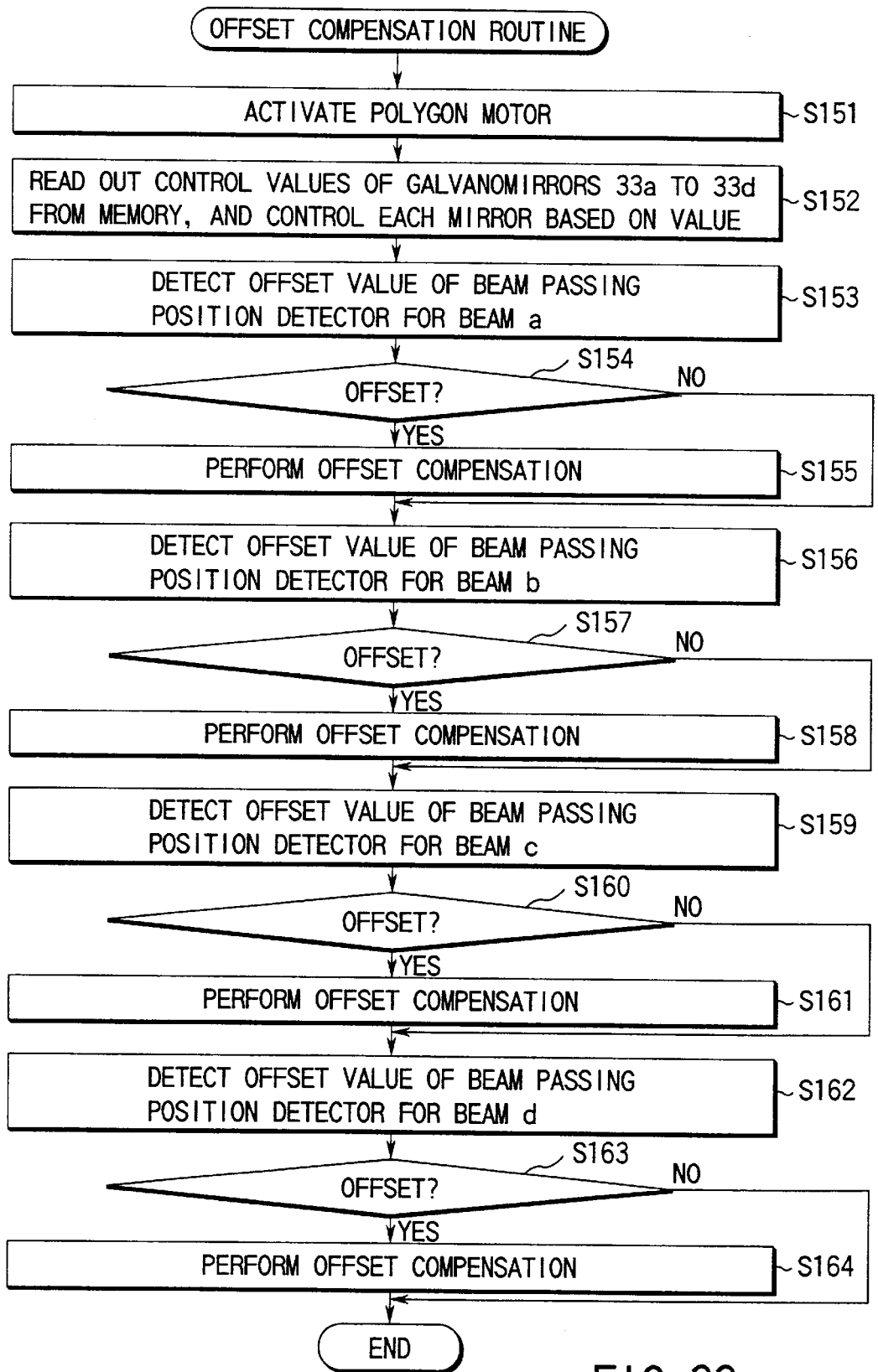
FIG. 33 is a flow chart for explaining a routine of compensating the offset value according to the fourth embodiment.

FIG. 33 is a flow chart for explaining the operation of the offset compensation routine. The main control unit 51 activates a polygon motor 36 and rotates a polygon mirror 35 at a predetermined rotational speed (S151). The main control unit 51 reads out the previous drive values of galvanomirrors 33a to 33d from a memory 52, and drives the galvanomirrors 33a to 33d on the basis of these values (S152).

The main control unit 51 detects the offset value of a beam passing position detector for a light beam a in a beam detector output processor 40 (offset detection; S153). The fourth embodiment is different from the first embodiment in that the light beam a is not shifted to the undetectable region of a passing position detection sensor pattern at this time.

Subsequently, the main control unit 51 determines whether the detected offset value falls within the prescribed range (S154). When the offset value falls outside the prescribed range, the main control unit 51 executes offset compensation on the basis of the detected offset value (offset compensation; S155). The offset compensation method is the same as in the first embodiment described above.

The main control unit 51 sequentially carries out steps S156 to S164 to perform the same control: (offset detection) →(offset compensation) for light beams b, c, and d.

Upon completion of offset compensation for all the light beams a to d, the main control unit 51 performs beam passing position control.

Figure 34:
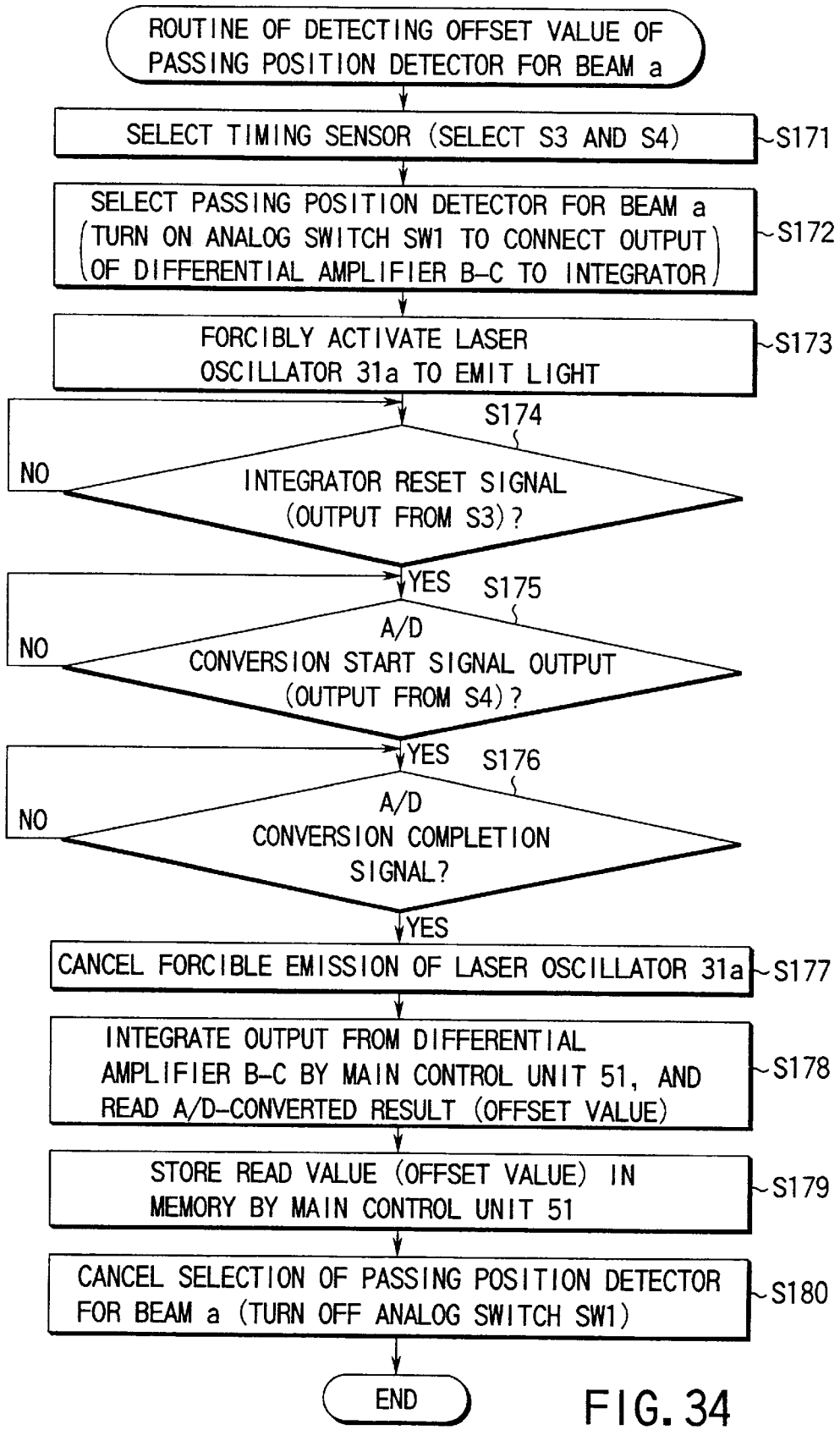
FIG. 34 is a flow chart for explaining a routine of detecting the offset value according to the fourth embodiment.

A routine operation of detecting (measuring) the offset value of the beam passing position detector for the light beam a in step S153 of FIG. 33 will be explained with reference to a flow chart shown in FIG. 34.

The main control unit 51 outputs sensor selection signals to the selection circuits 68 and 69 to select the sensor patterns S3 and S4 (S171). The selection circuit 68 inputs an output from the sensor pattern S3 as a reset signal (also serving as an integration start signal) for the integrator 42 to a reset switch (analog switch) SW7 of the integrator 42. The selection circuit 69 inputs an output from the sensor pattern S4 as an A/D conversion start signal (also serving as an integration end signal) for the A/D converter 43 to the A/D converter 43.

The main control unit 51 selects a beam passing position detector for the light beam a in the beam detector output processor 40 (S172). In step S172, an analog switch SW1 is turned on to connect the output terminal of a differential amplifier 63 for calculating a difference between outputs from sensor patterns SB and SC which detect the passing position of the light beam a, to the input terminal of the integrator 42.

The main control unit 51 forcibly activates a laser oscillator 31a to emit a light beam (S173). Thereby, the light beam a is made to cyclically scan over a beam passing position detector 38. While the light beam a passes over the beam passing position detector 38, a signal is output from the sensor pattern S3. The output signal from the sensor pattern S3 resets the integrator 42, and at the same time integration starts (S174).

The integration operation ends in response to an output from the sensor pattern S4, and at the same time A/D conversion is performed (S175).

An offset value is detected by performing integration while no light beam is irradiated on the beam passing position detection sensor patterns SB to SF. According to this method, offset detection is performed before the light beam a reaches the beam passing position detection sensor patterns SB to SF. The timing is formed using the sensor patterns S3 and S4 identical to the sensor patterns S1 and S2 for generating integration start and end timings used in beam passing position detection control, and an error upon offset detection is minimized.

Upon completion of the A/D conversion, the A/D converter 43 outputs an A/D conversion completion signal (S176). Upon reception of the A/D conversion completion signal, the main control unit 51 cancels the forcible emission of the laser oscillator 31a (S177), and reads the A/D-converted value (offset value) (S178).

The main control unit 51 stores the read offset value in the memory 52 (S179). Finally, the main control unit 51 cancels the selection of the beam passing position detector for the light beam a (S180). That is, the main control unit 51 turns off the analog switch SW1.

The same control is executed in offset detection of the light beams b, c, and d in steps S156, S159, and S162 in FIG. 33. As a result, the offset values of the beam passing position detectors for all the light beams a to d, i.e., the offset values of the beam detector output processor 40 are detected.

Offset detection/compensation according to the fifth embodiment will be described below.

In the fifth embodiment, an offset value is detected by the same method as in the fourth embodiment (using the sensor patterns S3 and S4), and the offset value is compensated by the same method as in the second embodiment (compensation of beam position information). Therefore, a description of the fifth embodiment will be omitted.

Offset detection/compensation according to the sixth embodiment will be described below.

In the sixth embodiment, an offset value is detected by the same method as in the fourth embodiment (using the sensor patterns S3 and S4), and the offset value is compensated by the same method as in the third embodiment (offset compensation of the operational amplifier via the D/A converter).

Figure 35:
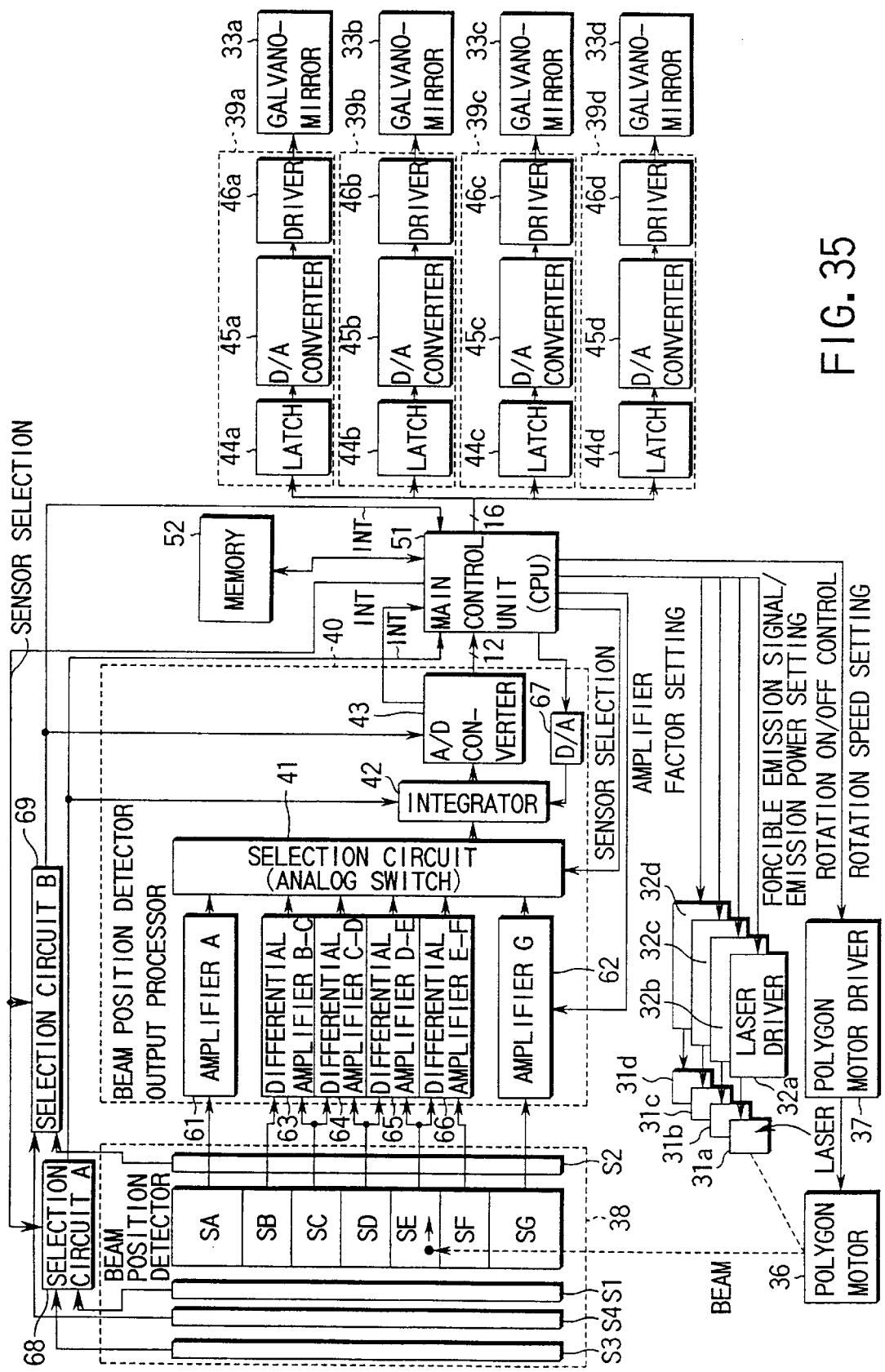
FIG. 35 is a block diagram schematically showing the arrangement of the beam passing position detector according to the sixth embodiment.

FIG. 35 is a block diagram for explaining offset detection/compensation processing according to the sixth embodiment. The basic arrangement is the same as in the fourth embodiment of FIG. 32 described above except that a beam detector output processor 40 includes a D/A converter 67, similar to the third embodiment. Therefore, a description of the sixth embodiment will be omitted.

Offset detection/compensation according to the seventh embodiment will be described below.

In the seventh embodiment, the integration start timing is managed by a timing sensor for beam passing position control, and the integration end timing is managed by a timer serving as a timepiece means. The offset compensation method is the same as in the first embodiment (compensation using a determination reference value), and a description thereof will be omitted.

Figure 36:
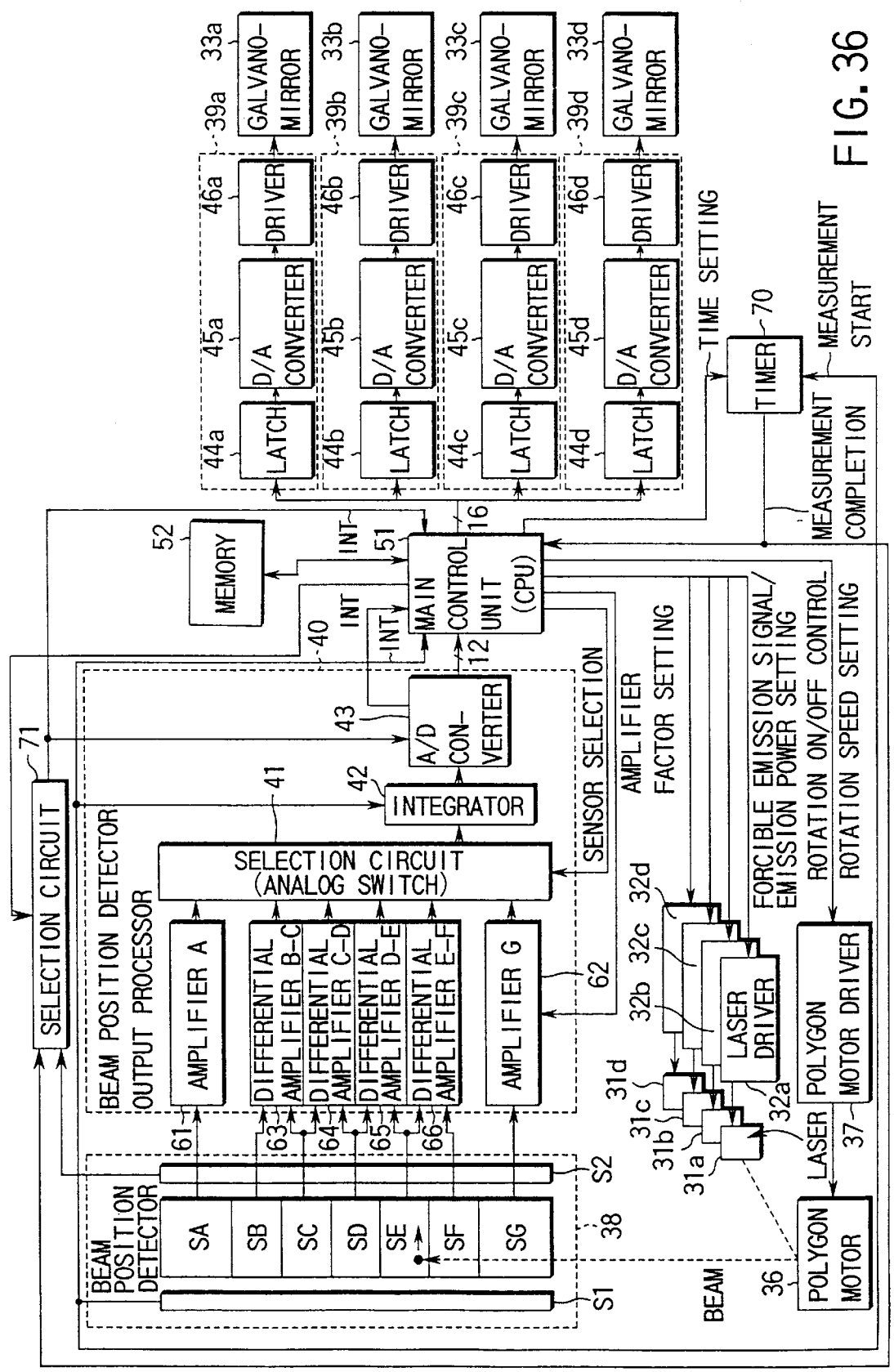
FIG. 36 is a block diagram for explaining offset detection/compensation processing according to the seventh embodiment.

FIG. 36 is a block diagram for explaining offset detection/compensation processing according to the seventh embodiment. The basic arrangement is the same as in the first embodiment of FIG. 7 described above except that a timer 70 serving as a timepiece means, and a selection circuit 71 are arranged.

The selection circuit 71 receives an output signal from a sensor pattern S2 and a measurement completion signal from the timer 70, either of which is selected by a selection signal from a main control unit 51. That is, the output signal from the sensor pattern S2 is selected in beam passing position control, and the measurement completion signal from the timer 70 is selected in detecting an offset value. The selected signal is input as an A/D conversion start signal (integration end) to an A/D converter 43.

The timer 70 starts measurement upon reception of an output signal from a sensor pattern S1 as a measurement start signal. After the lapse of a time set by the main control unit 51, the timer 70 outputs a measurement completion signal. The measurement completion signal is sent as an A/D conversion start signal to the A/D converter 43 via the selection circuit 71. At the same time, the measurement completion signal is also output to the main control unit 51.

The measurement time of the timer 70 can be arbitrarily set by the main control unit 51. In the seventh embodiment, the measurement time is a time interval between output of a signal from the sensor pattern S1 and output of a signal from the sensor pattern S2 (i.e., a time interval between integration start and integration end).

Figure 37:
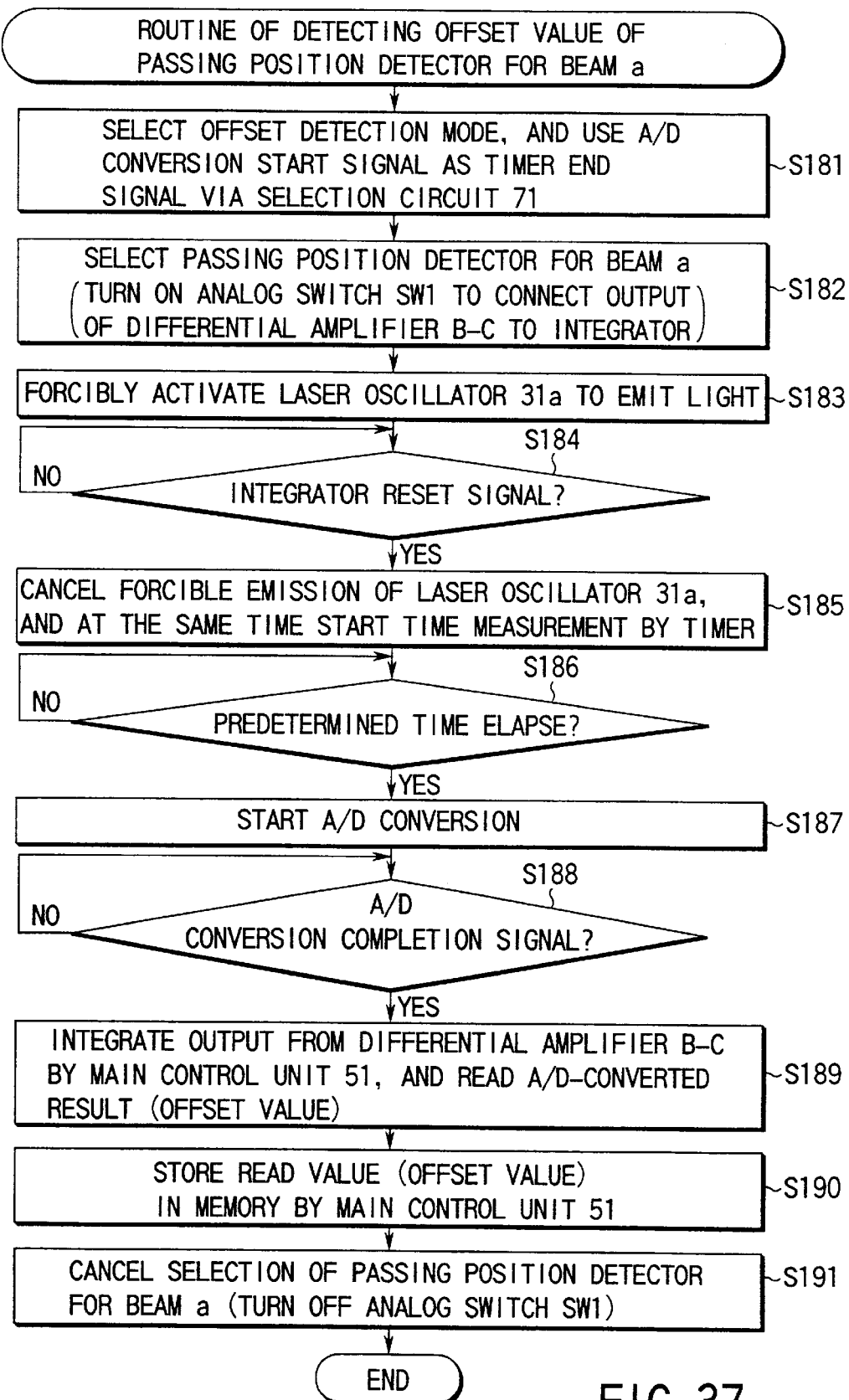
FIG. 37 is a flow chart for explaining a routine operation of detecting the offset value in the seventh embodiment.

FIG. 37 is a flow chart for explaining the operation of the offset detection routine in the seventh embodiment. A method of detecting an offset value will be explained with reference to FIG. 37. Although FIG. 37 exemplifies the case of a light beam a, the same operation is also performed for light beams b, c, and d.

The main control unit 51 outputs a selection signal to the selection circuit 71 to select the measurement completion signal from the timer 70 as an A/D conversion start signal (S181). The measurement completion signal from the timer 70 is input to the A/D converter 43 as the A/D conversion start signal for the A/D converter 43 (also serving as an integration end signal).

The main control unit 51 selects a beam passing position detector for the light beam a in a beam detector output processor 40 (S182). In S182, an analog switch SW1 is turned on to connect the output terminal of a differential amplifier 63 for calculating a difference between outputs from sensor patterns SB and SC which detect the passing position of the light beam a, to the input terminal of an integrator 42.

The main control unit 51 forcibly activates a laser oscillator 31a to emit a light beam (S183). Thereby, the light beam a is made to cyclically scan over a beam passing position detector 38. While the light beam a passes over the beam passing position detector 38, a signal is output from the sensor pattern S1. The output signal from the sensor pattern S1 resets the integrator 42, and at the same time integration starts (S184).

At this time, the main control unit 51 cancels the forcible emission of the laser oscillator 31a. Since the timer 70 receives the output from the sensor pattern S1 as a measurement start signal for the timer 70, the timer 70 starts a measurement operation (S185).

The forcible emission of the laser oscillator 31a is canceled because, in this embodiment, since the light beam is not shifted to the undetectable region of the beam passing position detection sensor pattern, if the light beam is continuously emitted, the light beam may scan over the beam passing position detection sensor pattern, and the beam position information may be superposed on a measured offset value, failing to measure a correct offset value.

Subsequently, the timer 70 starts measuring the time set by the main control unit 51. After measuring the predetermined time (S186), the timer 70 outputs a measurement completion signal. The measurement completion signal is input as a conversion start signal to the A/D converter 43 via the selection circuit 71.

Upon reception of the conversion start signal, the A/D converter 43 starts A/D conversion (S187). Upon completion of the A/D conversion, the A/D converter 43 outputs an A/D conversion completion signal to the main control unit 51 (S188). Upon reception of the A/D conversion signal, the main control unit 51 reads an A/D-converted value (offset value) (S189).

The main control unit 51 stores the read offset value in a memory 52 (S190). Finally, the main control unit 51 cancels the selection of the beam passing position detector for the light beam a (S119). That is, the main control unit 51 turns off the analog switch SW1.

The same control is executed in offset detection of the light beams b, c, and d to detect the offset values of the beam passing position detectors for all the light beams a to d, i.e., the offset values of the beam detector output processor 40.

Offset detection/compensation according to the eighth embodiment will be described below.

In the eighth embodiment, an offset value is detected by the same method as in the seventh embodiment (using the sensor pattern S1 and the timer), and the offset value is compensated by the same method as in the second embodiment (compensation of position information). Therefore, a description of the eighth embodiment will be omitted.

Offset detection/compensation according to the ninth embodiment will be described below.

In the ninth embodiment, an offset value is detected by the same method as in the seventh embodiment (using the sensor pattern S1 and the timer), and the offset value is compensated by the same method as in the third embodiment (offset compensation of the operational amplifier via the D/A converter).

Figure 38:
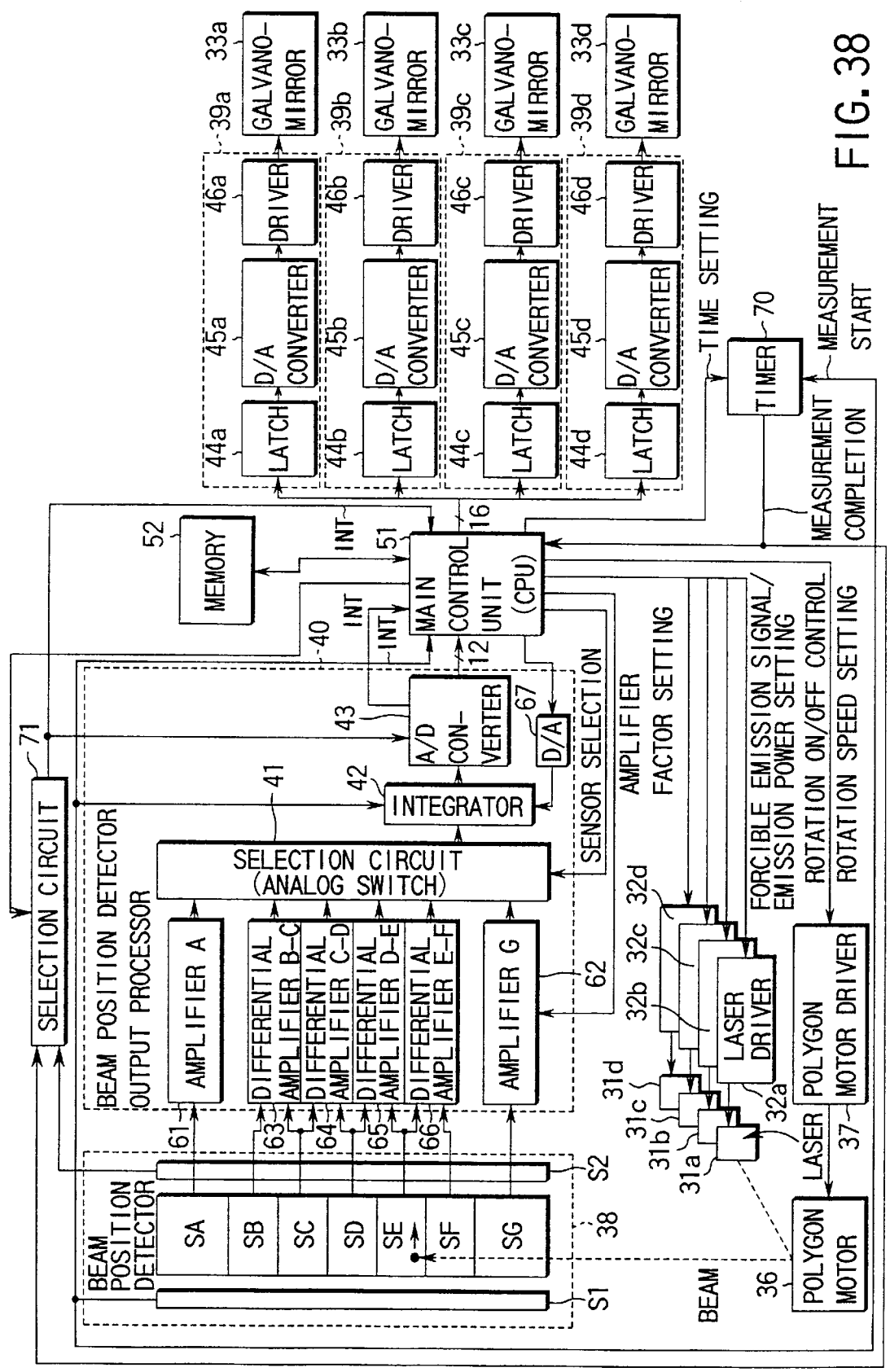
FIG. 38 is a block diagram for explaining offset detection/compensation processing according to the ninth embodiment.

FIG. 38 is a block diagram for explaining offset detection/compensation processing according to the ninth embodiment. The basic arrangement is the same as in the seventh embodiment (using the sensor pattern S1 and the timer) of FIG. 36 described above except that a beam detector output processor 40 includes a D/A converter 67, similar to the third embodiment. Therefore, a description of the ninth embodiment will be omitted.

Offset detection/compensation according to the 10th embodiment will be described.

In the 10th embodiment, output signals from sensor patterns S1 and S2 are used as integration start and end timings in offset compensation. To prevent a light beam from being irradiated on beam passing position detection sensor patterns SB to SF to superpose beam position information on an offset value, the beam passing position detection sensor patterns SB to SF are shielded from the light beam by a beam-shielding plate in an offset detection mode. The offset compensation method is the same as in the above-mentioned first embodiment (compensation using a determination reference value), and a description thereof will be omitted.

Figure 39:
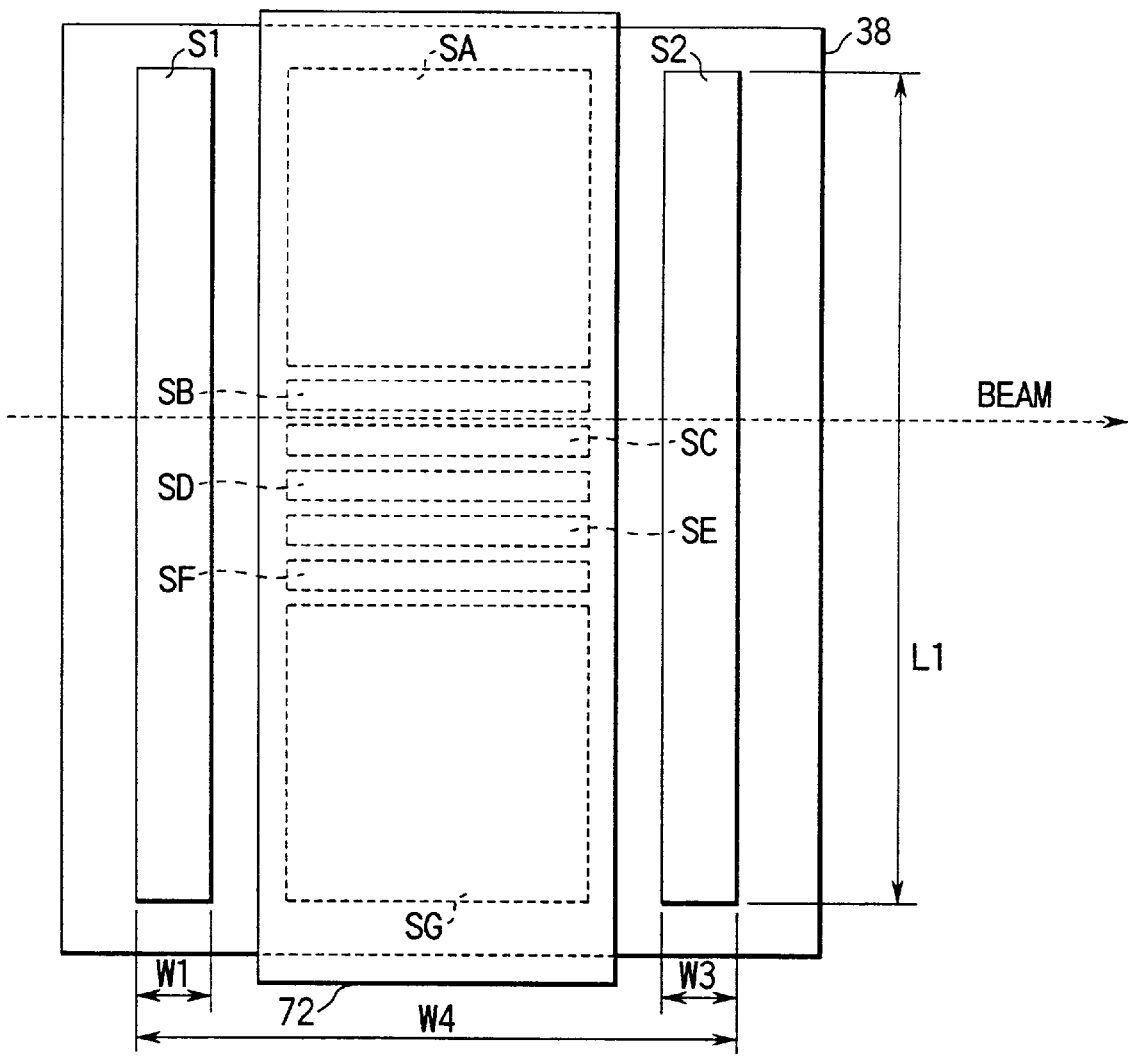
FIG. 39 is a view showing the relationship between the beam position detector and a beam-shielding plate according to the 10th embodiment.

FIG. 39 shows the relationship between a beam position detector 38 and a beam-shielding plate 72 used in the 10th embodiment. The layout and function of the sensor patterns are the same as in the above-described first embodiment, and a description thereof will be omitted. The beam-shielding plate 72 serving as a beam-shielding means is formed of a beam-shielding member which does not transmit a light beam. In offset detection, as shown in FIG. 39, the beam-shielding plate 72 is set at a position where it completely covers the sensor patterns SA to SG to prevent a light beam from being irradiated on the beam passing position detection sensor patterns SB to SF.

In beam passing position control, the beam-shielding plate 72 is moved by an actuator (not shown) to a position where the plate 72 does not influence the control (i.e., a position where any of all the sensor patterns is not shielded from a light beam).

Figure 40:
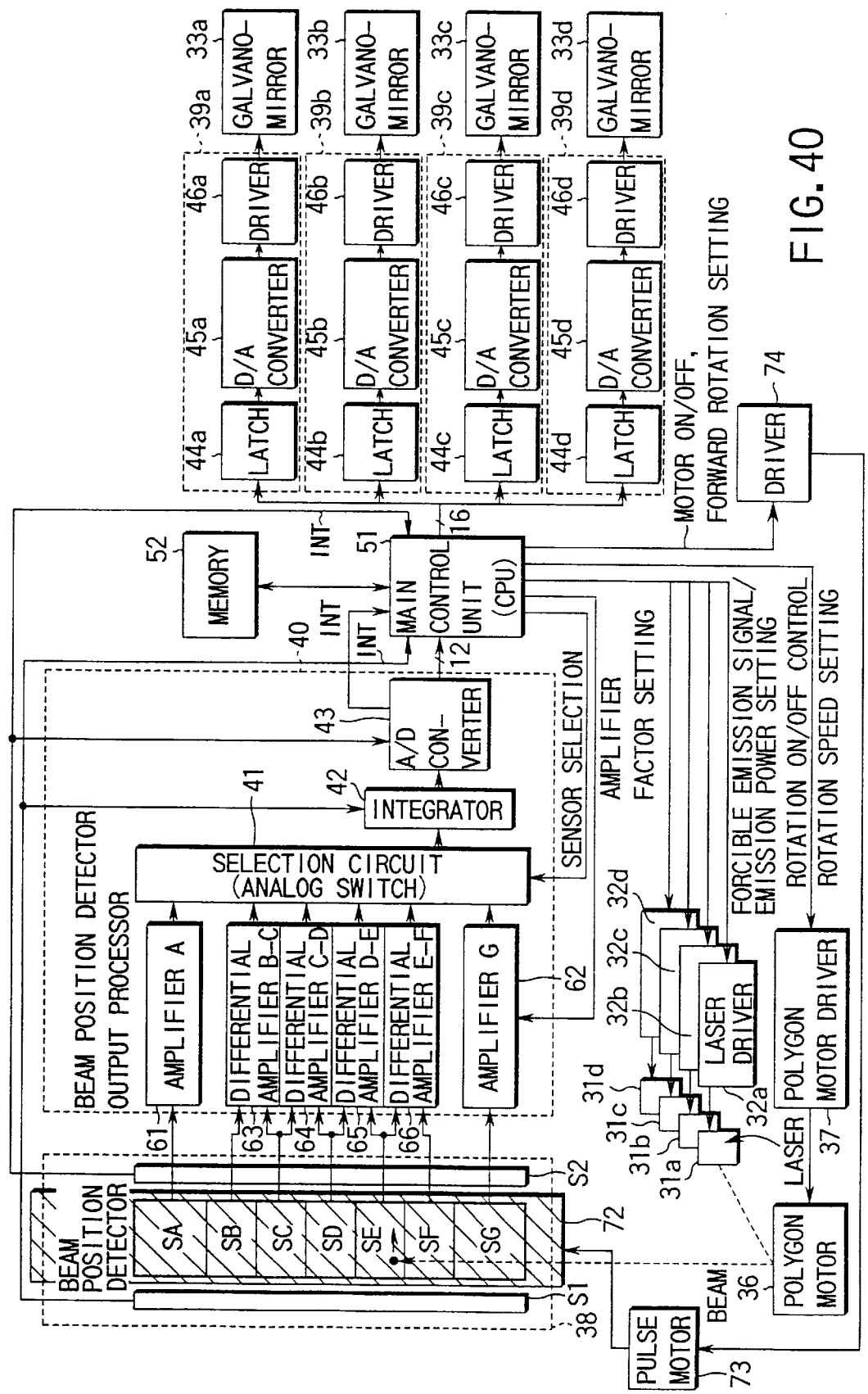
FIG. 40 is a block diagram for explaining offset detection/compensation processing according to the 10th embodiment.

FIG. 40 is a block diagram for explaining offset detection/compensation processing according to the 10th embodiment. The basic arrangement is the same as in the first embodiment of FIG. 7 described above except that the beam-shielding plate 72 is arranged in the beam passing position detector 38, as shown in FIG. 39, and a pulse motor 73 serving as an actuator for moving the beam-shielding plate 72, and a driver 74 for driving the pulse motor 73 are arranged.

The beam-shielding plate 72 has normally been moved by the pulse motor 73 to a position where the plate 72 does not influence beam passing position control (i.e., a position where any of all the sensor patterns is not shielded from a light beam). Only in offset detection, the beam-shielding plate 72 is moved by the pulse motor 73 to a position where the plate 72 completely covers the sensor patterns SA to SG as shown in FIG. 40.

The pulse motor 73 for moving the beam-shielding plate 72 is driven by the driver 74. The driver 74 is connected to a main control unit 51, and controlled by an ON/OFF instruction and a forward/backward rotation instruction from the main control unit 51.

Figure 41:
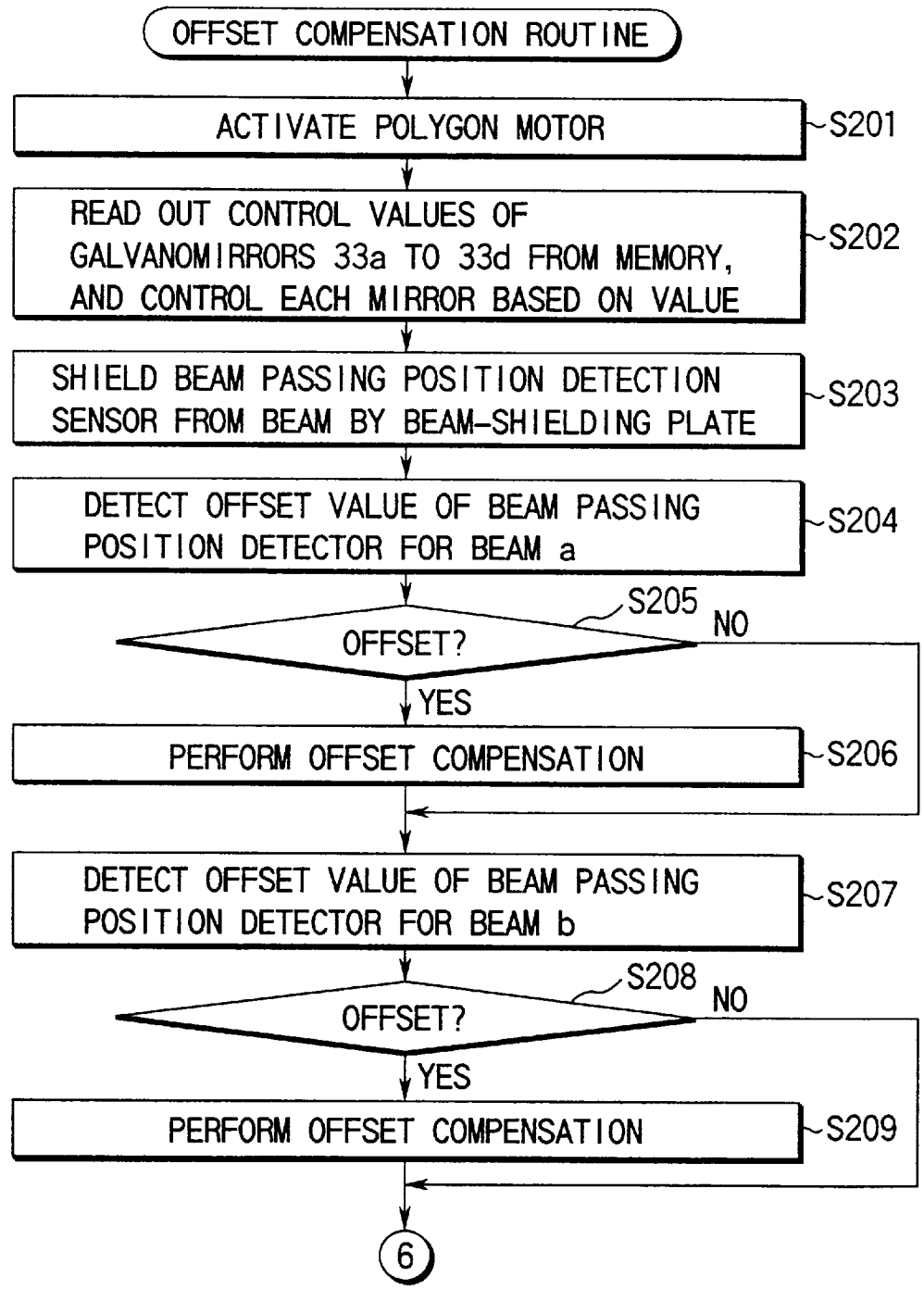
FIG. 41 is a flow chart for explaining a routine of compensating the offset value according to the 10th embodiment.
Figure 42:
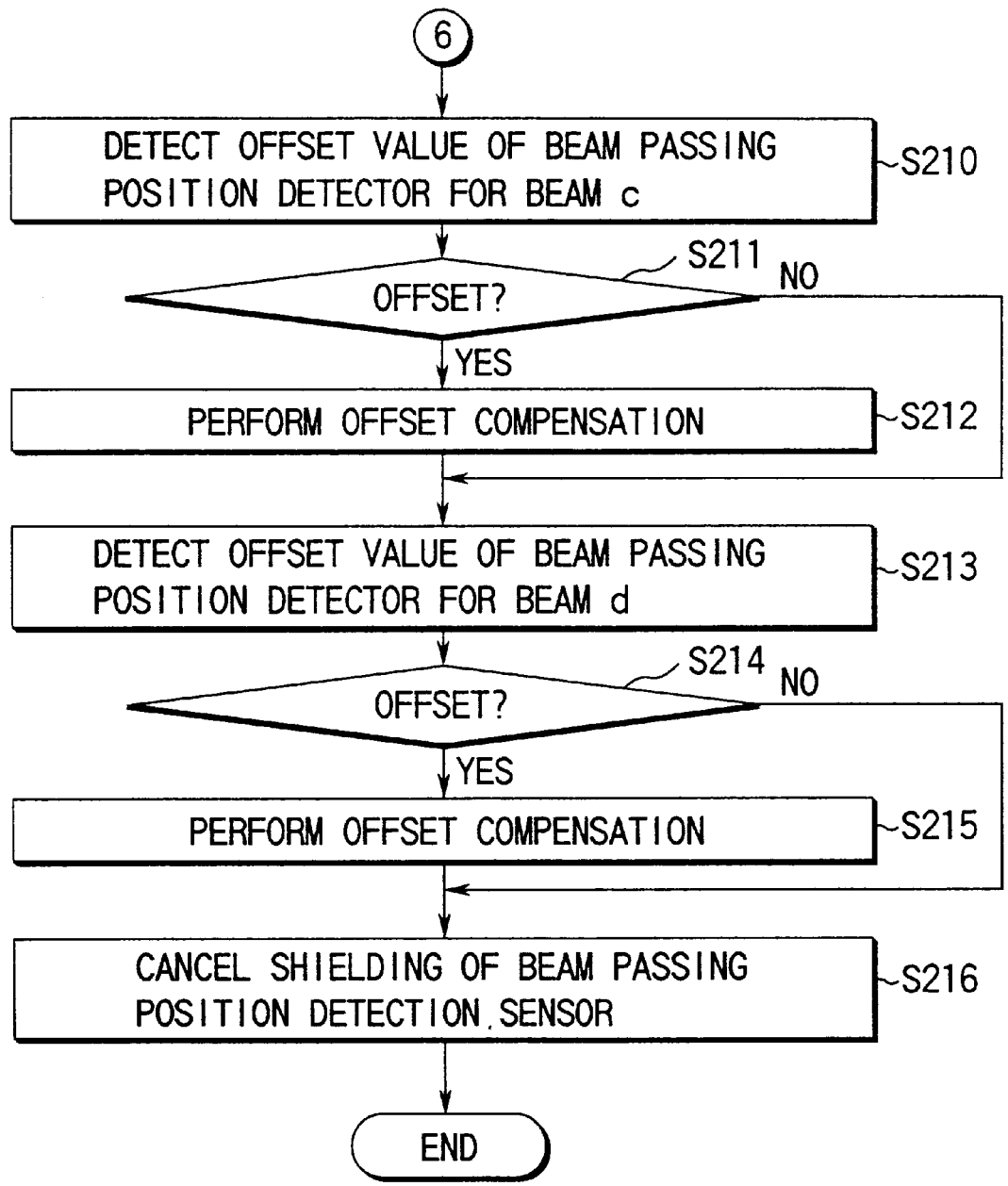
FIG. 42 is a flow chart for explaining the routine of compensating the offset value according to the 10th embodiment.

FIGS. 41 and 42 are flow charts for explaining the operation of the offset compensation routine. The main control unit 51 activates a polygon motor 36 and rotates a polygon mirror 35 at a predetermined rotational speed (S201). The main control unit 51 reads out the previous drive values of galvanomirrors 33a to 33d from a memory 52, and drives the galvanomirrors 33a to 33d on the basis of these values (S202).

The main control unit 51 sends an ON signal and a forward or backward rotation signal to the driver 74 of the pulse motor 73 to operate the pulse motor 73 and move the beam-shielding plate 72, thereby shielding the sensor patterns SA to SG from light beams (S203).

The main control unit 51 detects the offset value of a beam passing position detector for a light beam a in a beam detector output processor 40 (offset detection; S204). Subsequently, the main control unit 51 determines whether the detected offset value falls within a prescribed range (S205). When the offset value falls outside the prescribed range, the main control unit 51 executes offset compensation on the basis of the detected offset value (offset compensation; S206). The offset compensation method is the same as in the first embodiment described above.

The main control unit 51 sequentially carries out steps S207 to S216 to perform the same control: (offset detection) →(offset compensation) for light beams b, c, and d.

Upon completion of offset compensation for all the light beams a to d, the main control unit 51 performs beam passing position control.

Figure 43:
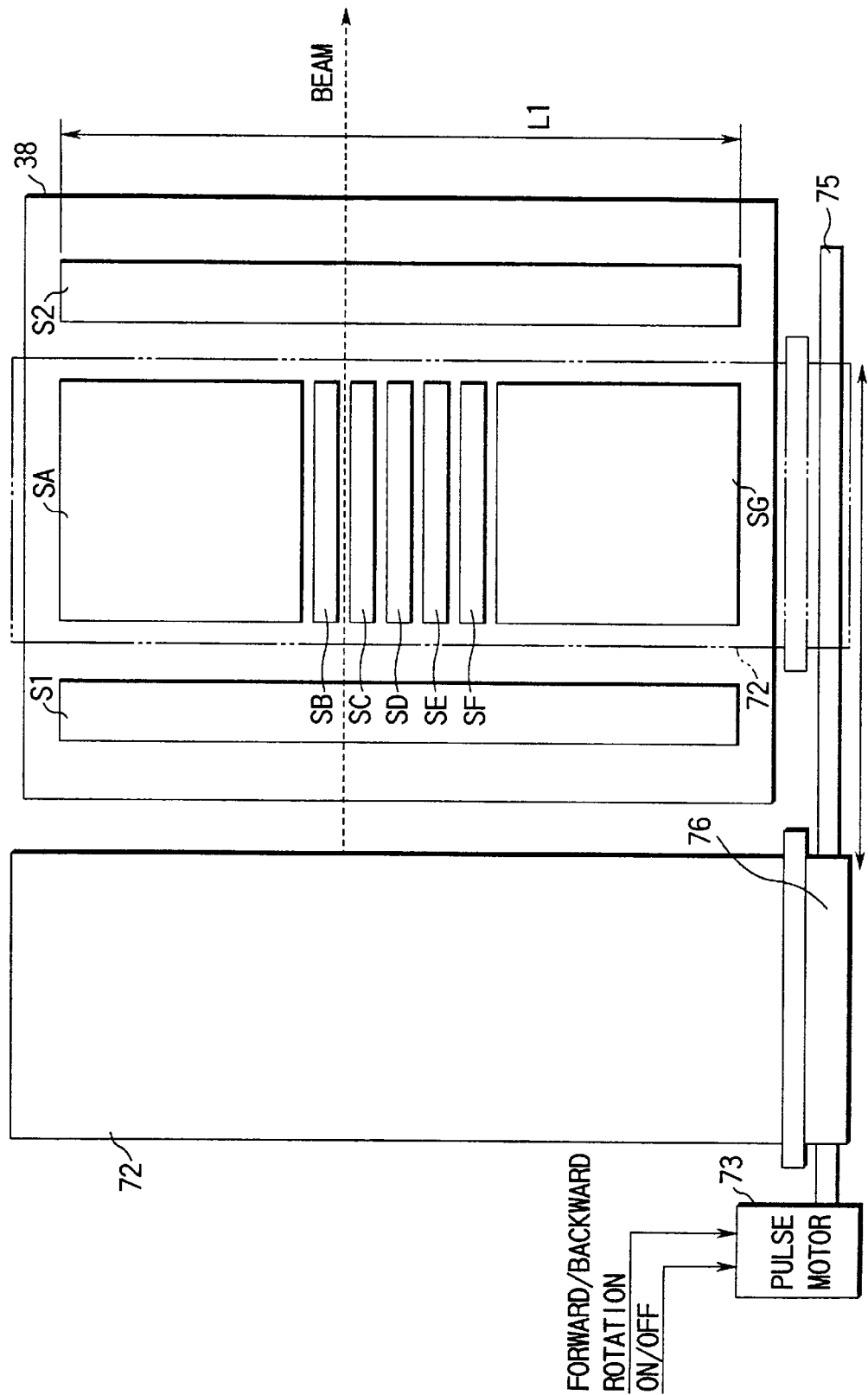
FIG. 43 is a view for explaining an actuator for moving the beam-shielding plate according to the 10th embodiment.

FIG. 43 is a view for explaining an actuator for moving the beam-shielding plate 72 in the 10th embodiment. This embodiment exemplifies a case using the pulse motor 73 as the actuator for moving the beam-shielding plate 72. A rotating shaft 75 of the pulse motor 73 is ball-screwed, and a stage 76 mounting the beam-shielding plate 72 is attached to the rotating shaft 75. The two sides of the stage 76 are supported by a guide (not shown). As the pulse motor 73 rotates, the beam-shielding plate 72 fixed to the stage 76 reciprocally moves in the arrow direction in FIG. 43.

The main control unit 51 instructs the rotation direction (forward/backward rotation) to the pulse motor 73 via the driver 74. When a drive pulse is output in response to an ON signal, the pulse motor 73 starts rotating.

For example, when an offset value is to be detected, the main control unit 51 sets the rotation direction to a forward rotation direction, and outputs an ON signal. In response to the output of the ON signal, the pulse motor 73 starts rotating to move the beam-shielding plate 72. The main control unit 51 manages the number of drive pulses. After outputting a predetermined number of pulses, the main control unit 51 outputs an OFF signal to stop the rotation of the pulse motor 73. The predetermined number of pulses is the number of pulses necessary to move the beam-shielding plate 72 from a standby position until the beam passing position detection sensor patterns SA to SG are shielded from a light beam.

Note that, if the OFF signal is output to stop the rotation of the pulse motor 73, the beam-shielding plate 72 does not move because the pulse motor 73 has a holding force.

In performing beam passing position detection control, the beam-shielding plate 72 is moved to a standby position (in the state of FIG. 39). That is, the main control unit 51 sets the rotation direction to a backward rotation direction, and outputs an ON signal. In response to the output of the ON signal, the pulse motor 73 starts rotating to move the beam-shielding plate 72 to the standby position. After outputting a predetermined number of pulses, the main control unit 51 outputs an OFF signal to stop the rotation of the pulse motor 73.

Offset detection/compensation according to the 11th embodiment will be described below.

In the 11th embodiment, an offset value is detected by the same method as in the 10th embodiment (using the shielding plate), and the offset value is compensated by the same method as in the second embodiment (compensation of position information). Therefore, a description of the 11th embodiment will be omitted.

Offset detection/compensation according to the 12th embodiment will be described below.

In the 12th embodiment, an offset value is detected by the same method as in the 10th embodiment (using the shielding plate), and the offset value is compensated by the same method as in the third embodiment (compensation of the operational amplifier via the D/A converter).

Figure 44:
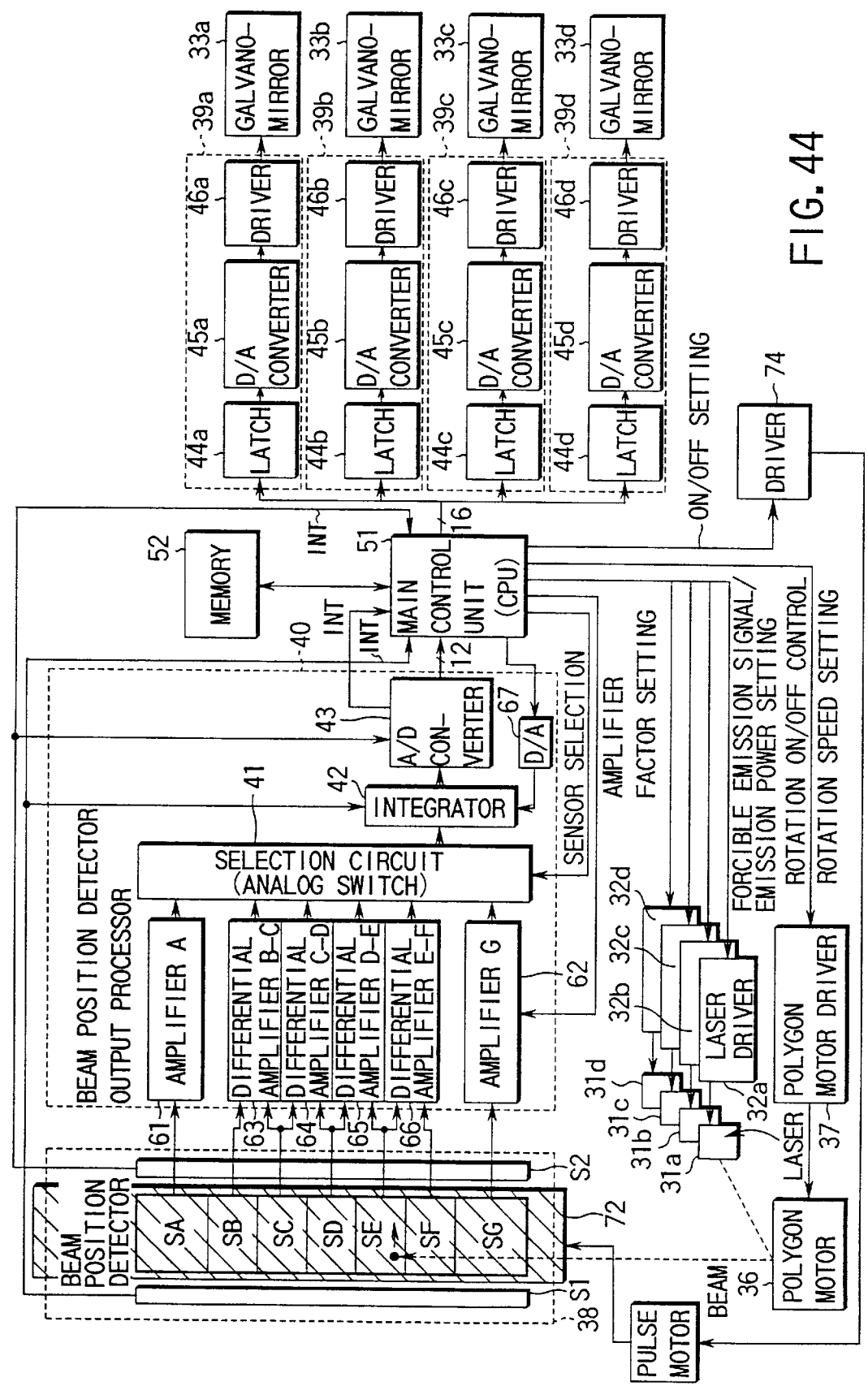
FIG. 44 is a block diagram for explaining offset detection/compensation processing according to the 12th embodiment.

FIG. 44 is a block diagram for explaining offset detection/compensation processing according to the 12th embodiment. The basic arrangement is the same as in the 10th embodiment (using the shielding plate) of FIG. 40 described above except that a beam detector output processor 40 includes a D/A converter 67, similar to the third embodiment. Therefore, a description of the 12th embodiment will be omitted.

Offset detection/compensation according to the 13th embodiment will be described below.

In the 13th embodiment, the integration end timing is managed by a timer serving as a timepiece means. The offset compensation method is the same as in the first embodiment, and a description thereof will be omitted.

Figure 45:
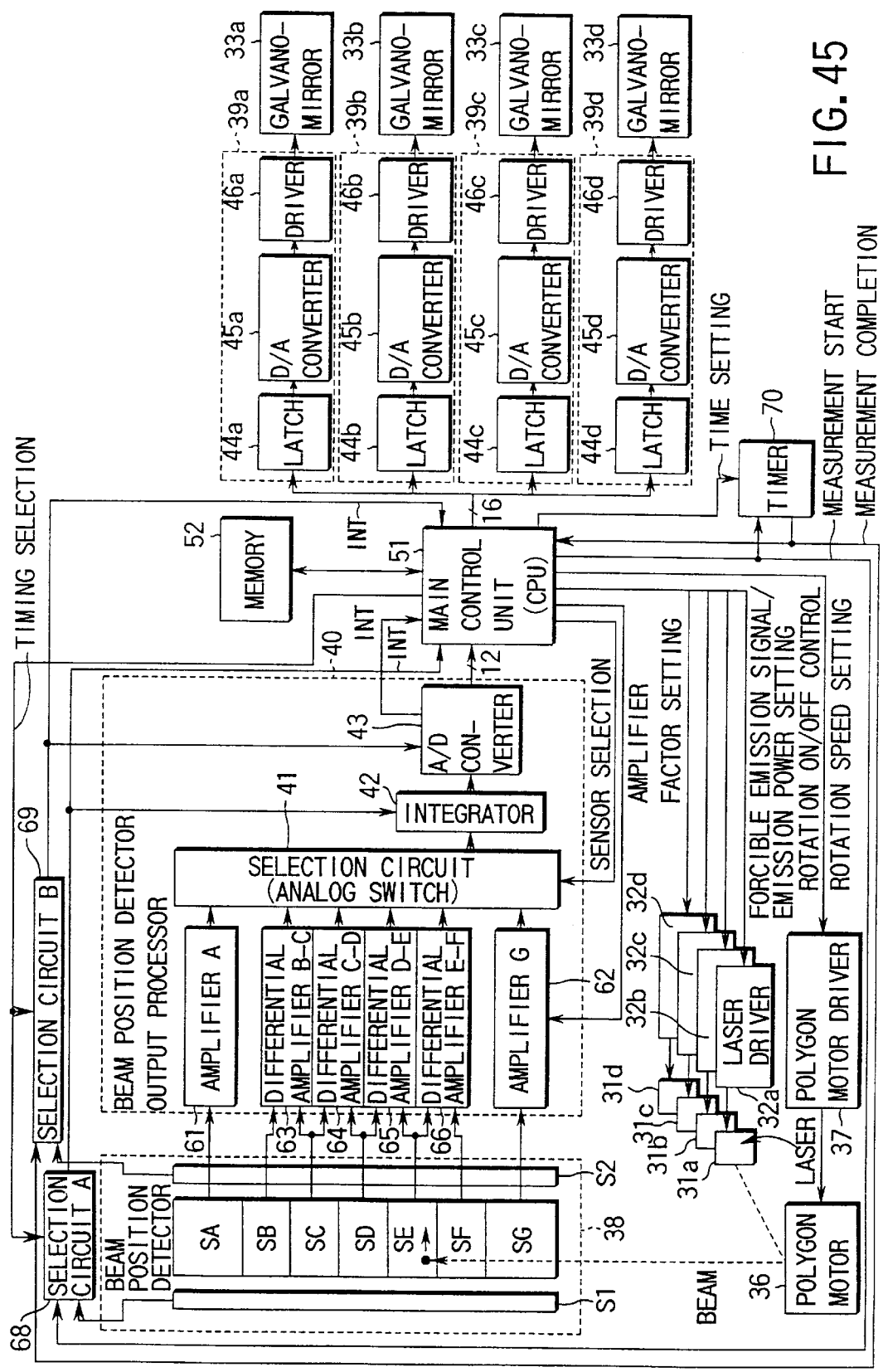
FIG. 45 is a block diagram for explaining offset detection/compensation processing according to the 13th embodiment.

FIG. 45 is a block diagram for explaining offset detection/compensation processing according to the 13th embodiment. The basic arrangement is the same as in the first embodiment of FIG. 7 described above except that selection circuits 68 and 69, and a timer 70 serving as a timepiece means are arranged.

The selection circuit 68 receives an output signal from a sensor pattern S1 and a measurement start signal for the timer 70, either of which is selected by a selection signal from a main control unit 51. That is, the output from the sensor pattern S1 is selected in beam passing position control, and the measurement start signal for the timer 70 is selected in offset detection. The selected signal is input to an integrator 42 as integration reset and integration start signals.

The selection circuit 69 receives an output signal from a sensor pattern S2 and a measurement completion signal from the timer 70, either of which is selected by a selection signal from the main control unit 51. That is, the output signal from the sensor pattern S2 is selected in beam passing position control, and the measurement completion signal from the timer 70 is selected in offset detection. The selected signal is input as an A/D conversion start signal (integration end) to an A/D converter 43.

The timer 70 starts measurement upon reception of the measurement start signal output signal from the main control unit 51. After the lapse of a time set by the main control unit 51, the timer 70 outputs a measurement completion signal. The measurement start signal is sent as integration reset and integration start signals to an analog switch SW1 of the integrator 42 via the selection circuit 68. The measurement completion signal is sent as an A/D conversion start signal to the A/D converter 43 via the selection circuit 69. At the same time, the measurement completion signal is also output to the main control unit 51.

The measurement time of the timer 70 can be arbitrarily set by the main control unit 51. In this embodiment, the measurement time is a time interval between output of a signal from the sensor pattern S1 and output of a signal from the sensor pattern S2 (i.e., a time interval between integration start and integration end).

Figure 46:
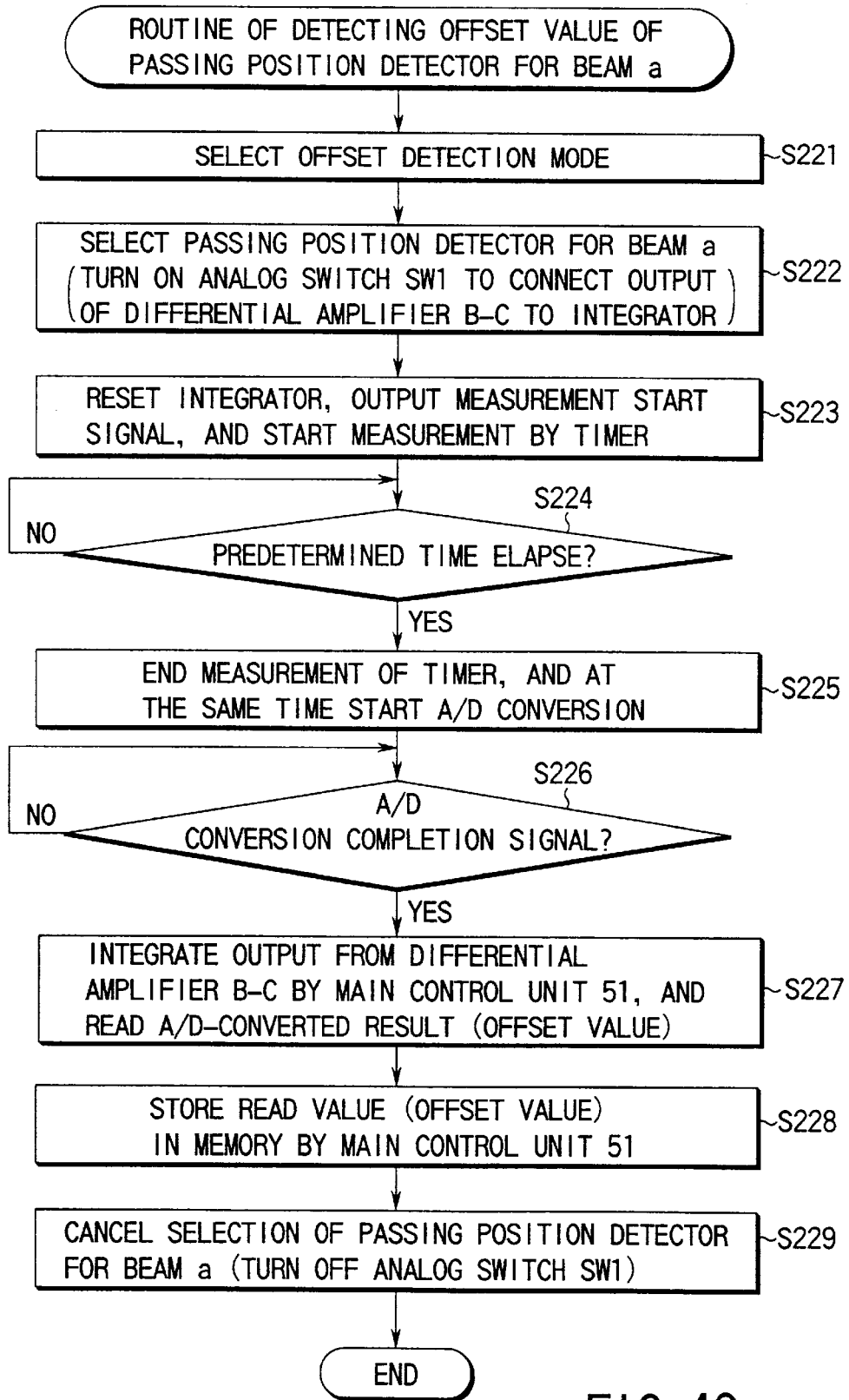
FIG. 46 is a flow chart for explaining a routine of detecting the offset value according to the 13th embodiment.

FIG. 46 is a flow chart for explaining the operation of the offset detection routine in the 13th embodiment. A method of detecting an offset value will be explained with reference to FIG. 46. Although FIG. 46 exemplifies the case of a light beam a, the same operation is also performed for light beams b, c, and d.

The main control unit 51 outputs a selection signal to the selection circuit 68 to select the measurement start signal for the timer 70 as integration reset and integration start signals.

The measurement start signal for the timer 70 is input to an analog switch SW7 of the integrator 42. The main control unit 51 outputs a selection signal to the selection circuit 69 to select the measurement completion signal from the timer 70 as an A/D conversion start signal. The measurement completion signal from the timer 70 is input to the A/D converter 43 as the A/D conversion start signal (also serving as an integration end signal) (offset detection mode; S221).

The main control unit 51 selects a beam passing position detector for the light beam a in a beam detector output processor 40 (S222). In S222, the analog switch SW1 is turned on to connect the output terminal of a differential amplifier 63 for calculating a difference between outputs from sensor patterns SB and SC which detect the passing position of the light beam a, to the input terminal of the integrator 42.

The main control unit 51 outputs the measurement start signal to the timer 70 and the analog switch SW7 of the integrator 42. After this measurement start signal resets the integrator 42, integration starts. At the same time, the timer 70 starts measurement (S223).

Subsequently, the timer 70 starts measuring the time set by the main control unit 51. After measuring the predetermined time (S224), the timer 70 outputs a measurement completion signal. The measurement completion signal is input as a conversion start signal to the A/D converter 43 via the selection circuit 69.

Upon reception of the conversion start signal, the A/D converter 43 starts A/D conversion (S225). That is, the A/D converter 43 converts the integrated offset value as an analog signal into a digital signal. Upon completion of the A/D conversion, the A/D converter 43 outputs an A/D conversion completion signal to the main control unit 51 (S226).

Upon reception of the A/D conversion signal, the main control unit 51 reads the A/D-converted value (offset value) (S227). Finally, the main control unit 51 stores the offset value in a memory 52 (S228), and cancels the selection of the beam passing position detector for the light beam a (S229). That is, the main control unit 51 turns off the analog switch SW1.

The same control is executed in offset detection of the light beams b, c, and d to detect the offset values of the beam passing position detectors for all the light beams a to d, i.e., the offset values of the beam detector output processor 40.

According to the 13th embodiment, the offset value of the beam detector output processor 40 can be detected without making a light beam scan by a polygon mirror 35. That is, since no light beam is emitted, no light beam is irradiated on the beam passing position detector 38, no beam position information is superposed on an offset component, and an offset value can be detected with high precision.

Offset detection/compensation according to the 14th embodiment will be described below.

In the 14th embodiment, an offset value is detected by the same method as in the 13th embodiment (using no sensor but the timer), and the offset value is compensated by the same method as in the second embodiment (compensation of position information). Therefore, a description of the 14th embodiment will be omitted.

Offset detection/compensation according to the 15th embodiment will be described below.

In the 15th embodiment, an offset value is detected by the same method as in the 13th embodiment (using no sensor but the timer), and the offset value is compensated by the same method as in the third embodiment described above.

Figure 47:
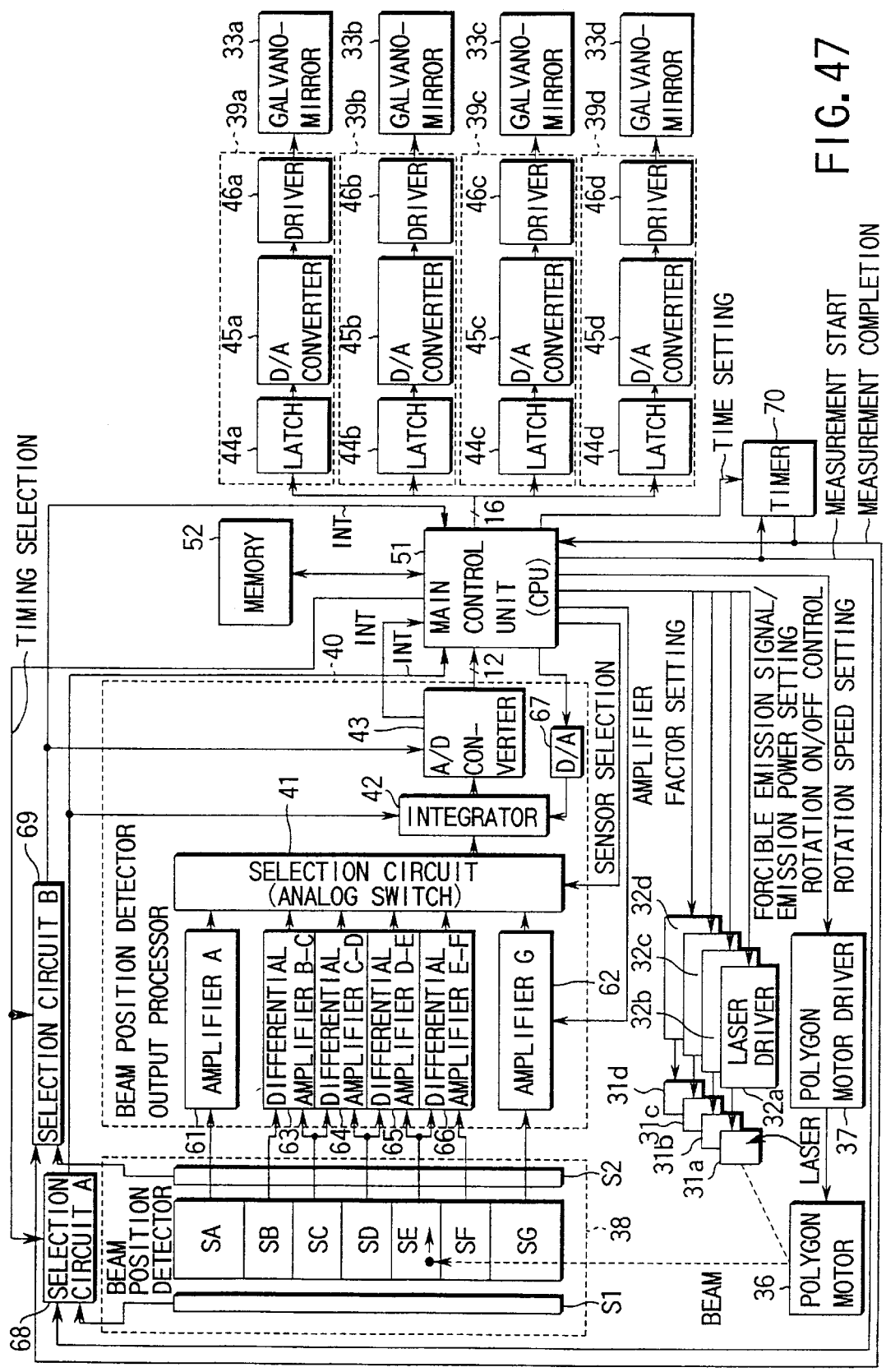
FIG. 47 is a block diagram for explaining offset detection/compensation processing according to the 15th embodiment.
Figure 48A:
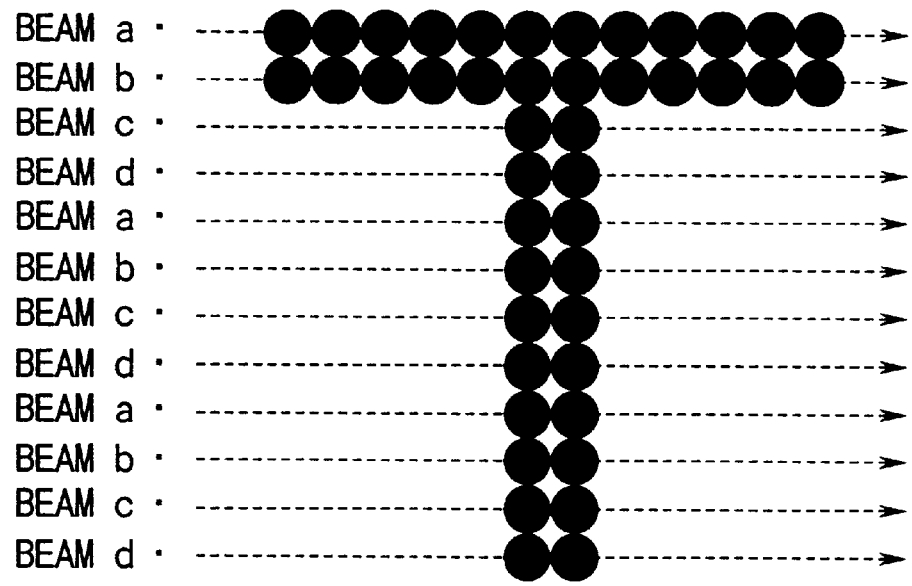
FIGS. 48A and 48B are views for explaining an image error which may occur when an image is formed using an offset light beam.
Figure 48B:
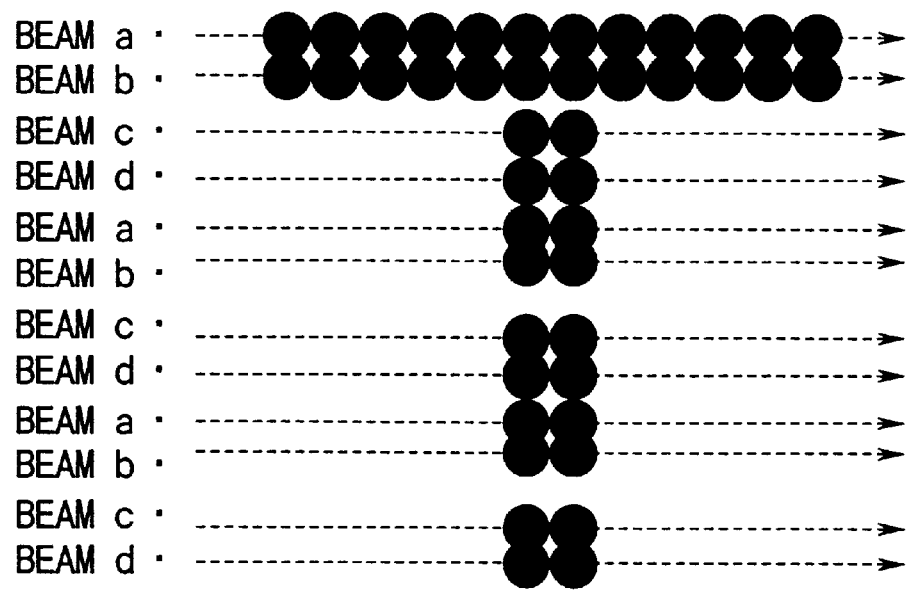
Figure 49A:
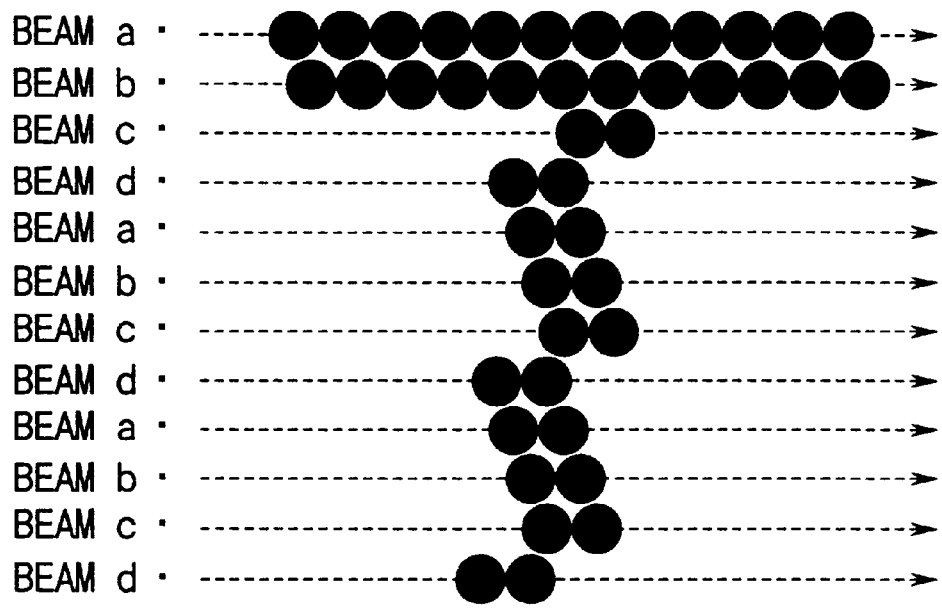
FIGS. 49A and 49B are views for explaining the image error which may occur when the image is formed using the offset light beam.
Figure 49B:
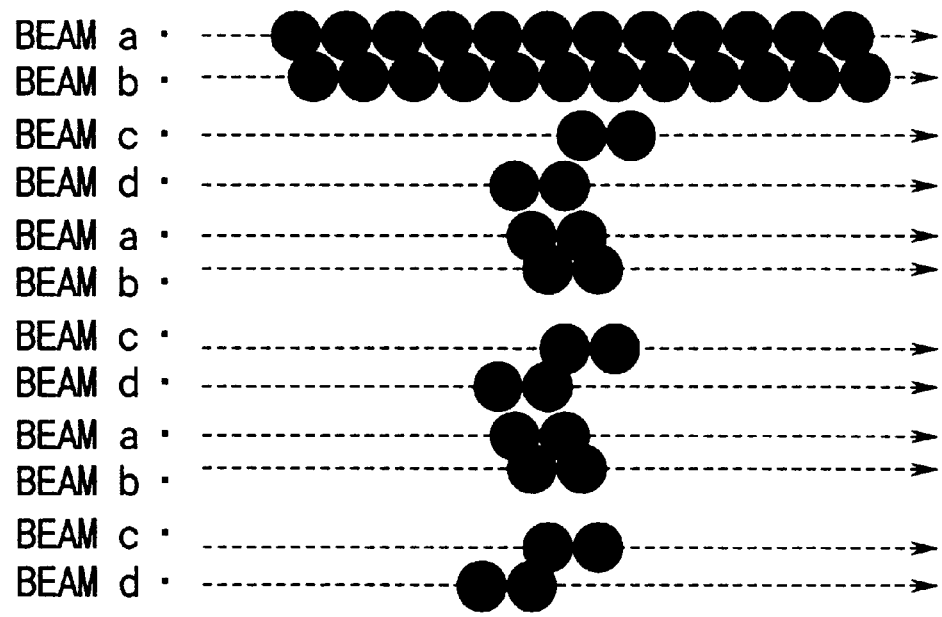

FIG. 47 is a block diagram for explaining offset detection/compensation processing according to the 15th embodiment.

The basic arrangement is the same as in the 13th embodiment of FIG. 45 described above except that a beam detector output processor 40 includes a D/A converter 67, similar to the third embodiment. Therefore, a description of the 15th embodiment will be omitted.

As has been described above, according to the above embodiments, beam position control almost free from a control error can be realized by detecting the offset value of a beam position detector output processor for converting an output from a beam position detector into beam position information, and performing compensation processing in accordance with the detected offset value. Accordingly, the position of a light beam can always be controlled at a proper position on a photosensitive drum with high precision, thereby always maintaining high image quality.

The beam position detector having the above-described sensor patterns is used. Thereby, the scan positions of the light beams can be exactly detected even if the precision in mounting angle of the beam position detector is not high.

In the digital copying machine using the multi-beam optical system, the passing positions of light beams are detected by the beam position detector situated on a level with the surface of the photo-sensitive drum. Based on the detected result, control amounts for optimally controlling the relative positions of the beams on the surface of the photo-sensitive drum are calculated. Based on the calculated control amounts, the galvanomirrors are controlled to alter the relative positions of the beams on the surface of the photo-sensitive drum. Thereby, the positional relationship among the light beams on the surface of the photo-sensitive drum can be optimally controlled with no particular precision or adjustment for the assembly of the optical system, even if some change occurs in the structure of the optical system due to a variation in ambience or a variation with the passing of time. Therefore, high image quality can be maintained at all times.

In the above-described embodiments, the present invention is applied to the digital copying machine using the multi-beam optical system. However, the present invention is not limited to this, and is applicable to image forming apparatuses such as a high-speed printer, other than the digital copying machine.

As has been described above, according to the present invention, a light beam scanning apparatus and an image forming apparatus in which the position of a light beam on a surface to be scanned can always be controlled to a proper position with high precision, thereby maintaining high image quality at all times can be provided.

In addition, according to the present invention, a light beam scanning apparatus and an image forming apparatus in which the positional relationship between a plurality of light beams on a surface to be scanned can always be controlled to be ideal with high precision, thereby maintaining high image quality at all times can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

We claim:

1. A light scanning apparatus comprising:

light generation means for generating a light beam;

scanning means for deflecting the light beam generated by said light generation means to make the light beam to scan a surface to be scanned;

beam position detection means for detecting the light beam made to scan by said scanning means with a plurality of light detection elements laid out in a sub-scanning direction of the light beam, and supplying a position signal corresponding to a passing position of the light beam in the sub-scanning direction;

first and second beam passage detection means, arranged in an area including areas on two sides of said beam position detection means in a main scanning direction, for detecting passage of the light beam made to scan by said scanning means, and supplying beam passage detection signals;

signal processing means which includes an integrator that starts/ends integration of the position signal from said beam position detection means in response to the beam passage detection signal output from said first and second beam passage detection means, supplies an integrated value of the position signal, and has an offset value;

first control means for controlling said scanning means so as to make the light beam scan an undetectable region of said beam position detection means during an offset compensation period of said signal processing means;

offset determination means for determining the integrated value supplied from said signal processing means as an offset value corresponding to an offset voltage, and storing the offset value after said scanning means controlled by said first control means makes the light beam scan over said beam passage detection means during the offset compensation period; and second control means, having compensation means for compensating the offset voltage of said signal processing means by using the offset value stored in said offset determination means, for comparing the integrated value from said signal processing means with a preset reference value during position control in the sub-scanning direction by said scanning means, and controlling said scanning means on the basis of a comparison result so as to set the passing position of the light beam in the sub-scanning direction to a proper position.

2. An apparatus according to claim 1, wherein said compensation means compensates the offset voltage of said signal processing means by changing the preset reference value in accordance with the offset value.

3. An apparatus according to claim 1, wherein said compensation means compensates the offset voltage of said signal processing means by changing the integrated value from said signal processing means during the position control in the sub-scanning direction in accordance with the stored offset value (step S127).

4. An apparatus according to claim 1, wherein said integrator of said signal processing means comprises an operational amplifier, said apparatus comprises a D/A converter for applying a reference voltage to one input of said operational amplifier, and said compensation means has means for transferring the stored offset value to said D/A converter, thereby compensating the offset voltage of said signal processing means.

5. A light beam scanning apparatus comprising:

light generation means for generating a light beam;

scanning means for deflecting the light beam generated by said light generation means to make the light beam to scan a surface to be scanned;

beam position detection means for detecting the light beam made to scan by said scanning means with a plurality of light detection elements laid out in a sub-scanning direction of the light beam, and supplying a position signal corresponding to a passing position of the light beam in the sub-scanning direction;

first and second beam passage detection means, arranged in an area including areas on two sides of said beam position detection means in a main scanning direction, for detecting passage of the light beam made to scan by said scanning means, and supplying first beam passage detection signals;

third and fourth beam passage detection means, arranged on one side near said beam position detection means in the main scanning direction, for detecting passage of the light beam made to scan by said scanning means, and supplying second beam passage signals;

selection means for selecting one of said first and third beam passage detection means and one of said second and fourth detection means, and supplying beam passage signals output from selected beam passage detection means;

first control means for controlling said selection means so as to select said first and second beam passage detection means during sub-scanning position control by said scanning means and to select said third and fourth beam passage detection means during an offset compensation period of signal processing means;

said signal processing means which includes an integrator that starts/ends integration of the position signal from said beam position detection means in response to the beam passage detection signal output from said selection means, supplies an integrated value of the position signal, and has an offset value;

second control means for controlling said light generation means so as to generate the light beam only when said scanning means scans over said third and fourth beam passage detection means during the offset compensation period;

offset determination means for determining the integrated value supplied from said signal processing means as an offset value corresponding to an offset voltage, and storing the offset value after the light beam from said light generation means controlled by said second control means is made to scan over said third and fourth beam passage detection means during the offset compensation period; and third control means, having compensation means for compensating the offset voltage of said signal processing means by using the offset value stored in said offset determination means, for comparing the integrated value from said signal processing means with a preset reference value during sub-scanning position control by said scanning means, and controlling said scanning means on the basis of a comparison result so as to set the passing position of the light beam in the sub-scanning direction to a proper position.

6. An apparatus according to claim 5, wherein said compensation means compensates the offset voltage of said signal processing means by changing the preset reference value in accordance with the offset value.

7. An apparatus according to claim 5, wherein said compensation means compensates the offset voltage of said signal processing means by changing the integrated value from said signal processing means during the position control of the sub-scanning direction in accordance with the stored offset value.

8. An apparatus according to claim 5, wherein said integrator of said signal processing means comprises an operational amplifier (A4), said apparatus comprises a D/A converter for applying a reference voltage to one input of said operational amplifier, and said compensation means has means for transferring the stored offset value to said D/A converter, thereby compensating the offset voltage of said signal processing means.

9. A light beam scanning apparatus comprising:

light generation means for generating a light beam;

scanning means for deflecting the light beam generated by said light generation means to make the light beam to scan a surface to be scanned;

beam position detection means for detecting the light beam made to scan by said scanning means with a plurality of light detection elements laid out in a sub-scanning direction of the light beam, and supplying a position signal corresponding to a passing position of the light beam in the sub-scanning direction;

first and second beam passage detection means, arranged in areas on two sides of said beam position detection means in a main scanning direction, for detecting passage of the light beam made to scan by said scanning means, and supplying a beam passage signal;

signal processing means which includes an integrator that starts/ends integration of the position signal from said beam position detection means in response to the beam passage signal output from said first and second beam passage detection means, supplies an integrated value of the position signal, and has an offset value;

first control means for controlling said light generation means so as to stop generating the light beam in response to the beam passage signal from said first beam passage detection means during an offset compensation period of said signal processing means;

timer means for measuring a predetermined time interval in response to the beam passage signal from said first beam passage detection means during the offset compensation period, and supplying a measurement completion signal after lapse of the predetermined time interval, said signal processing means stopping an integration operation in response to the measurement completion signal, and supplying the integrated value of the position signal;

offset determination means for determining the integrated value supplied from said signal processing means as an offset value corresponding to an offset voltage, and storing the offset value during the offset compensation period; and second control means, having compensation means for compensating the offset voltage of said signal processing means by using the offset value stored in said offset determination means, for comparing the integrated value from said signal processing means with a preset reference value during sub-scanning position control by said scanning means, and controlling said scanning means on the basis of a comparison result so as to set the passing position of the light beam in the sub-scanning direction to a proper position.

10. An apparatus according to claim 9, wherein said compensation means compensates the offset voltage of said signal processing means by changing the preset reference value in accordance with the offset value.

11. An apparatus according to claim 9, wherein said compensation means compensates the offset voltage of said signal processing means by changing the integrated value from said signal processing means during the position control in the sub-scanning direction in accordance with the stored offset value (step S127).

12. An apparatus according to claim 9, wherein said integrator of said signal processing means comprises an operational amplifier, said apparatus comprises a D/A converter for applying a reference voltage to one input of said operational amplifier, and said compensation means has means for transferring the stored offset value to said D/A converter, thereby compensating the offset voltage of said signal processing means.

13. A light beam scanning apparatus comprising:

light generation means for generating a light beam;

scanning means for deflecting the light beam generated by said light generation means to make the light beam to scan a surface to be scanned;

beam position detection means for detecting the light beam made to scan by said scanning means with a plurality of light detection elements laid out in a sub-scanning direction of the light beam, and supplying a position signal corresponding to a passing position of the light beam in the sub-scanning direction;

first and second beam passage detection means, arranged in areas on two sides of said beam position detection means in a main scanning direction, for detecting passage of the light beam made to scan by said scanning means, and supplying a beam passage detection signal;

signal processing means which includes an integrator that starts/ends integration of the position signal from said beam position detection means in response to the beam passage detection signal output from said first and second beam passage detection means, supplies an integrated value of the position signal, and has an offset value;

shielding means for shielding said plurality of light detection elements of said beam position detection means from external light with a shielding plate;

first control means for controlling said shielding means so as to cause said shielding plate to cover said plurality of light detection elements during an offset compensation period of said signal processing means;

offset determination means for determining the integrated value supplied from said signal processing means as an offset value corresponding to an offset voltage, and storing the offset value after the light beam is made to scan over said first and second beam passage detection means during the offset compensation period; and second control means, having compensation means for compensating the offset voltage of said signal processing means by using the offset value stored in said offset determination means, for comparing the integrated value from said signal processing means with a preset reference value during position control in the sub-scanning direction by said scanning means, and controlling said scanning means on the basis of a comparison result so as to set the passing position of the light beam in the sub-scanning direction to a proper position.

14. An apparatus according to claim 13, wherein said compensation means compensates the offset voltage of said signal processing means by changing the preset reference value in accordance with the offset value.

15. An apparatus according to claim 13, wherein said compensation means compensates the offset voltage of said signal processing means by changing the integrated value from said signal processing means during the position control in the sub-scanning direction in accordance with the stored offset value.

16. An apparatus according to claim 13, wherein said integrator of said signal processing means comprises an operational amplifier, said apparatus comprises a D/A converter for applying a reference voltage to one input of said operational amplifier, and said compensation means has means for transferring the stored offset value to said D/A converter, thereby compensating the offset voltage of said signal processing means.

17. A light beam scanning apparatus comprising:

light generation means for generating a light beam;

scanning means for deflecting the light beam generated by said light generation means to make the light beam to scan a surface to be scanned;

beam position detection means for detecting the light beam made to scan by said scanning means with a plurality of light detection elements laid out in a sub-scanning direction of the light beam, and supplying a position signal corresponding to a passing position of the light beam in the sub-scanning direction;

first and second beam passage detection means, arranged in areas on two sides of said beam position detection means in a main scanning direction, for detecting passage of the light beam made to scan by said scanning means, and supplying a beam passage signal;

signal processing means which includes an integrator that starts/ends integration of the position signal from said beam position detection means in response to the beam passage signal output from said first and second beam passage detection means, supplies an integrated value of the position signal, and has an offset value;

timer means for measuring a predetermined time interval, and supplying a measurement completion signal after lapse of the predetermined time interval;

first control means for controlling said timer means and said integrator so as to perform integration by said integrator for only the predetermined time interval during an offset compensation period of said signal processing means, said signal processing means supplying an integrated value of the position signal after lapse of the period;

offset determination means for determining the integrated value supplied from said signal processing means as an offset value corresponding to an offset voltage, and storing the offset value during the offset compensation period; and second control means, having compensation means for compensating the offset voltage of said signal processing means by using the offset value stored in said offset determination means, for comparing the integrated value from said signal processing means with a preset reference value during sub-scanning position control by said scanning means, and controlling said scanning means on the basis of a comparison result so as to set the passing position of the light beam in the sub-scanning direction to a proper position.

18. An apparatus according to claim 17, wherein said compensation means compensates the offset voltage of said signal processing means by changing the preset reference value in accordance with the offset value.

19. An apparatus according to claim 17, wherein said compensation means compensates the offset voltage of said signal processing means by changing the integrated value from said signal processing means during the position control in the sub-scanning direction in accordance with the stored offset value.

20. An apparatus according to claim 17, wherein said integrator of said signal processing means comprises an operational amplifier (A4), said apparatus comprises a D/A converter for applying a reference voltage to one input of said operational amplifier, and said compensation means has means for transferring the stored offset value to said D/A converter, thereby compensating the offset voltage of said signal processing means.

21. An image forming apparatus comprising:

scanner for optically scanning an original to provide image data corresponding to the original a light beam scanning means for forming an electrostatic latent image on an image carrier, said light beam scanning means including:
- (a) a plurality of light generation means for simultaneously generating light beams;
- (b) scanning means for deflecting the light beams generated by said light generation means to make the light beams scan a surface to be scanned;
- (c) beam position detection means for detecting the light beams made to scan by said scanning means with a plurality of light detection elements laid out in a sub-scanning direction of the light beams, and supplying position signals corresponding to passing positions in the sub-scanning direction of the light beams;
- (d) first and second beam passage detection means, arranged in an area including areas on two sides of said beam position detection means in a main scanning direction, for detecting passage of the light beams made to scan by said scanning means, and supplying beam passage detection signals;
- (e) signal processing means which includes an integrator that starts/ends integration of the position signals from said beam position detection means in response to the beam passage detection signals output from said first and second beam passage detection means, supplies an integrated value of the position signals, and has an offset value;
- (f) first control means for controlling said scanning means so as to make the light beams to scan undetectable regions of said beam position detection means during an offset compensation period of said signal processing means;
- (g) offset determination means for determining the integrated value supplied from said signal processing means as an offset value corresponding to an offset voltage, and storing the offset value after said scanning means controlled by said first control means makes the light beams to scan over said beam passage detection means during the offset compensation period; and
- (h) second control means, having compensation means for compensating the offset voltage of said signal processing means by using the offset value stored in said offset determination means, for comparing the integrated value from said signal processing means with a preset reference value during position control in the sub-scanning direction by said scanning means, and controlling said scanning means on the basis of a comparison result so as to set the passing position of the light beam in the sub-scanning direction to a proper position;

developing means for developing said electrostatic latent image formed on said image carrier; and transfer means for transferring the image developed by said developing means onto a paper sheet.

* * * * *

UNITED STATES PATENT AND TRADEMARK OFFICE
CERTIFICATE OF CORRECTION

PATENT NO. : 5,929,891
DATED : July 27, 1999
INVENTOR(S) : Kenichi KOMIYA, et al.

It is certified that error appears in the above-indentified patent and that said Letters Patent is hereby corrected as shown below:

Title page, Item [30] Foreign Application Priority Data, delete "Nov. 19, 1995" and replace with --Nov. 15, 1996.--

Signed and Sealed this

First Day of August, 2000

Attest:

Q. TODD DICKINSON

*Attesting Officer*    *Director of Patents and Trademarks*